(12) United States Patent
Kitagawa et al.

(10) Patent No.: US 7,336,879 B2
(45) Date of Patent: Feb. 26, 2008

(54) TWO-DIMENSIONAL PHOTONIC CRYSTAL SLAB, TWO-DIMENSIONAL PHOTONIC CRYSTAL WAVEGUIDE, AND OPTICAL DEVICE

(75) Inventors: Hitoshi Kitagawa, Miyagi-ken (JP); Susumu Noda, Kyoto-fu (JP); Takashi Asano, Kyoto-fu (JP)

(73) Assignees: Alps Electric Co., Ltd., Tokyo (JP); Kyoto University, Kyoto (JP)

( * ) Notice: Subject to any disclaimer, the term of this patent is extended or adjusted under 35 U.S.C. 154(b) by 60 days.

(21) Appl. No.: 10/927,029

(22) Filed: Aug. 26, 2004

(65) Prior Publication Data

US 2005/0047742 A1    Mar. 3, 2005

(30) Foreign Application Priority Data

Aug. 28, 2003 (JP) .............................. 2003-305329
Mar. 3, 2004 (JP) .............................. 2004-058981

(51) Int. Cl.
*G02B 6/10* (2006.01)
(52) U.S. Cl. ....................................................... 385/129
(58) Field of Classification Search ..................... None
See application file for complete search history.

(56) References Cited

U.S. PATENT DOCUMENTS

2002/0009277 A1* 1/2002 Noda et al. ................. 385/130
2002/0048422 A1* 4/2002 Cotteverte et al. ............. 385/4

FOREIGN PATENT DOCUMENTS

EP         1512994 A1      3/2005
JP      2005-250202 A   *  9/2006

OTHER PUBLICATIONS

C.G. Bostan et al. Design of photonic crystal slab structures with absolute gaps in guided modes. Journal of Optoelectronics and Advanced Materials, vol. 4 No. 4, pp. 921-928, Dec. 2002.*
C.G. Bostan et al. Line-defect waveguides in hexagon-hole type photonic crystal slabs: Design and fabrication using focused ion beam technology. Proc. Symp. IEEE/LEOS Benelux Chapter 2003, pp. 253-256, Nov. 2003.*

(Continued)

*Primary Examiner*—Rodney Bovernick
*Assistant Examiner*—Mike Stahl
(74) *Attorney, Agent, or Firm*—Beyer Weaver LLP

(57) ABSTRACT

A two-dimensional photonic crystal slab having a photonic band gap common to a light beam in the TE-like mode and a light beam in the TM-like mode includes a slab member containing a high refractive index material and low refractive index sectors, arranged in the slab member in a triangular pattern, having a triangular prism shape. The two-dimensional photonic crystal slab further includes a linear defect section that is a disordered portion in a periodic structure of a photonic crystal and extends in the Γ-J direction. Light beams in the TE-like mode and light beams in the TM-like mode can be propagated through the waveguide section. A two-dimensional photonic crystal waveguide includes the two-dimensional photonic crystal slab.

26 Claims, 45 Drawing Sheets

OTHER PUBLICATIONS

M. Qiu et al. Optimal design of a two-dimensional photonic crystal of square lattice with a large complete two-dimensional bandgap. J. Opt. Soc. Am. B, vol. 17 No. 6, pp. 1027-1030, Jun. 2000.*

J. N. Winn et al. Two-dimensional photonic bandgap materials. Journal of Modern Optics, vol. 41 No. 2, pp. 257-273, 1994.*

M. Notomi et al. Structural tuning of guiding modes of line-defect waveguides of silicon-on-insulator photonic crystal slabs. IEEE Journal of Quantum Electronics, vol. 38 No. 7, pp. 736-742, Jul. 2002.*

Y. Zhou et al. Guide modes in photonic crystal heterostructures composed of rotating non-circular air cylinders in two-dimensional lattices. Journal of Physics: Condensed Matter, vol. 15, pp. 4109-4118, Jun. 2003.*

S. David et al. Wide angularly isotropic photonic bandgaps obtained from two-dimensional photonic crystals with Archimedean-like tilings. Optics Letters, vol. 25 No. 14, pp. 1001-1003, Jul. 2000.*

M. Loncar et al. Design and fabrication of silicon photonic crystal optical waveguides. Journal of Lightwave Technology, vol. 18 No. 10, pp. 1402-1411, Oct. 2000.*

Takeda et al., "Formation of $Al_xGa_{1-x}As$ periodic array of micro-hexagonal pillars and air holes by selective are MOVPE," May 8, 2002, Applied Surface Science Elsevier Netherlands, vol. 190, No. 1-4, pp. 236-241.

Jamois et al., "Silicon-Based Photonic Crystal Slabs: Two Concepts," Jul. 2002, IEEE Journal of Quantum Electronics, vol. 38, No. 7, pp. 805-810.

Wang, et al., "Effects of shapes and orientations of scatterers and lattice symmetries on the photonic band gap in two-dimensional photonic crystals," Nov. 1, 2001, Journal of Applied Physics, vol. 90, No. 9, pp. 4307-4313.

Johnson et al., "Linear waveguides in photonic-crystal slabs," Sep. 15, 2000, The American Physical Society, vol. 62, No. 12, pp. 8212-8222, (Physical Review B).

Johnson et al, "Guided modes in photonic crystal slabs," Aug. 15, 1999, The American Physical Society, vol. 60, No. 8., pp. 5751-5758, (Physical Review B).

Kuchinsky, et al., "3D localization in a channel waveguide in a photonic crystal with 2D periodicity," Feb. 15, 2000, Optics Communications.

Fan et al., "Analysis of guided resonances in photonic crystal slabs," Jun. 7, 2002, Physical Review B (Condensed Matter and Materials Physics) APS Through AIP USA, vol. 65, No. 23.

European Examination Report issued on Aug. 24, 2006 for corresponding European Patent Application No. 04 020 447.1.

* cited by examiner

L/a = 0.85, t/a = 0.80

TE(t/a=0.80, L/a=0.85, Wo)

TE(t/a=0.80, L/a=0.85, W-11)

TE(t/a=0.6, r/a=0.29, W-11)

$L=0.85a$, $\Delta=0.15a$, $f=0.36$
$\Delta\lambda_{TM}=59$ nm, $\Delta\lambda_{TE}=310$ nm L=1a, Δ=0a, f=0.5
ΔλTM=176 nm, ΔλTE=257 nm L=0.6a, M=0.1a, f=0.39
ΔλTM=53 nm, ΔλTE=412 nm L=0.7a, M=0.1a, f=0.49
$\Delta\lambda_{TM}$=116 nm, $\Delta\lambda_{TE}$=438 nm L=0.8a, M=0.1a, f=0.60
$\Delta\lambda_{TM}$=225 nm, $\Delta\lambda_{TE}$=356 nm L=0.3a, M=0.3a, Δ=0.156a, f=0.36
ΔλTM=50 nm, ΔλTE=290 nm L=0.34a, M=0.34a, Δ=0.06a, f=0.46
ΔλTM=136 nm, ΔλTE=238 nm L=0.366a, M=0.366a, Δ=0a, f=0.53
ΔλTM=220 nm, ΔλTE=89 nm L=0.425a, r=L/2, Δ=0.15a, f=0.49
ΔλTM=140 nm, ΔλTE=306 nm $L=0.45a$, $r=L/2$, $\Delta=0.1a$, $f=0.55$
$\Delta\lambda_{TM}=202$ nm, $\Delta\lambda_{TE}=240$ nm $L=0.5a$, $r=L/2$, $\Delta=0a$, $f=0.68$
$\Delta\lambda_{TM}=383$ nm, $\Delta\lambda_{TE}=0$ nm

TWO-DIMENSIONAL PHOTONIC CRYSTAL SLAB, TWO-DIMENSIONAL PHOTONIC CRYSTAL WAVEGUIDE, AND OPTICAL DEVICE

BACKGROUND OF THE INVENTION

1. Field of the Invention

The present invention relates to a two-dimensional photonic crystal slab included in a micro-optical circuit element or the like, a two-dimensional photonic crystal waveguide including such a two-dimensional photonic crystal slab having a linear defect, and an optical device including such a two-dimensional photonic crystal waveguide.

2. Description of the Related Art

Materials with a periodic variation in refractive index on a length scale comparable to the wavelength of light are referred to as photonic crystals, which have forbidden bands that is, so-called photonic band gaps. In such materials, the propagation of light with a specific wavelength corresponding to the periodicity is prohibited. In recent years, the photonic crystals have been attracting much attention because light propagation can be precisely controlled using the photonic crystals, which therefore seem to be suitable for next-generation electronics or optoelectronics.

FIG. 44 shows an example of known two-dimensional photonic crystal waveguides (see Japanese Unexamined Patent Application Publication No. 2001-272555).

This two-dimensional photonic crystal waveguide includes a slab 81, made of a material having a refractive index higher than that of air, having cylindrical holes 86 arranged in a triangular grid pattern. The slab 81 therefore functions as a two-dimensional photonic crystal. The slab 81 has a linear defect section 92 extending between the cylindrical holes 86 as shown in FIG. 44. The linear defect section 92 functions as a waveguide section.

When the two-dimensional photonic crystal waveguide is irradiated with a light beam 103 with a wavelength corresponding to a frequency within a photonic band gap, the light beam 103 is prevented from being propagated in regions of the waveguide other than the linear defect section 92 because the regions have photonic band gaps in the in-plane direction; however, the light beam 103 is propagated in the linear detect section 92 functioning as a waveguide section and confined in the direction perpendicular to the in-plane direction by the total internal reflection due to a difference in refractive index.

Known two-dimensional photonic crystal waveguides have a photonic band gap for only one of a light beam in the transverse-electric (TE)-like mode and a light beam in the transverse-magnetic (TM)-like mode, the TE-like mode and the TM-like mode being among polarization modes. Therefore, a light beam in one of the modes is prevented from being propagated but a light beam in the other leaks in the in-plane direction of the waveguides; hence, the waveguides have low light extraction efficiency. For example, a two-dimensional photonic crystal waveguide having cylindrical holes arranged in a triangular grid pattern has a photonic band gap only for the light beam in the TE-like mode; hence, the light beam in the TM-like mode leaks in the in-plane direction of the waveguide.

A two-dimensional photonic crystal slab having a photonic band gap common to the light beam in the TE-like mode and the light beam in the TM-like mode has been demanded; however, such a two-dimensional photonic crystal slab has not been obtained.

SUMMARY OF THE INVENTION

The present invention has been made to solve the problem described above. It is an object of the present invention to provide a two-dimensional photonic crystal slab that has a photonic band gap common to a light beam in the TE-like mode and a light beam in the TM-like mode and can prevent the light beams from leaking in the in-plane direction of the slab.

It is another object of the present invention to provide a two-dimensional photonic crystal waveguide that includes such a two-dimensional photonic crystal slab and has low light loss.

Furthermore, it is another object of the present invention to provide an optical device including such a two-dimensional photonic crystal waveguide.

A first aspect of the present invention provides a two-dimensional photonic crystal slab having a photonic band gap for light propagated through the slab. The two-dimensional photonic crystal slab includes a slab member containing a material having a high refractive index and also includes sectors that are periodically arranged in the slab member, contain a material having a refractive index less than that of the slab member, and define the distribution of refractive index in the slab. The low refractive index sectors have a shape with $C_{3v}$ symmetry and are arranged in the slat member in a triangular grid pattern.

The term "a shape with $C_{3v}$ symmetry" is defined as a shape that has threefold rotational symmetry and three mirror planes.

According to the two-dimensional photonic crystal slab of the first aspect, since the range of a band gap frequency of light in a mode agrees with that of light in a mode different from the former, the slab has a photonic band gap common to light beams in different modes (a plurality of modes).

In the two-dimensional photonic crystal slab described above, the slab member preferably satisfies the inequality $0.1 \leq t/\lambda_0 \leq 0.3$, where t represents the thickness of the slab member and $\lambda_0$ represents the center wavelength of a photonic band gap.

Since the two-dimensional photonic crystal slab has such a photonic band gap common to those light beams and no high-order slab mode occurs therein, light can be prevented from leaking in the in-plane direction of the slab; hence light loss is low.

In the two-dimensional photonic crystal slab, the low refractive index sectors preferably have a shape selected from the group consisting of a regular triangular prism shape; a hexagonal prism shape, other than a regular hexagonal prism shape, formed by chamfering edges of a regular triangular prism; a shape in which a regular triangular prism has edges each having corresponding protrusions; and a shape in which a triplet of cylindrical prisms are arranged such that straight lines connecting the centers of the cylindrical prisms form a regular triangle when viewed from above.

The different modes (a plurality of the modes) may be a TE-like mode and a TM-like mode. In this case, the slab has a photonic band gap common to a light beam in the TE-like mode and a light beam in the TM-like mode.

A two-dimensional photonic crystal slab according to the present invention has a photonic band gap common to a light beam in a TE-like mode and a light beam in a TM-like mode. The two-dimensional photonic crystal slab includes a slab member containing a material having a high refractive index and also includes sectors that are periodically arranged in the slab member, contain a material having a refractive index less than that of the slab member, and define the distribution of refractive index in the slab. The low refractive index sectors have a regular triangular prism shape and are arranged in the slab member in a triangular grid pattern. The slab member satisfies the inequality $0.1 \leq t/\lambda_0 \leq 0.3$, wherein t represents the thickness of the slab member and $\lambda_0$ represents the center wavelength of a photonic band gap.

Examples of the regular triangular prism shape herein include a quasi-regular triangular prism shape in which a regular triangular prism has round edges but do not include a regular hexagonal prism shape.

Since the two-dimensional photonic crystal slab has the photonic band gap common to those light beams and no high-order slab mode occurs therein, light can be prevented from leaking in the in-plane direction of the slab; hence light loss is low.

When the ratio $t/\lambda_0$ is greater than 0.30, a high-order slab mode occurs and light loss is therefore high. In contrast, when the ratio $t/\lambda_0$ is less than 0.1, a complete band gap cannot be achieved.

The term "complete band gap" is defined as the photonic band gap common to those light beams.

When the two-dimensional photonic crystal slab has a linear defect section that is a disordered portion in a periodic structure of a photonic crystal, the slab can function as a waveguide for guiding the light beam in the TE-like mode and the light beam in the TM-like mode.

When the shape of the low refractive index sectors has $C_{3v}$ symmetry, the width of the photonic band gap can be varied in a wide range by changing the arrangement and/or the ratio L/a described below. If a shape that can be readily formed is selected, manufacturing efficiency can be increased.

In the two-dimensional photonic crystal slab, the low refractive index sectors preferably have a regular triangular prism shape and satisfy the inequality $0.7 < L/a \leq 1.0$, wherein L represents the length of edges of triangular faces of the low refractive index sectors and a represents the minimum distance between the centers of the low refractive index sectors or the grating constant.

According to the two-dimensional photonic crystal slab, there is an advantage in that the width of the photonic band gap can be increased.

When, the ratio L/a is 0.70 or less, the slab does not have a complete photonic band gap cannot. When the ratio L/a is more than 1.0, the slab cannot maintain its structure. However, even if the ratio L/a is more than 1.0, the structure thereof can be maintained by providing a support layer on at least one face of the slab.

A second aspect of the present invention provides a two-dimensional photonic crystal slab having a photonic band gap common to a light beam in a TE-like mode and a light beam in a TM-like mode. The two-dimensional photonic crystal slab includes a slab member containing a material having a high refractive index and also includes sectors that are periodically arranged in the slab member, contain a material having a refractive index less than that of the slab member, and define the distribution of refractive index in the slab. The low refractive index sectors have a cylindrical shape, a polygonal prism shape, or an elliptic cylindrical shape and are arranged in the slab member in a square grid pattern, and the slab member satisfies the inequality $0.1 \leq t/\lambda_0 \leq 0.3$, wherein t represents the thickness of the slab member and $\lambda_0$ represents the center wavelength of a photonic band gap.

Examples of the polygonal prism shape include a quasi-polygonal prism shape in which a polygonal prism has round edges.

In the two-dimensional photonic crystal slab of the second aspect, since a band gap frequency range of light in the TE-like mode agrees with that of light in the TM-like mode, the slab has a photonic band gap common to both modes. Furthermore, since a high-order slab mode does not occur, light can be prevented from leaking in the in-plane direction of the slab; hence, light loss is low.

In the two-dimensional photonic crystal slab of the second aspect, the low refractive index sectors preferably have a cylindrical shape and satisfy the inequality $0.4 \leq r/a < 0.50$, wherein r represents the radius of the low refractive index sectors and a represents the minimum distance between the centers of the low refractive index sectors or the grating constant.

According to the two-dimensional photonic crystal slab, there is an advantage in that the photonic band gap has a large width.

When the ratio r/a is less than 0.4, the slab does not have a complete photonic band gap cannot. When the ratio r/a is 0.5 or more, the slab cannot maintain its structure.

In the two-dimensional photonic crystal slab of the first aspect, the slab member may have a support layer, placed on at least one face thereof, having no low refractive index sectors.

Furthermore, in the two-dimensional photonic crystal slab of the second aspect, the slab member may have a support layer, placed on at least one face thereof, having no low refractive index sectors.

According to the two-dimensional photonic crystal slab of the first or second aspect, since the low refractive index sectors adjacent to each other can overlap one another or can be in contact with each other, the width of the photonic band gap can be varied in a wide range.

A third aspect of the present invention provides a two-dimensional photonic crystal waveguide including the two-dimensional photonic crystal slab of the first aspect. This two-dimensional photonic crystal slab includes a linear defect section that is a disordered portion in a periodic structure of a photonic crystal, extends in the Γ-J direction, (in other words, the Γ-K direction) and functions as a waveguide section for guiding light in the TE-like mode and light in the TM-like mode.

According to the two-dimensional photonic crystal waveguide of the third aspect, when a light beam in the TE-like mode and a light beam in the TM-like mode are applied to the two-dimensional photonic crystal waveguide, both light beams are prevented from being propagated through regions, containing the low refractive index sectors periodically arranged, by the effect of the photonic band gap and prevented from leaking in the in-plane direction of the slab. Since the linear defect section extends in the Γ-J direction, the light beams are prevented from leaking in the in-plane direction of the slab without depending on the polarization mode and can be propagated with low loss.

A fourth aspect of the present invention provides a two-dimensional photonic crystal waveguide including the two-dimensional photonic crystal slab of the first aspect. This two-dimensional photonic crystal slab includes a linear defect section that is a disordered portion in a periodic structure of a photonic crystal, extends in the Γ-X direction, (in other words, the Γ-M direction) and functions as a waveguide section for guiding light in the TE-like mode and light in the TM-like mode.

According to the two-dimensional photonic crystal waveguide of the fourth aspect, when a light beam in the TE-like mode and a light beam in the TM-like mode are applied to the two-dimensional photonic crystal waveguide, both light beams are prevented from being propagated through regions, containing the low refractive index sectors periodically arranged, by the effect of the photonic band gap and prevented from leaking in the in-plane direction of the slab. Since the linear defect section extends in the Γ-x direction, the light beams are prevented from leaking in the in-plane direction of the slab without depending on the polarization mode and can be propagated with low loss.

In the two-dimensional photonic crystal waveguide of the third aspect, the low refractive index sectors may be grouped into a first and a second region, which are asymmetric about the waveguide section.

According to the two-dimensional photonic crystal waveguide having the above configuration, since the low refractive index sectors are arranged in a triangular grid pattern and have a shape, other than a regular hexagonal prism shape, with $C_{3v}$ symmetry, particularly a regular triangular prism shape and the first and second regions containing the low refractive index sectors are asymmetric about the waveguide section, the modes do not overlap if the width of the waveguide section is varied.

In the two-dimensional photonic crystal waveguide of the third aspect, the low refractive index sectors may be grouped into a first and a second region, which are symmetric about the waveguide section.

According to the two-dimensional photonic crystal waveguide having the above configuration, since the low refractive index sectors are arranged in a triangular grid pattern and have a shape, other than a regular hexagonal prism shape, with $C_{3v}$ symmetry, particularly a regular triangular prism shape and the first and second regions containing the low refractive index sectors are symmetric about the waveguide section, the modes are allowed to overlap by varying the width of the waveguide section. Furthermore, a light beam having a symmetric waveform can be propagated through the waveguide section along the center thereof.

In the two-dimensional photonic crystal waveguide of the third aspect, at least one of the dispersion relation and frequency range of light is preferably controlled by varying the waveguide section width.

The two-dimensional photonic crystal waveguide is thereby allowed to function as an acceptor- or donor-type waveguide and allowed to have a desired dispersion relation and frequency range.

In the two-dimensional photonic crystal waveguide of the third aspect, the waveguide section may be allowed to function as an acceptor-type waveguide by varying the width of the waveguide section.

According to the two-dimensional photonic crystal waveguide having the above configuration, a section in which the low refractive index sectors overlap each other corresponds to a disordered portion in a periodic structure of a photonic crystal and can therefore function as a waveguide section through which light beams in the TE-like mode and light beams in the TM-like mode can be propagated.

In the two-dimensional photonic crystal waveguide of the third aspect, the two-dimensional photonic crystal slab preferably satisfies the inequality $(\sqrt{3})a\times(2/16) \leq W \leq (\sqrt{3})a\times(18/16)$, wherein W represents the width of the waveguide section and a represents the minimum distance between the centers of the low refractive index sectors or the grating constant. This is because light can be propagated through the waveguide section in a single mode.

The width of the waveguide section is herein defined as the distance between the centers of the low refractive index sectors placed at both sides of the linear defect section.

A fifth aspect of the present invention provides an optical device including the two-dimensional photonic crystal waveguide of the third aspect.

A sixth aspect of the present invention provides an optical device including the two-dimensional photonic crystal waveguide of the fourth aspect.

Those optical devices having the above configuration can function as add/drop devices such as optical add/drop photonic devices (optical add/drop multiplexing devices).

A two-dimensional photonic crystal slab of the present invention has a photonic band gap common to a light beam in the TE-like mode and a light beam in the TM-like mode, prevents the light beams from leaking in the in-plane direction of the slab, and propagates the light beams with low loss.

A two-dimensional photonic crystal waveguide of the present invention includes a two-dimensional photonic crystal slab having a photonic band gap common to a light beam in the TE-like mode and a light beam in the TM-like mode, prevents the light beams from leaking in the in-plane direction of the slab, and propagates the light beams with low loss.

DESCRIPTION OF THE PREFERRED EMBODIMENTS

Figure 1:
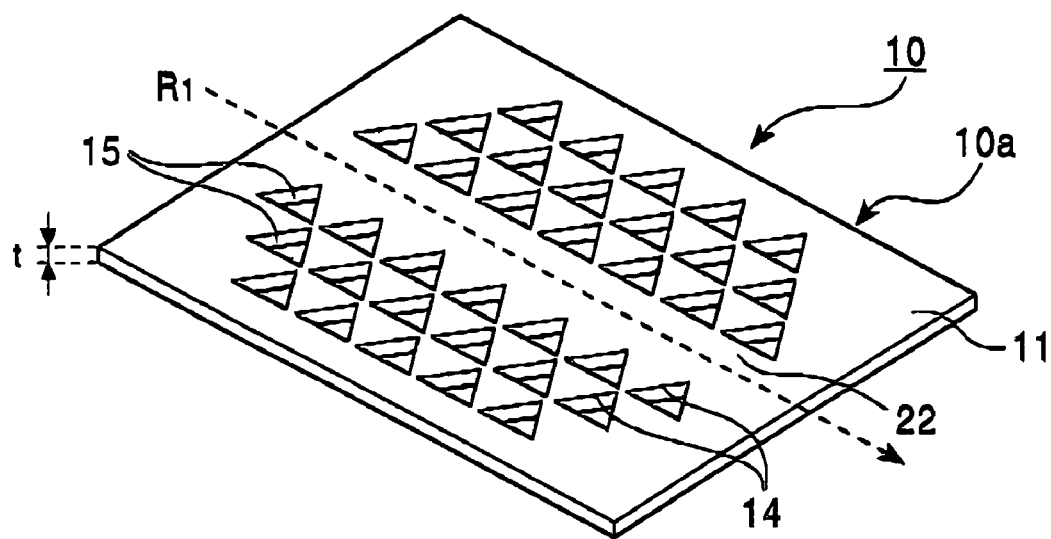
FIG. 1 is a perspective view showing a schematic configuration of a wavelength demultiplexer according to a first embodiment of the present invention.

Embodiments of the present invention will now be described in detail with reference to the accompanying drawings.

In the embodiments described below, wavelength demultiplexers that are examples of an optical device according to the present invention are described. The embodiments are not intended to limit the scope of the present invention. In the drawings herein referred to, in order to show components or portions on a recognizable scale, different scales are used depending on the size of the components or portions.

First Embodiment

Figure 2:
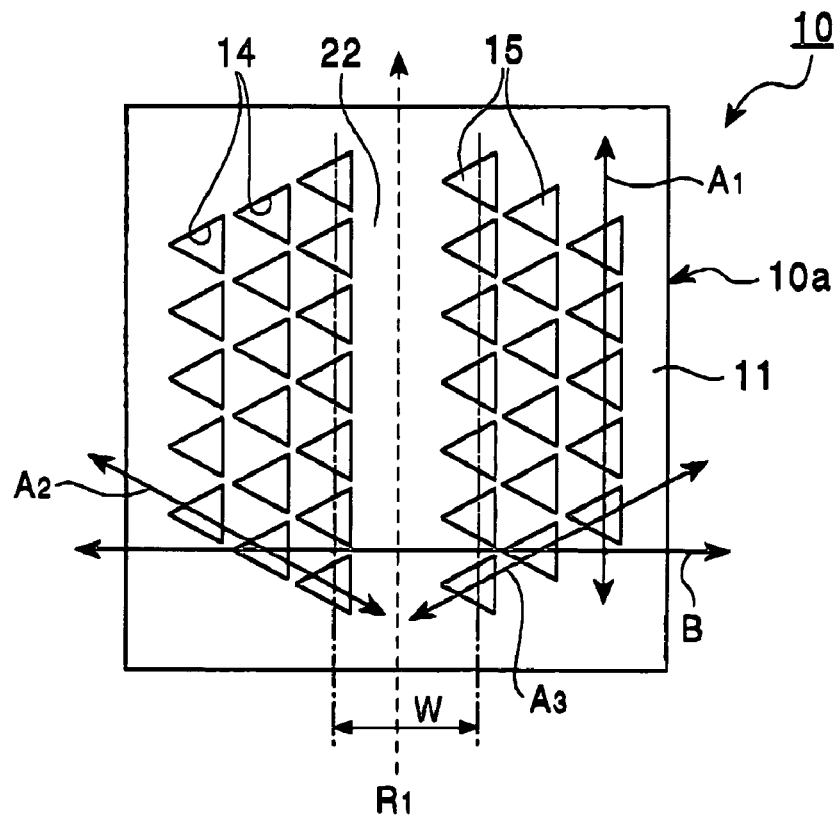
FIG. 2 is a schematic plan view showing a two-dimensional photonic crystal waveguide included in the wavelength demultiplexer shown in FIG. 1.
Figure 3:
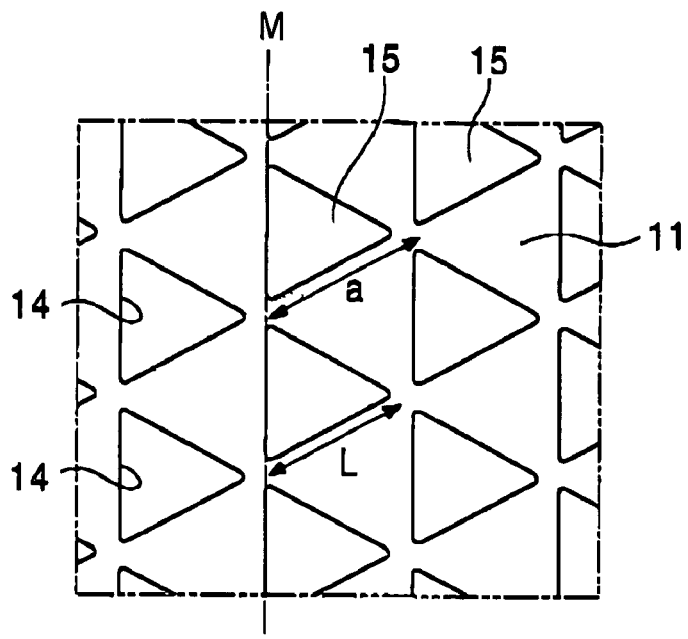
FIG. 3 is an enlarged plan view showing a plurality of low refractive index sectors arranged in the two-dimensional photonic crystal slab included in the two-dimensional photonic crystal waveguide shown in FIG. 2.

FIG. 1 is a perspective view showing a schematic configuration of a wavelength demultiplexer according to a first embodiment of the present invention. FIG. 2 is a schematic plan view showing a two-dimensional photonic crystal waveguide, included in the wavelength demultiplexer shown in FIG. 1, equipped with a two-dimensional photonic crystal slab according to the present invention. FIG. 3 is an enlarged plan view showing a plurality of low refractive index sectors arranged in the two-dimensional photonic crystal slab.

Reference numeral 10 represents the two-dimensional photonic crystal waveguide, which is a main component of the wavelength demultiplexer of this embodiment. Reference numeral 10a represents the two-dimensional photonic crystal slab. Reference numeral 15 represents the low refractive index sectors.

In the two-dimensional photonic crystal waveguide 10, the two-dimensional photonic crystal slab 10a has a linear defect section 22 that is a disordered portion in a periodic structure of a photonic crystal and extends in the Γ-J direction (in other words, the Γ-K direction). The linear defect section 22 functions as a waveguide section for propagating light. In this embodiment, since the low refractive index sectors 15 are arranged in a triangular grid pattern and have a triangular shape when viewed from above, the Γ-J direction is defined as a direction parallel to any one of sides of the low refractive index sectors 15 and examples of the Γ-J direction include directions indicated by Arrows $A_1$, $A_2$, and $A_3$ shown in FIG. 2. The linear defect section 22 extends in parallel to the direction indicated by Arrow $A_1$; however, the linear defect section 22 may extend in parallel to the direction indicated by Arrow $A_2$ or $A_3$. The direction indicated by Arrow B shown in FIG. 2 is referred to as the Γ-X direction (in other words, the Γ-M direction).

The two-dimensional photonic crystal slab 10a has a photonic band gap common to a light beam in the TE-like mode and a light beam in the TM-like mode.

The two-dimensional photonic crystal slab 10a includes a slab member 11 having high refractive index and the low refractive index sectors 15, arranged in the slab member 11 in a triangular grid pattern, having a refractive index less than that of the slab member 11. Therefore, the two-dimensional photonic crystal slab 10a has a distribution of refractive index defined by the low refractive index sectors 15 periodically arranged in the slab member 11.

Examples of a material for forming the slab member 11 include a high refractive index material, which is appropriately selected from the group consisting of a material containing at least one selected from the group consisting of InGa, AsP, GaAs, In, Ga, Al, Sb, As, Ge, Si, P, N, and O; an inorganic material such as Si; an inorganic semiconductor material; and an organic material.

The low refractive index sectors 15 contain a low refractive index material having a refractive index less than that of the high refractive index material contained in the slab member 11. In this embodiment, the low refractive index sectors 15 contain air.

In this embodiment, the two-dimensional photonic crystal slab 10a has a plurality of triangular holes 14, which are each located at corresponding grid points of the triangular grid pattern. The triangular holes 14 are filled with air, which is the low refractive index material described above. The triangular holes 14 and air form the low refractive index sectors 15, which form a periodic structure of a photonic crystal. The low refractive index sectors 15 with a triangular prism shape have $C_{3v}$ symmetry.

Sides of each low refractive index sector 15 preferably have a length of about 0.3 to 0.4 μm when the center wavelength is 1.55 μm, the length being represented by L. The pitch between the low refractive index sectors 15 adjacent to each other preferably ranges about 0.35 to 0.55 μm, the pitch being represented by a.

In this embodiment, since the low refractive index sectors 15 have a triangular prism shape, pitch a is equal to the minimum distance between the centers of the low refractive index sectors 15 placed in periodic regions; hence, the minimum center distance can also be represented by a.

A material for forming the slab member 11 and a material contained in the low refractive index regions 15 are preferably selected such that the two-dimensional photonic crystal slab 10a has a relative refractive index difference of 0.35 or more and preferably 0.45 or more. The relative refractive index difference is defined by the following formula:

$$\Delta = (n_H^2 - n_L^2)/2n_H^2$$

wherein Δ represents the relative refractive index difference of the two-dimensional photonic crystal slab 10a, $n_H$ represents the refractive index of the high refractive index material, and $n_L$ represents the refractive index of the low refractive index material. When the two-dimensional photonic crystal slab 10a has a relative refractive index difference of less than 0.35, the photonic band gap common to the light beam in the TE-like mode and the light beam in the TM-like mode has a small width, which is not preferable.

For the reason described above, the following inequality holds for the two-dimensional photonic crystal slab 10a:

$$0.15 \leq t/\lambda o \leq 0.20$$

wherein t represents the thickness of the slab member 11 and λo represents the center wavelength of a band gap.

Furthermore, the following inequality preferably holds for the two-dimensional photonic crystal slab 10a:

$$0.7 < L/a < 1.0$$

wherein L represents the length of the sides of the low refractive index sectors 15 and a represents the minimum distance between the centers of the low refractive index sectors 15 or the grating constant.

Figure 45:
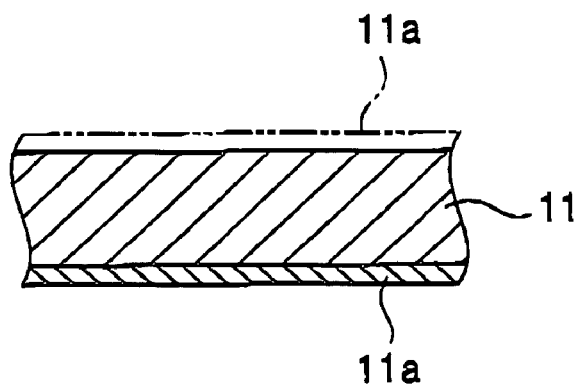
FIG. 45 is a sectional view showing a slab member equipped with a support layer useful in the present invention.

One or more support layers 11a may be placed on at least one face of the slab member 11 as shown in FIG. 45, in which one support layer 11a is placed on the lower face thereof. For the slab member 11 having the support layer 11a thereunder, the following inequality may hold because the low refractive index sectors 15 adjacent to each other can overlap one another or can be in contact with each other:

$$0.7 < L/a \leq 1.0$$

The support layer 11a has no low refractive index sectors 15.

Another support layer 11a drawn with a dotted-chain line may be placed on the upper face of the slab member 11 as shown in FIG. 45. Examples of a structure including the support layers 11a and the slab member 11 placed therebetween include a silicon substrate including $SiO_2$ layers and a Si layer placed therebetween.

The percentage of the volume of the low refractive index sectors 15 in the volume of the two-dimensional photonic crystal slab 10a is preferably more than 25% and more preferably more than 35%, the volume of the linear defect section 22 being excluded from the volume of the two-dimensional photonic crystal slab 10a. The volume percentage corresponds to the aperture ratio when the low refractive index sectors 15 contain air. When the volume percentage of the low refractive index sectors 15 is 25% or less, the photonic band gap common to the light beam in the TE-like mode and the light beam in the TM-like mode cannot be obtained.

With reference to FIG. 3, a side of each low refractive index sector 15 preferably forms a predetermined other than odd multiples of ±30° with respect to each of a group of parallel lines M, this angle being hereinafter referred to as the angle of inclination. When a side of the low refractive index sector 15 forms an angle of an odd multiple of ±30° with respect to each parallel line M, the photonic band gap cannot be obtained.

FIG. 3 shows a situation that a side of the low refractive index sector 15 forms an angle of 0° with respect to parallel line M.

With reference to FIG. 2, the linear defect section 22 extends between two regions containing the low refractive index sectors 15 and the arrangement of the low refractive index sectors 15 in the second region and that of the low refractive index sectors 15 in the first region are asymmetric about the linear defect section 22.

The two-dimensional photonic crystal waveguide 10 of this embodiment is allowed to function as a donor-type waveguide by adjusting the width of the linear defect section 22. The width of the linear defect section 22 may be referred to as the waveguide section width W because the linear defect section 22 functions as a waveguide section. The waveguide section width W is herein defined as the distance between the centers of periodic low refractive index portions placed at both sides of a linear defect. In this embodiment, since the low refractive index sectors 15 have a triangular prism shape, the waveguide section width W corresponds to the distance between the centers of the low refractive index sectors 15 located at both sides of the linear defect section 22.

In the two-dimensional photonic crystal slab 10a having the configuration described above, band gap frequencies of light in the TE-like mode agree with those of light in the TE-like mode. Therefore, the two-dimensional photonic crystal slab 10a has the photonic band gap common to those light beams. Furthermore, since a high-order slab mode does not occur, light can be prevented from leaking in the in-plane direction of the two-dimensional photonic crystal slab 10a.

When a light beam $R_1$ in the TE-like mode or the TM-like mode is applied to the two-dimensional photonic crystal slab 10a from outside, the resulting light beam $R_1$ is prevented from being propagated in the in-plane direction by the effect of the photonic band gap and confined in the direction perpendicular to the in-plane direction by the effect of total internal reflection due to low refractive index members placed on or under the two-dimensional photonic crystal waveguide 10.

In this embodiment, the two-dimensional photonic crystal slab 10a has the linear defect section 22 that is a linear area extending between the first and second regions containing the low refractive index sectors 15 arranged in a triangular grid pattern. The linear defect section 22 has a light propagation mode. The light beam $R_1$ applied to the two-dimensional photonic crystal slab 10a can be propagated through the linear defect section 22 if the light beam $R_1$ is in the TE- or TM-like mode. The linear defect section 22 can propagate light with a wide range of wavelengths with low loss. That is, the linear defect section 22 can propagate light with wavelengths in a band including several channels of wavelengths.

The two-dimensional photonic crystal waveguide 10 of this embodiment is of a donor type as described above; however, the two-dimensional photonic crystal waveguide 10 may be allowed to function as an acceptor-type waveguide by adjusting the waveguide section width W. Furthermore, at least one of the dispersion relation of the substrate 10 and the frequency range of light that can be propagated through the substrate 10 can be controlled by varying the waveguide section width W. That is, the two-dimensional photonic crystal waveguide 10 can function as an acceptor- or donor-type waveguide and has a desired dispersion relation and light with a desired frequency range can be propagated through the two-dimensional photonic crystal waveguide 10.

In order to achieve a section in which light is propagated in a single mode, the following formula preferably holds:

$$(\sqrt{3})a \times (2/16) \leq W \leq (\sqrt{3})a \times (18/16)$$

wherein W represents the waveguide section width and a represents the minimum distance between the centers of the low refractive index sectors 15 or the grating constant. When the waveguide section width W is less than $(\sqrt{3})a \times (2/16)$, the linear defect section 22 does not have any light propagation mode. When the waveguide section width W is more than $(\sqrt{3})a \times (18/16)$, light cannot be propagated in the linear defect section 22 in a single mode.

In this embodiment, since the linear defect section 22 extends in the Γ-J direction, light can be propagated through the two-dimensional photonic crystal waveguide 10 without depending on the polarization mode and prevented from leaking in the in-plane direction of the two-dimensional photonic crystal slab 10a. Therefore, the two-dimensional photonic crystal waveguide 10 can propagate both a light beam in the TE-like mode and a light beam in the TM-like mode incident on the linear defect section 22 with lower loss as compared with a two-dimensional photonic crystal waveguide including a linear defect section extending in the Γ-X or Γ-X direction.

Since the low refractive index sectors 15 are arranged in the slab member 11 in the triangular grid pattern, a waveguide section bent at an angle of 60° can be readily formed.

Figure 4:
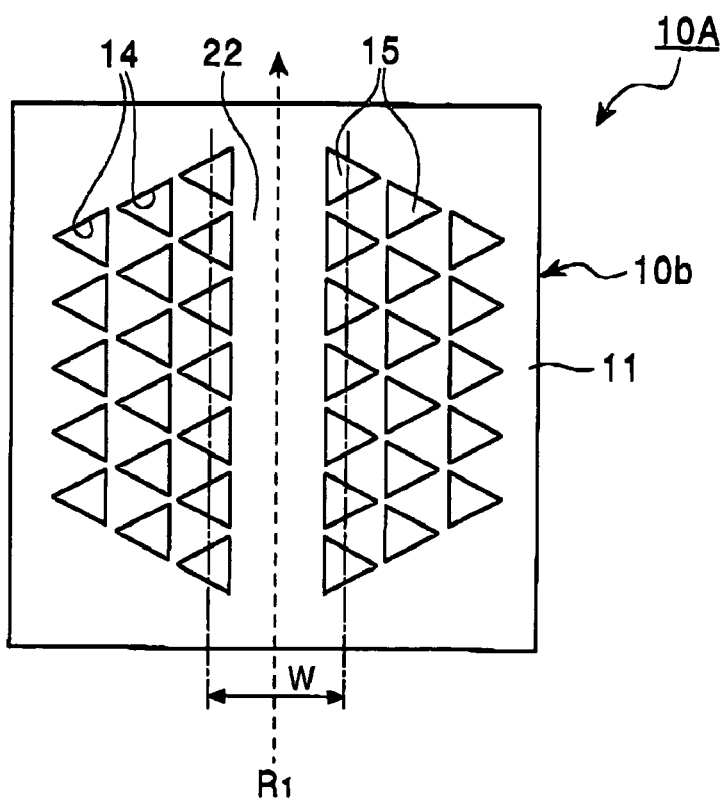
FIG. 4 is a schematic plan view showing a two-dimensional photonic crystal waveguide according to another embodiment of the present invention.

In this embodiment, the two-dimensional photonic crystal waveguide 10 has a configuration in which the arrangement of the low refractive index sectors 15 of the second region and that of the first region are asymmetric about the linear defect section 22. In another embodiment, as shown in FIG. 4, a two-dimensional photonic crystal waveguide 10A may have a configuration in which the arrangement of low refractive index sectors 15 contained in a first region and that of a second region are symmetric about a linear defect section 22. In the two-dimensional photonic crystal waveguide 10A, the modes are allowed to overlap by varying the waveguide section width W. Furthermore, a light beam with a symmetric waveform can be readily applied to the center of the linear defect section 22 and propagated therethrough. With reference to FIG. 4, reference numeral 10b represents a two-dimensional photonic crystal slab.

Figure 46:
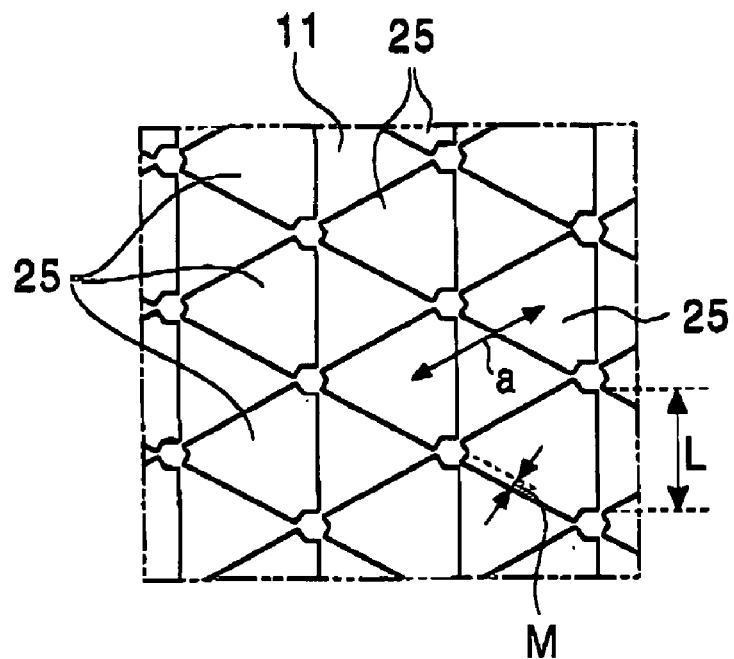
FIG. 46 is an enlarged plan view showing the arrangement of low refractive index sectors which has a shape with $C_{3v}$ symmetry and which may be arranged in the two-dimensional photonic crystal slab included in the two-dimensional photonic crystal waveguide shown in FIG. 2.
Figure 47:
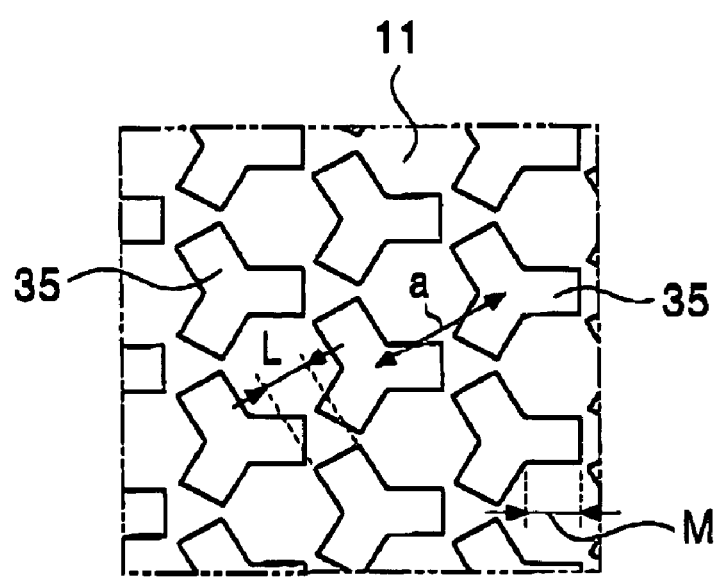
FIG. 47 is an enlarged plan view showing the arrangement of low refractive index sectors which has another shape with $C_{3v}$ symmetry and which may be arranged in the two-dimensional photonic crystal slab included in the two-dimensional photonic crystal waveguide shown in FIG. 2.

In this embodiment, the two-dimensional photonic crystal slab 10a has a distribution of refractive index defined by the low refractive index sectors 15, arranged in the slab member 11 in a triangular grid pattern, having a triangular prism shape with $C_{3v}$ symmetry. In another embodiment, as shown in FIG. 46, a two-dimensional photonic crystal slab may have a distribution of refractive index defined by low refractive index sectors 25, arranged in a slab member 11 in a triangular grid pattern, having a triangular prism shape in which a triangular prism has lateral faces each having corresponding protrusions (a triangular shape in horizontal cross section in which vertices are concave or a triangular prism shape in which a triangular prism has concave edges). Alternatively, as shown in FIG. 47, a two-dimensional photonic crystal slab may have a distribution of refractive index defined by low refractive index sectors 35 (low refractive index sectors having a triangular prism shape in which edges each have corresponding flat protrusions), arranged in a slab member 11 in a triangular grid pattern, having a Y-shape (propeller shape) in cross section. Furthermore, as shown in FIG. 48, a two-dimensional photonic crystal slab may have a distribution of refractive index defined by low refractive index sectors 45 each consisting of three cylindrical sub-sectors 45a, 45b, and 45c arranged in such a manner that lines each joining the two centers of the cylindrical sub-sectors 45a, 45b, and 45c form a regular triangle.

Figure 48:
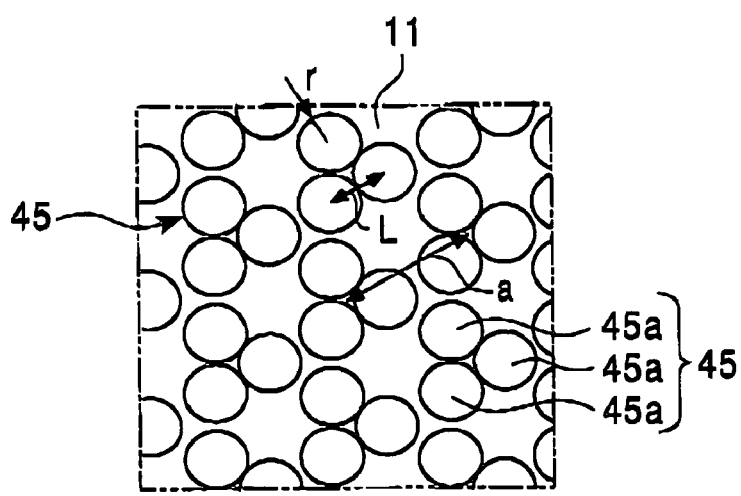
FIG. 48 is an enlarged plan view showing the arrangement of low refractive index sectors which has another shape with $C_{3v}$ symmetry and which may be arranged in the two-dimensional photonic crystal slab included in the two-dimensional photonic crystal waveguide shown in FIG. 2.

The low refractive index sectors shown in FIGS. 46, 47, and 48 have a shape with $C_{3v}$ symmetry. With reference to FIG. 46, L represents the length of a longer edge of each protrusion, M represents the length of a shorter edge of the protrusion, and a represents the minimum distance between the centers of the low refractive index sectors 25 or the grating constant. With reference to FIG. 47, L represents the width of each protrusion, M represents the length the protrusion, and a represents the minimum distance between the centers of the low refractive index sectors 35 or the grating constant. With reference to FIG. 48, L represents the distance between the centers of the cylindrical sub-sectors 45a, 45b, and 45c, r represents the radius of end faces of the cylindrical sub-sectors 45a, 45b, and 45c, and a represents the minimum distance between the centers of the low refractive index sectors 45 or the grating constant.

Second Embodiment

Figure 5:
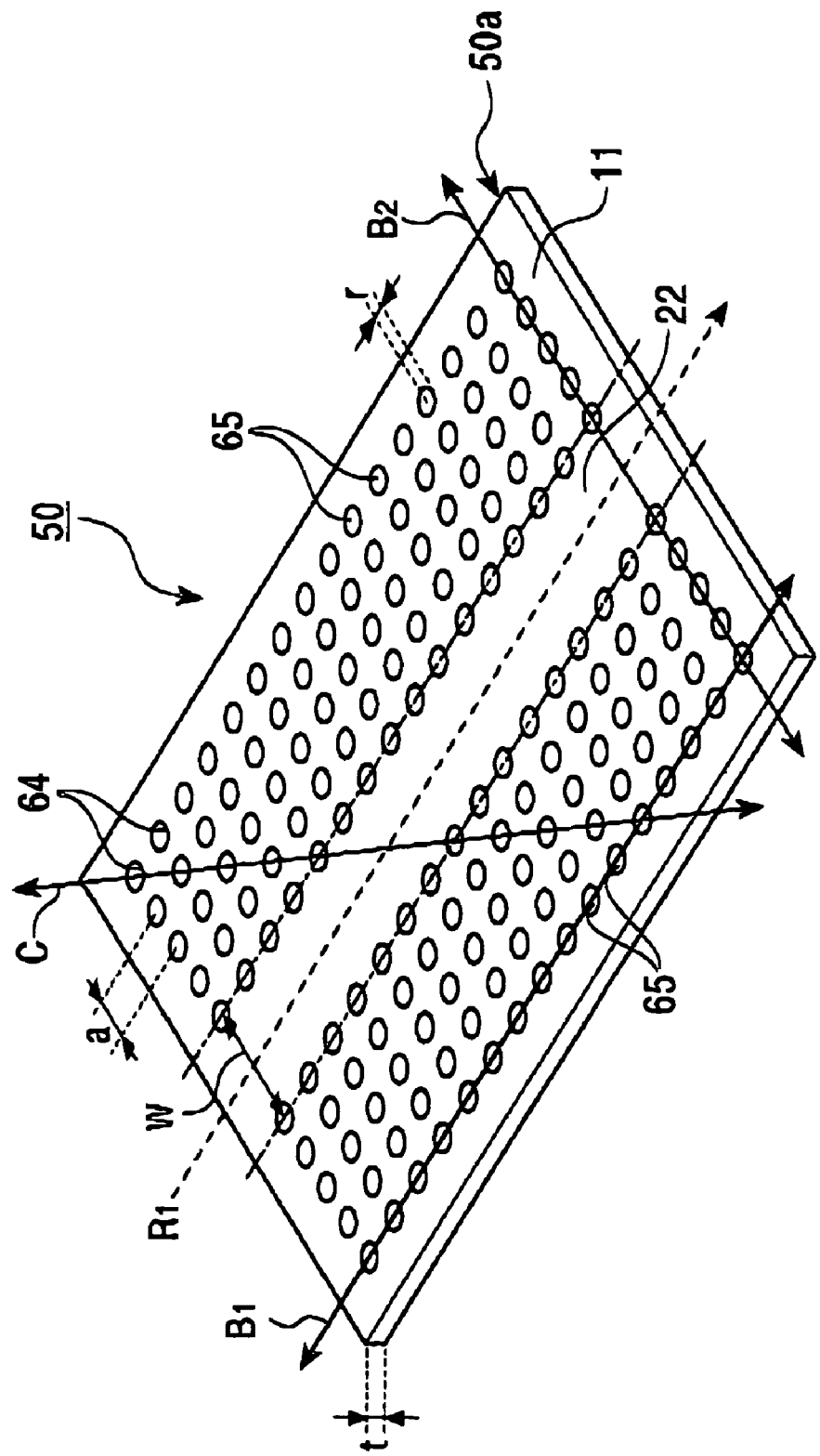
FIG. 5 is a perspective view showing a schematic configuration of a wavelength demultiplexer according to a second embodiment of the present invention.

FIG. 5 is a perspective view showing a schematic configuration of a wavelength demultiplexer according to a second embodiment of the present invention.

The wavelength demultiplexer of the second embodiment is different from the wavelength demultiplexer of the first embodiment in that the wavelength demultiplexer of the second embodiment includes a two-dimensional photonic crystal waveguide 50 including a two-dimensional photonic crystal slab 50a that includes a slab member 11, low refractive index sectors 65 arranged in the slab member 11 in a square grid pattern, a linear defect section 22 functioning as a waveguide section. In particular, the arrangement of the low refractive index sectors 65 of the second embodiment is different from that of the low refractive index sectors 15 of the first embodiment and the direction of the linear defect section 22 of the second embodiment is different from that of the linear defect section 22 of the first embodiment.

The two-dimensional photonic crystal slab 50a has a distribution of refractive index defined by the low refractive index sectors 65.

In this embodiment, the two-dimensional photonic crystal slab 50a has a plurality of circular holes 64, which are each located at corresponding grid points of the square grid pattern. The circular holes 64 are filled with air, which is a low refractive index material. The circular holes 64 and air form the, low refractive index sectors 65, which form a periodic structure of a photonic crystal.

For the reason described above, the following inequality holds for the two-dimensional photonic crystal slab 50a:

$$0.1 \leq t/\lambda o \leq 0.3$$

wherein t represents the thickness of slab member 11 and λo represents the center wavelength of a band gap.

Furthermore, the following inequality preferably holds:

$$0.4 \leq r/a \leq 0.5$$

wherein r represents the radius of the low refractive index sectors 65 and a represents the minimum distance between the centers of the low refractive index sectors 65 or the grating constant.

The percentage of the volume of the low refractive index sectors 65 in the volume of the two-dimensional photonic crystal slab 50a is preferably more than, 25%, the volume of the linear defect section 22 being excluded from that of the two-dimensional photonic crystal slab 50a.

In the two-dimensional photonic crystal slab 50a, band gap frequencies of light in the TE-like mode agree with those of light in the TE-like mode. Therefore, the two-dimensional photonic crystal slab 50a has a photonic band gap common to a light beam in the TE-like mode and a light beam in the TM-like mode. Furthermore, since a high-order slab mode does not occur, light can be prevented from leaking in the in-plane direction of the two-dimensional photonic crystal slab 50a; hence, light loss is low.

The two-dimensional photonic crystal slab 50a has a linear defect section 22 that is a disordered portion in a periodic structure of a photonic crystal and extends in the Γ-X direction. The linear defect section 22 functions as a waveguide section for propagating light. In this embodiment, since the low refractive index sectors 15 are arranged in the square grid pattern and have a circular shape when viewed from above, the Γ-J direction is defined as a direction parallel to directions indicated by Arrows $B_1$ and $B_2$ shown in FIG. 5. The linear defect section 22 extends in parallel to the direction indicated by Arrow $B_1$; however, the linear defect section 22 may extend in parallel to the direction indicated by Arrow $B_2$. The direction indicated by Arrow C shown in FIG. 5 is referred to as the Γ-M direction.

In this embodiment, as shown in FIG. 5, the linear defect section 22 extends between two regions containing the low refractive index sectors 65 and the arrangement of the low refractive index sectors 65 in the second region and that of the low refractive index sectors 65 in the first region are symmetric about the linear defect section 22.

In this embodiment, since the two-dimensional photonic crystal slab 50a includes the linear defect section 22 extending in the Γ-X direction, the two-dimensional photonic crystal waveguide 50 can propagate light without depending on the polarization mode and confine light in the in-plane direction of the two-dimensional photonic crystal slab 50a. Therefore, the two-dimensional photonic crystal waveguide 50 can propagate both a light beam in the TE-like mode and a light beam in the TE-like mode with low loss.

Since the low refractive index sectors 65 are arranged in the slab member 11 in the square grid pattern, a waveguide section bent at a right angle can be readily formed.

In this embodiment, the low refractive index sectors 65 have a cylindrical shape and may have a triangular prism shape, a rectangular prism shape, a pentagonal prism shape, or a hexagonal prism shape.

In the first and second embodiments, the two-dimensional photonic crystal waveguides each have one linear defect section only and may have two or more linear defect sections.

EXAMPLE 1

Various two-dimensional photonic crystal slabs having substantially the same configuration as that shown in FIG. 1, 2, or 3 were prepared except that a plurality of low refractive index sectors having a triangular prism shape were formed in each two-dimensional photonic crystal slab such that the angle of inclination θ formed by a side of each low refractive index sector and each of a group of parallel lines M was varied within a range of −30° to +30°. The two-dimensional photonic crystal slabs were prepared such that the following conditions are satisfied: Δ=0.46, L/a=0.85, and t/a=0.80.

Figure 7:
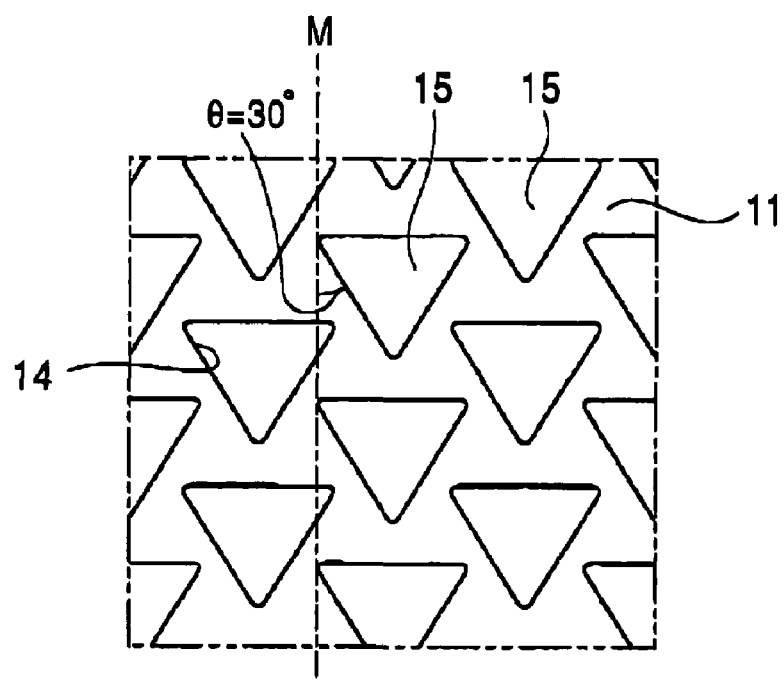
FIG. 7 is an illustration showing the arrangement of low refractive index sectors each having an angle of inclination of 30°.
Figure 8:
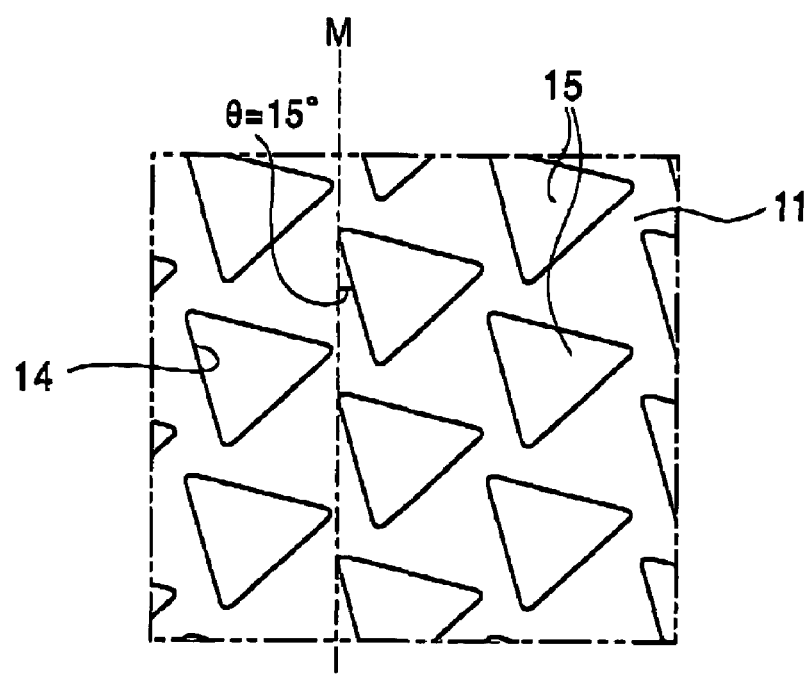
FIG. 8 is an illustration showing the arrangement of low refractive index sectors each having an angle of inclination of 15°.
Figure 9:
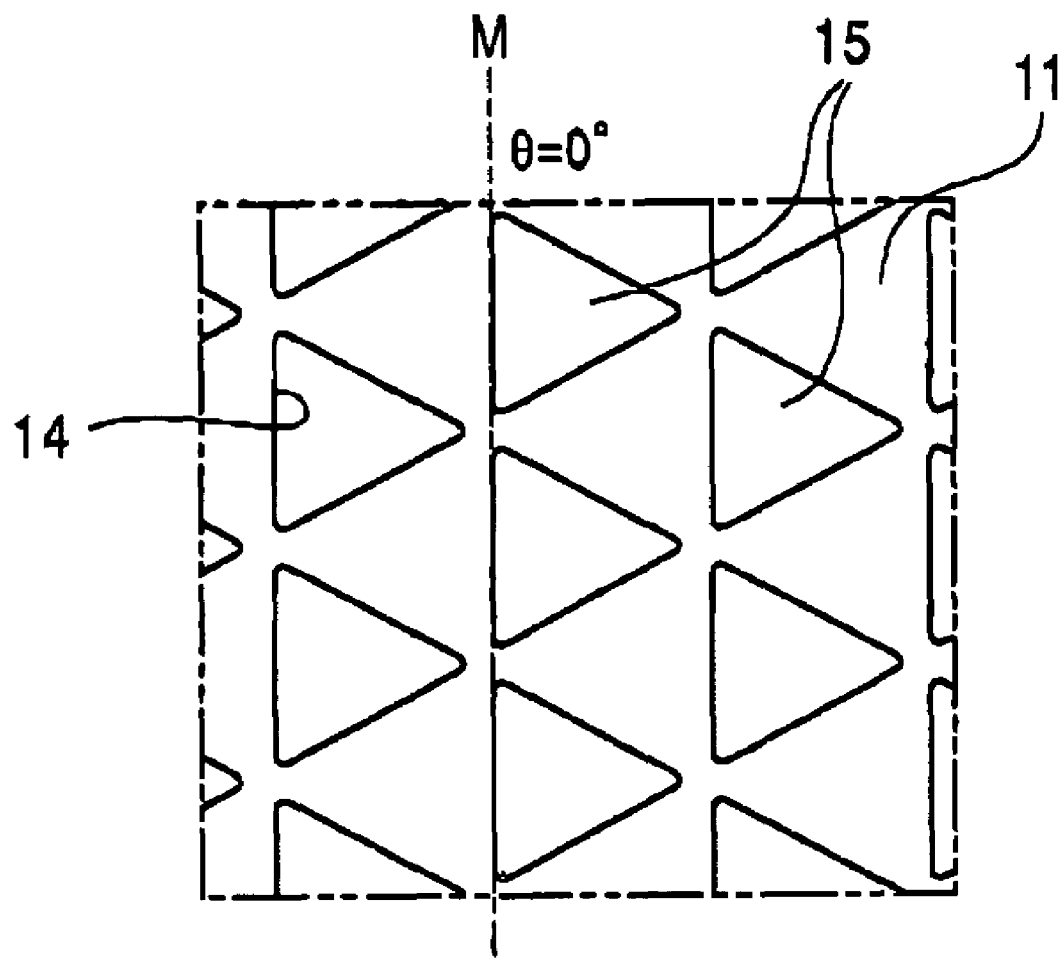
FIG. 9 is an illustration showing the arrangement of low refractive index sectors each having an angle of inclination of 0°.

The relationship between the band gap and the angle of inclination was investigated in such a manner that a light beam having a wavelength of 1.55 μm was applied to each of the various two-dimensional photonic crystal slabs from outside. FIG. 7 shows the arrangement of the low refractive index sectors having an angle of inclination of 30°. FIG. 8 shows the arrangement of the low refractive index sectors having an angle of inclination of 15°. FIG. 9 shows the arrangement of the low refractive index sectors having an angle of inclination of 0°.

Figure 6:
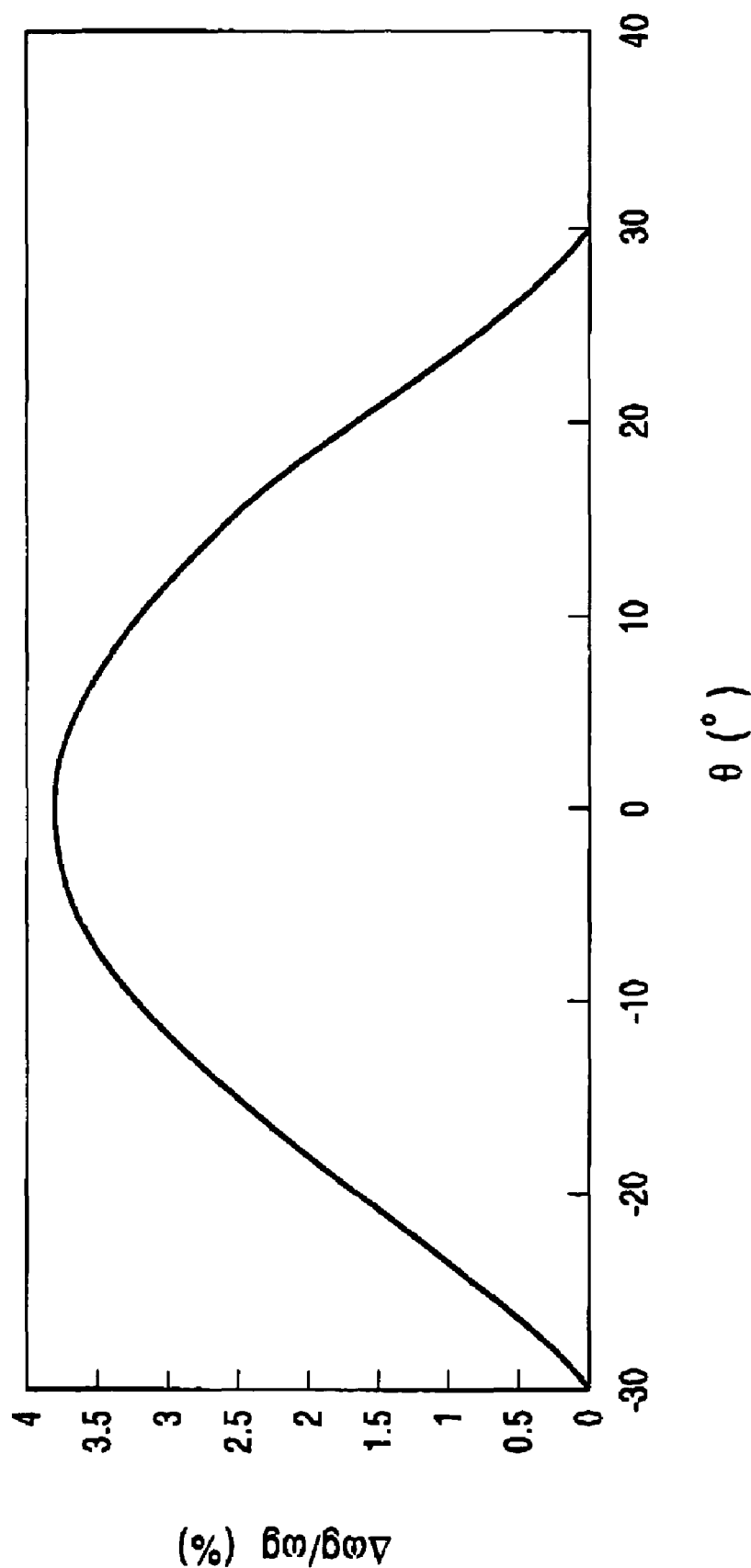
FIG. 6 is a graph showing the relationship between a band gap and the angle of inclination of each low refractive index sector.

With reference to the graph shown in FIG. 6, the horizontal axis shows the angle of inclination θ and the vertical axis shows the ratio of the range Δωg of the band gap frequencies to the center value ωg of band gap frequencies.

FIG. 6 shows that when the angle of inclination θ is −30° or +30°, the ratio Δωg/ωg is zero, that is, no photonic band gap exists. When the angle of inclination θ is greater than −30° and less than +30', a photonic band gap exists. In particular, when the angle of inclination θ is 0°, the ratio Δωg/ωg has the maximum, that is, the range of band gap frequencies is very wide.

EXAMPLE 2

Various two-dimensional photonic crystal slabs having substantially the same configuration as that shown in FIG. 1, 2, or 3 were prepared except that the volume percentage (the aperture ratio) of low refractive index sectors having a triangular prism shape were varied. The two-dimensional photonic crystal slabs were prepared such that the following condition is satisfied: Δ=0.46.

The relationship between the two-dimensional complete photonic band gap and the thickness of the two-dimensional photonic crystal slabs was investigated in such a manner that a beam of light in the TE-like mode and a beam of light in the TM-like mode were applied to each of the various two-dimensional photonic crystal slabs from outside. Obtained results are shown in FIGS. 10 to 15. The ratio t/a and the ratio t/λo of the obtained two-dimensional photonic crystal slabs are also shown in FIGS. 10 to 15.

With reference to graphs shown in FIGS. 10 to 15, the horizontal axis shows the aperture ratio of the low refractive index sectors containing air and the vertical axis shows the normalized frequency. In each graph, a domain between two dashed lines represents the relationship between the aperture ratio and a band gap of each two-dimensional photonic crystal slab to which a light beam in the TM-like mode is applied and a domain between two solid lines represents the relationship between the aperture ratio and a band gap of each two-dimensional photonic crystal slab to which a light beam in the TE-like mode is applied. In the graph, the overlap (the diagonally shaded area) among the domain between the dashed lines and the domain between the solid lines represents the relationship between the aperture ratio and a band gap common to the light beam in the TM-like mode and the light beam in the TE-like mode.

Figure 10:
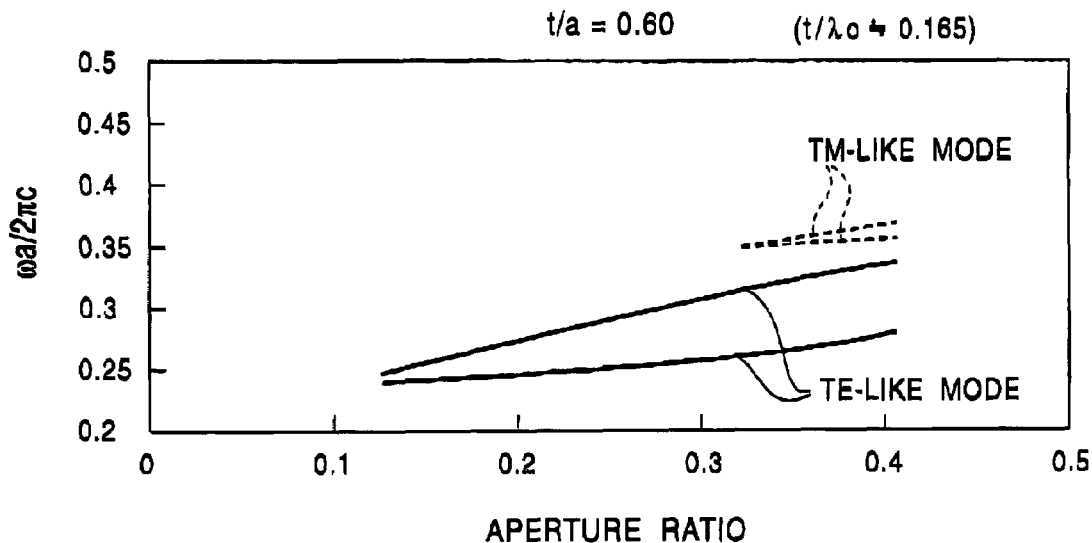
FIG. 10 is a graph showing the relationship between the aperture ratio and the width of a complete photonic band gap of a two-dimensional photonic crystal slab that satisfies the equation t/a=0.60.
Figure 11:
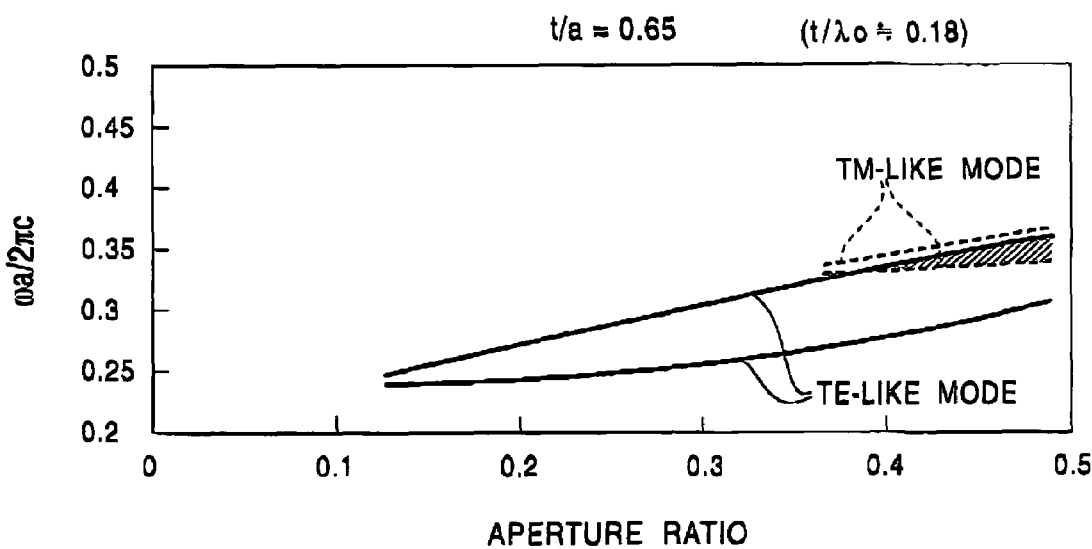
FIG. 11 is a graph showing the relationship between the aperture ratio and the width of a complete photonic band gap of a two-dimensional photonic crystal slab that satisfies the equation t/a=0.65.
Figure 15:
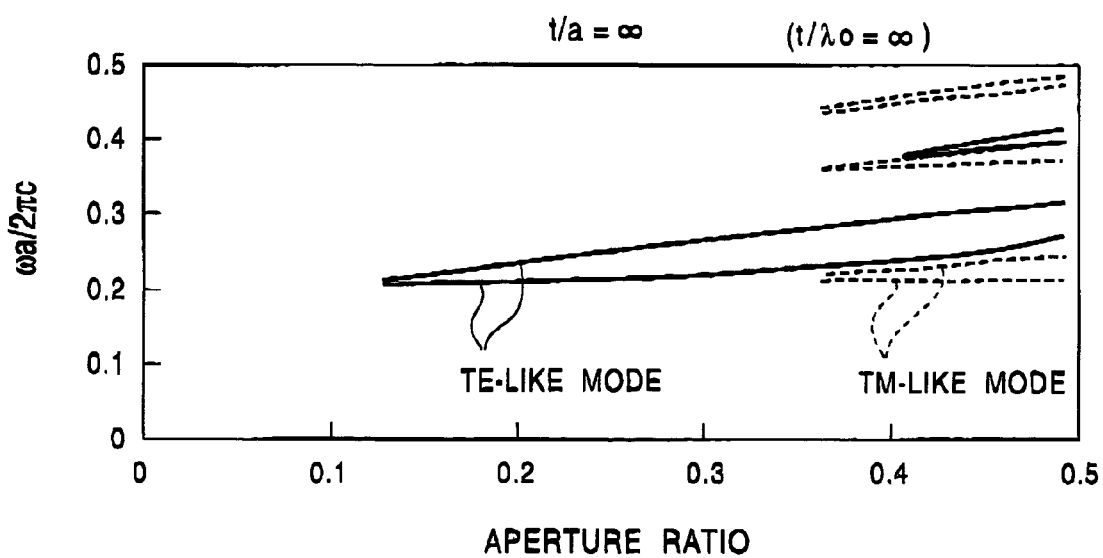
FIG. 15 is a graph showing the relationship between the aperture ratio and the width of a complete photonic band gap of a two-dimensional photonic crystal slab that satisfies the equation t/a=∞.

The two-dimensional photonic crystal slabs in which the ratio t/a is equal to 0.60 as shown in FIG. 10 and the two-dimensional photonic crystal slabs in which the ratio t/a is ∞ as shown in FIG. 15 do not have any band gap common to the light beam in the TM-like mode and the light beam in the TE-like mode without depending on the aperture ratio.

In contrast, the two-dimensional photonic crystal slabs in which the ratio t/a ranges from 0.65 to 1.50 as shown in FIGS. 11 to 14 have a band gap common to the light beam in the TM-like mode and the light beam in the TE-like mode, that is, those slabs have a complete two-dimensional photonic band gap, which is defined as such a band gap common to the light beam in the TM-like mode and the light beam in the TE-like mode.

Figure 12:
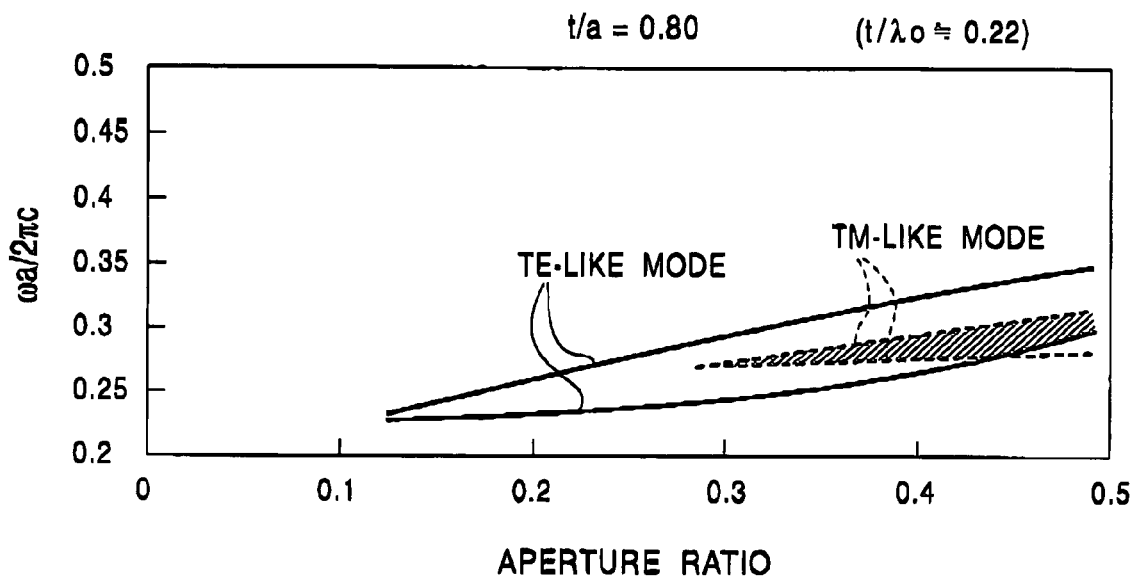
FIG. 12 is a graph showing the relationship between the aperture ratio and the width of a complete photonic band gap of a two-dimensional photonic crystal slab that satisfies the equation t/a=0.80.
Figure 13:
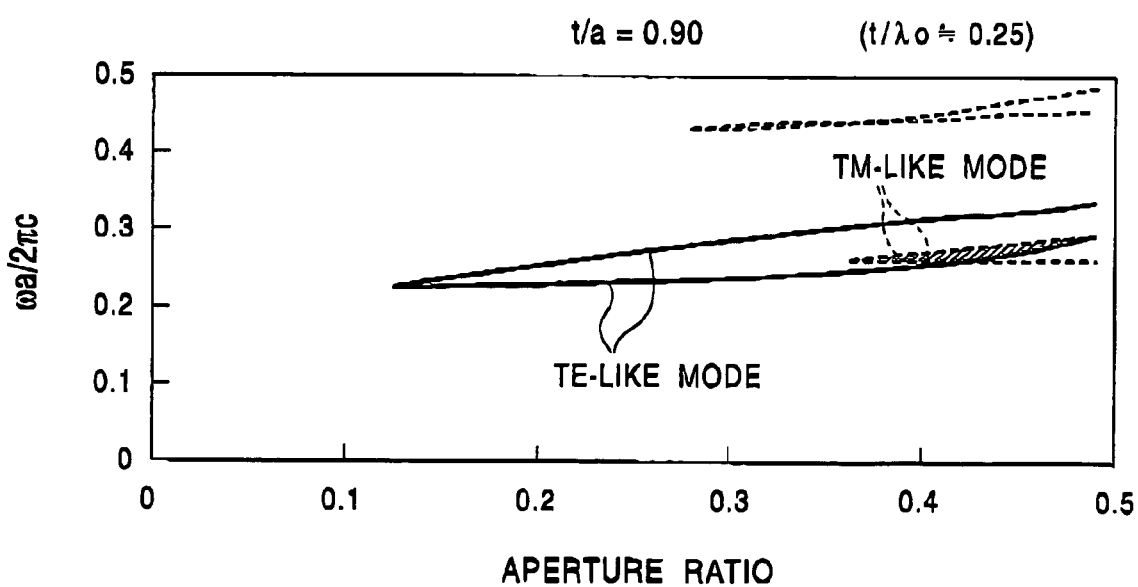
FIG. 13 is a graph showing the relationship between the aperture ratio and the width of a complete photonic band gap of a two-dimensional photonic crystal slab that satisfies the equation t/a=0.90.
Figure 14:
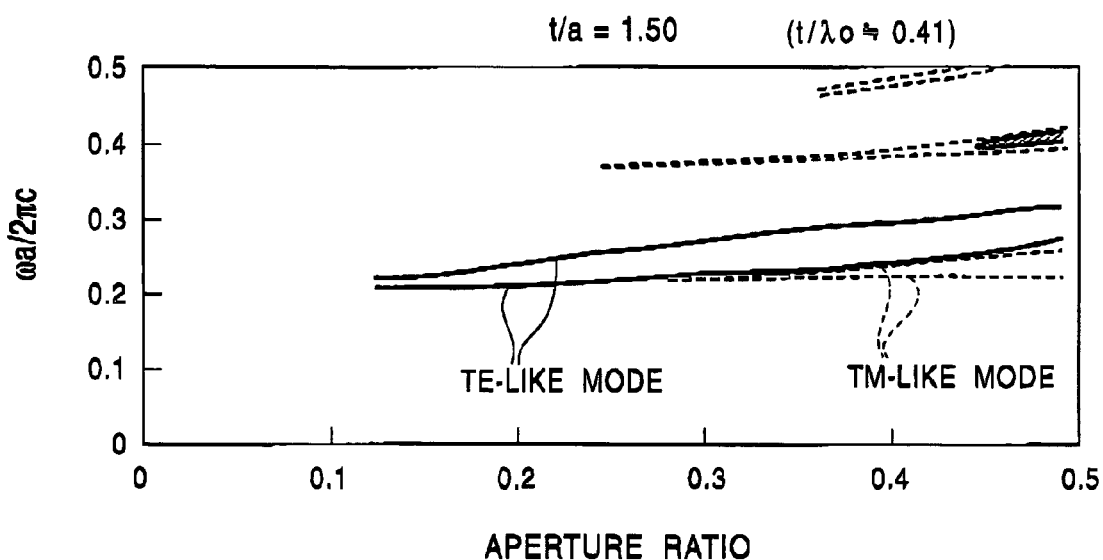
FIG. 14 is a graph showing the relationship between the aperture ratio and the width of a complete photonic band gap of a two-dimensional photonic crystal slab that satisfies the equation t/a=1.50.

The two-dimensional photonic crystal slabs in which the ratio t/a is equal to 0.80 as shown in FIG. 12 have a wide complete two-dimensional photonic band gap.

EXAMPLE 3

Various two-dimensional photonic crystal slabs having substantially the same configuration as that shown in FIG. 1, 2, or 3 were prepared except that the thickness t of the slabs and the ratio L/a were varied. The ratio L/a was varied by varying the value of a to allow the center wavelength λo of a band gap to be equal to about 1,550 nm.

Figure 16:
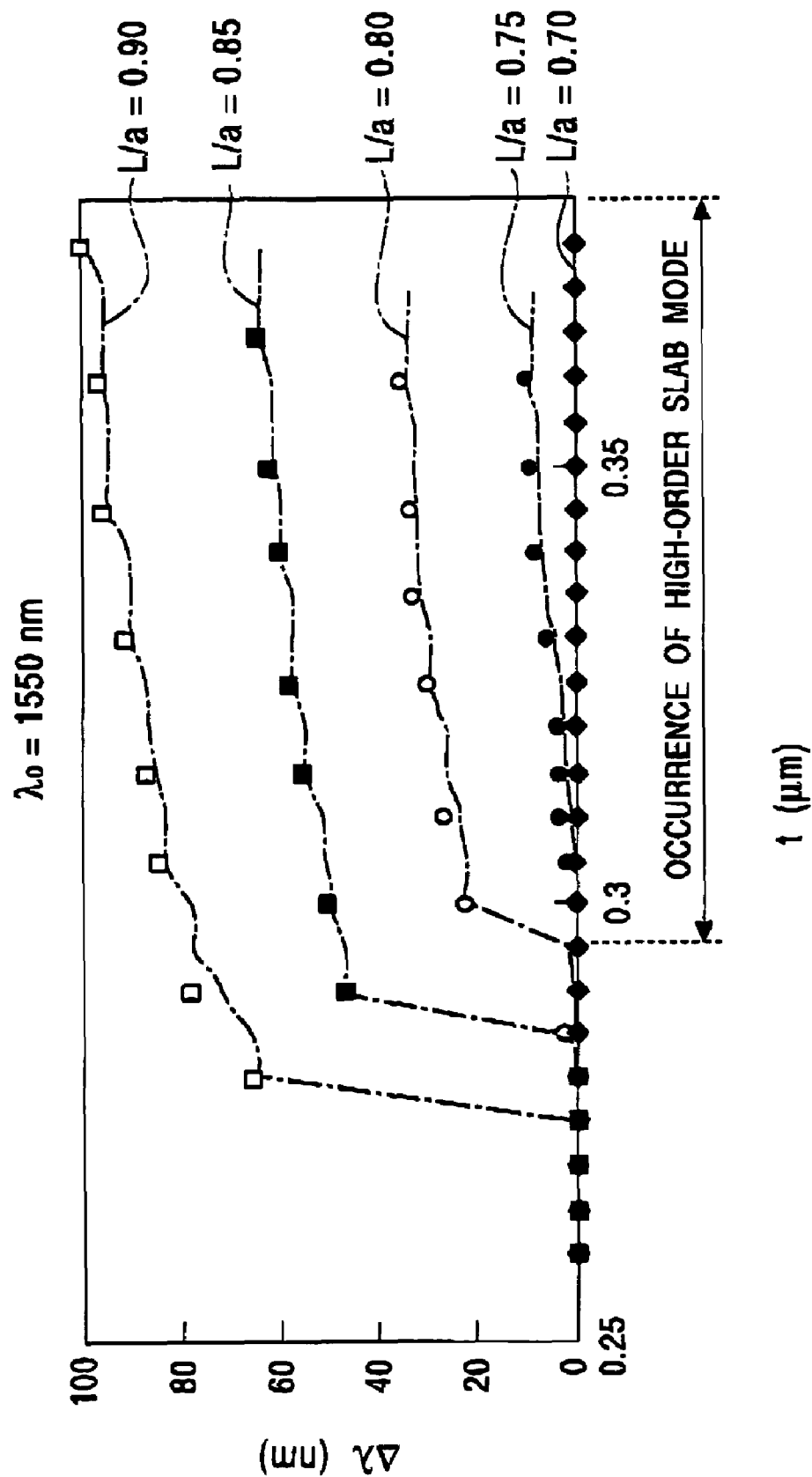
FIG. 16 is a graph showing the relationship between the thickness of a two-dimensional photonic crystal slab and the width of a complete photonic band gap of the slab, the thickness being represented by t, the width being represented by $\Delta\lambda$.
Figure 17:
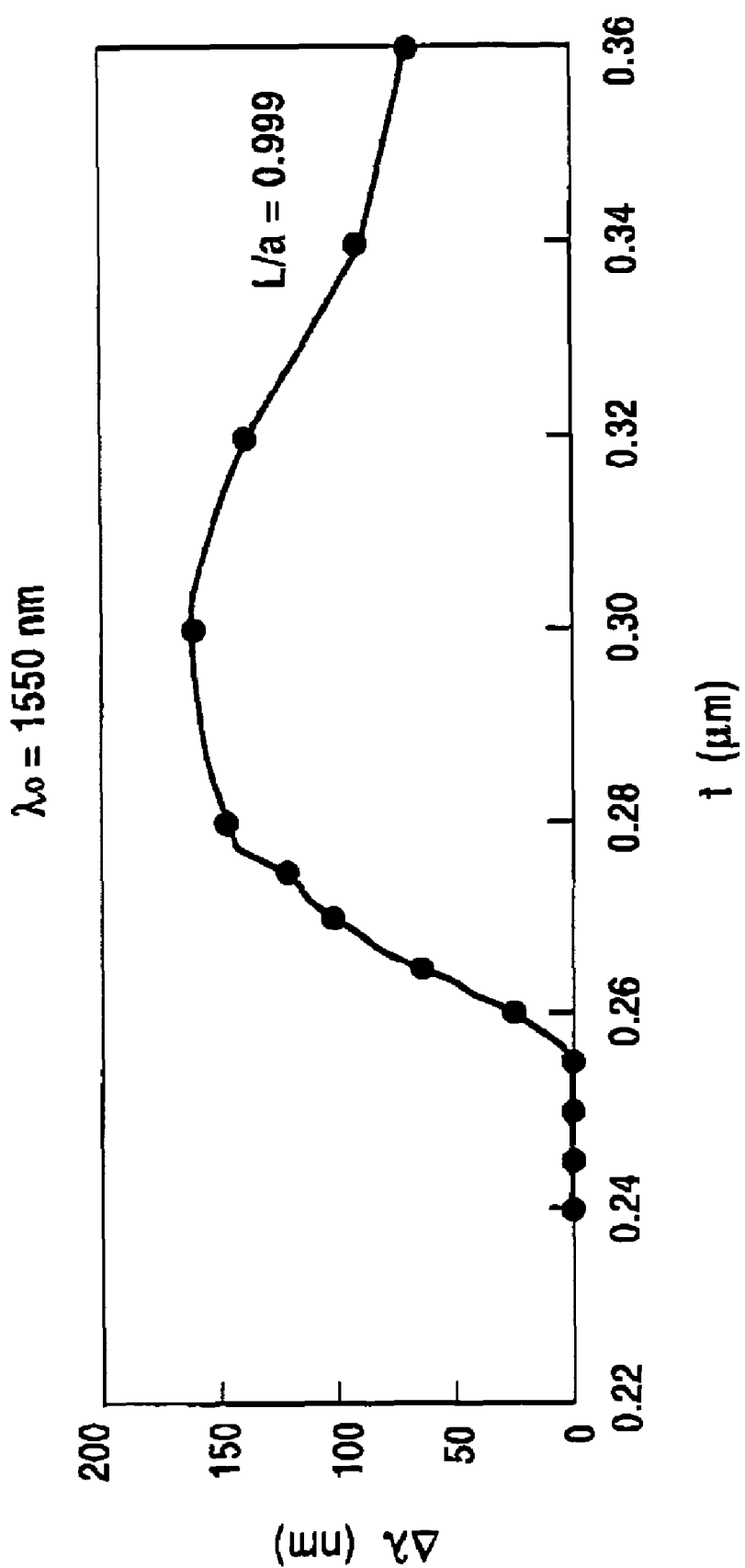
FIG. 17 is a graph showing the relationship between the thickness of a two-dimensional photonic crystal slab and the width of a complete photonic band gap of the slab, the thickness being represented by t, the width being represented by $\Delta\lambda$.
Figure 18A:
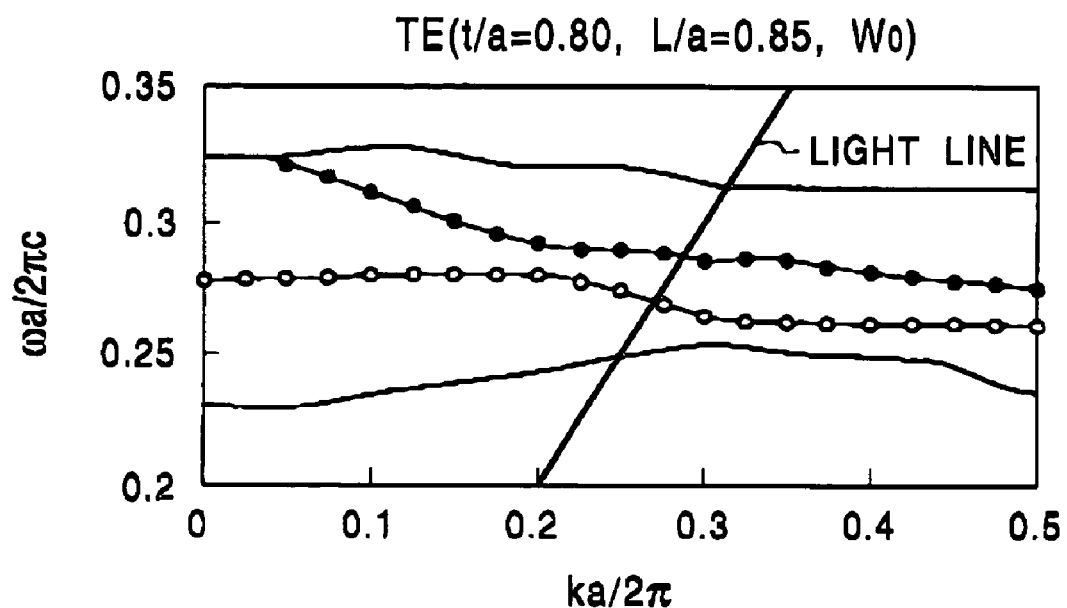
FIG. 18A is a graph showing the dispersion relation of a two-dimensional photonic crystal waveguide which has a waveguide section with a width of $W_0$ equal to $(\sqrt{3})a$ and to which a light beam in the TE-like mode is applied.
Figure 18B:
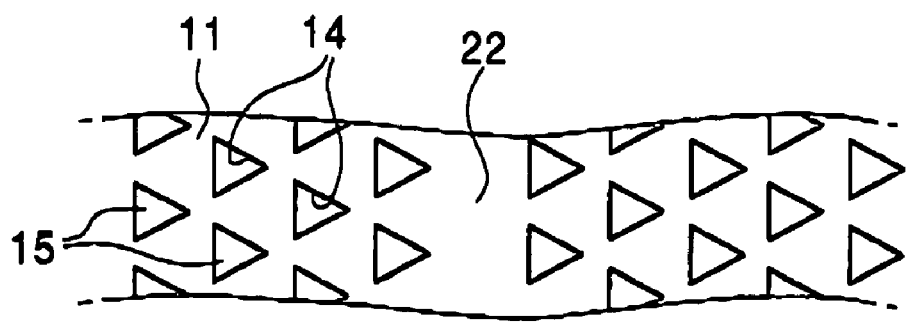
FIG. 18B is a fragmentary plan view showing the waveguide section.
Figure 19A:
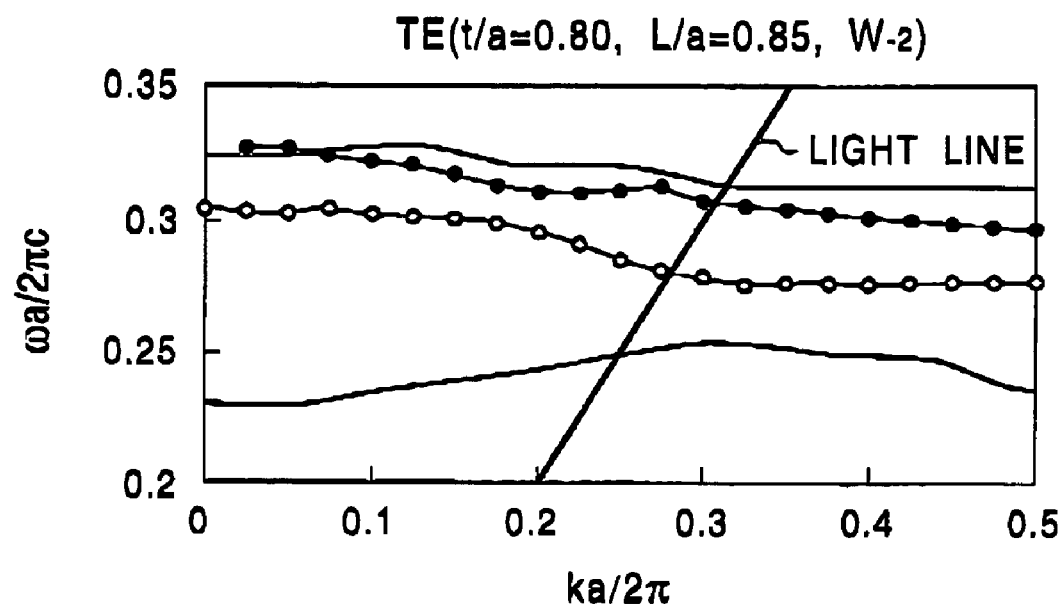
FIG. 19A is a graph showing the dispersion relation of a two-dimensional photonic crystal waveguide which has a waveguide section with a width of $W_{-2}$ equal to $(\sqrt{3})a\times(14/16)$ and to which a light beam in the TE-like mode is applied.
Figure 19B:
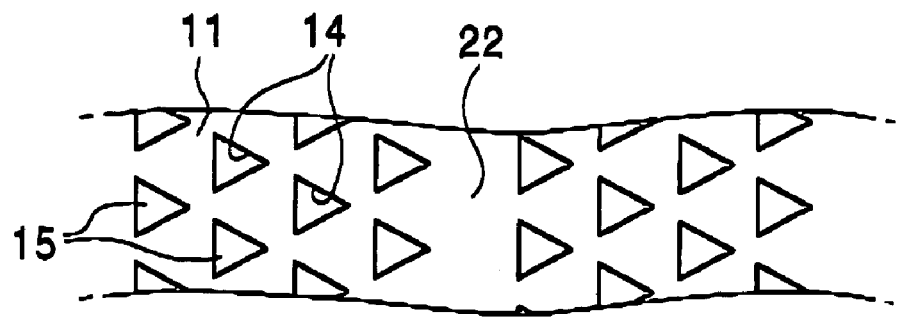
FIG. 19B is a fragmentary plan view showing the waveguide section.
Figure 20A:
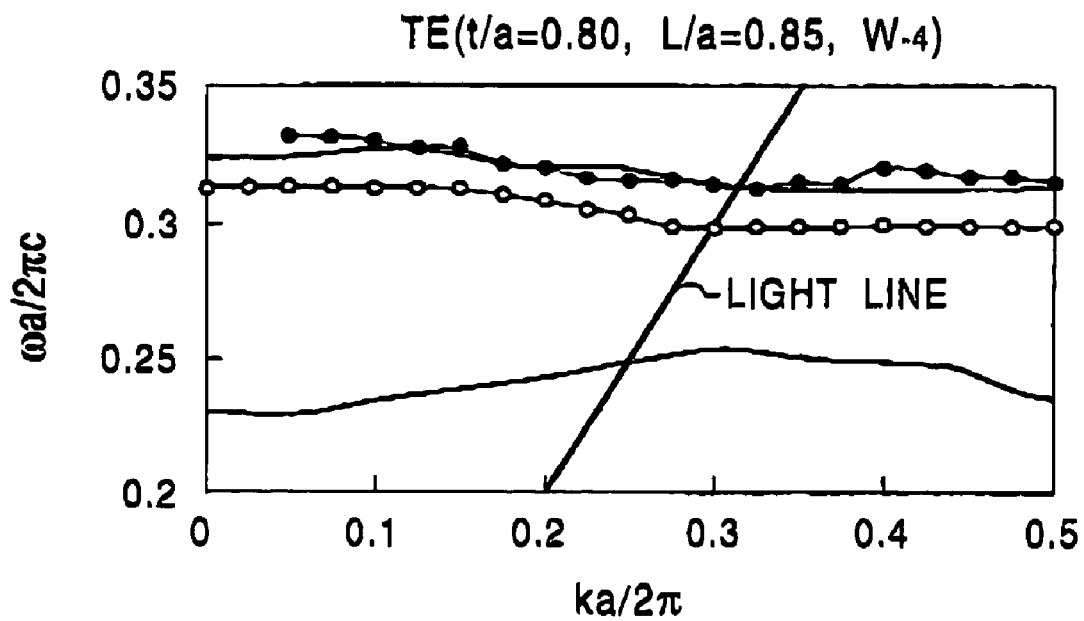
FIG. 20A is a graph showing the dispersion relation of a two-dimensional photonic crystal waveguide which has a waveguide section with a width of $W_{-4}$ equal to $(\sqrt{3})a\times(12/16)$ and to which a light beam in the TE-like mode is applied.
Figure 20B:
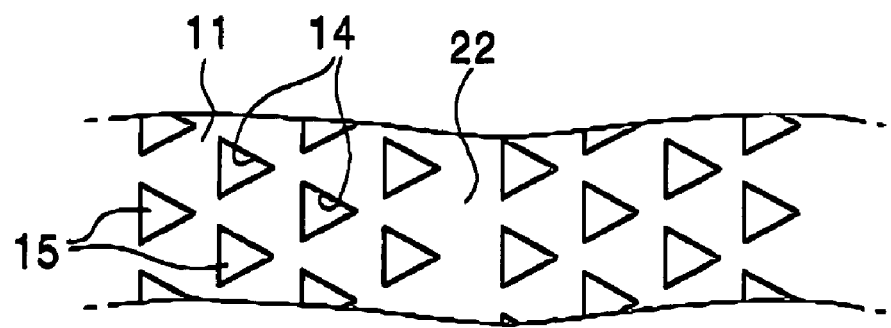
FIG. 20B is a fragmentary plan view showing the waveguide section.
Figure 21A:
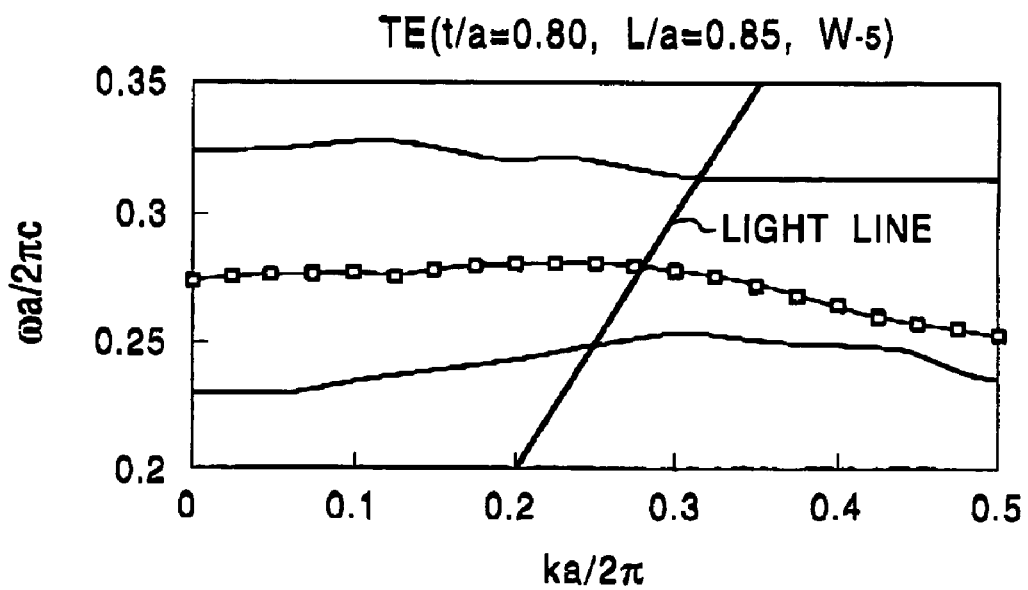
FIG. 21A is a graph showing the dispersion relation of a two-dimensional photonic crystal waveguide which has a waveguide section with a width of $W_{-5}$ equal to $(\sqrt{3})a\times(11/16)$ and to which a light beam in the TE-like mode is applied.
Figure 21B:
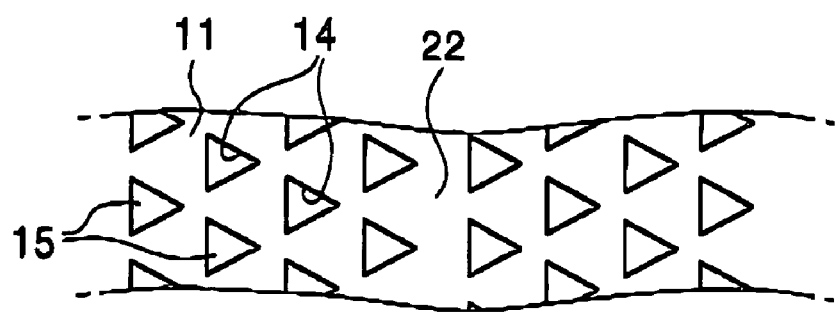
FIG. 21B is a fragmentary plan view showing the waveguide section.
Figure 22A:
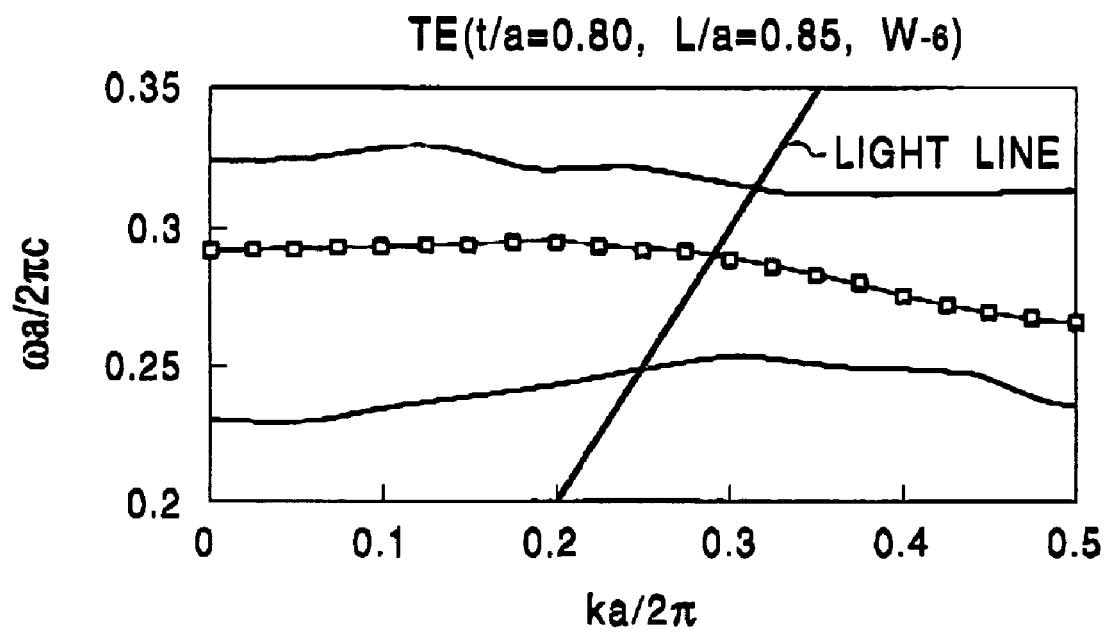
FIG. 22A is a graph showing the dispersion relation of a two-dimensional photonic crystal waveguide which has a waveguide section with a width of $W_{-6}$ equal to $(\sqrt{3})a\times(10/16)$ and to which a light beam in the TE-like mode is applied.
Figure 22B:
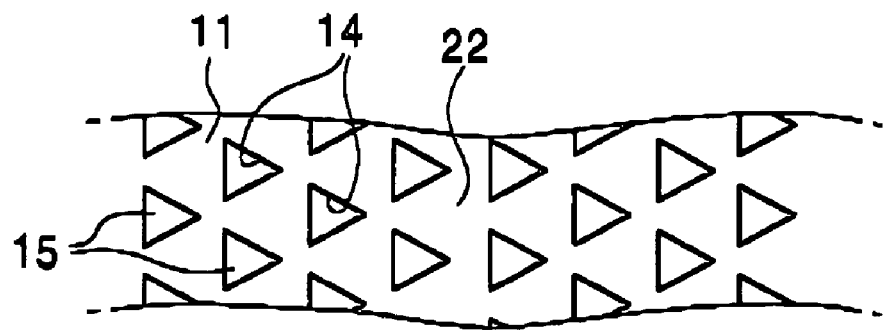
FIG. 22B is a fragmentary plan view showing the waveguide section.
Figure 23A:
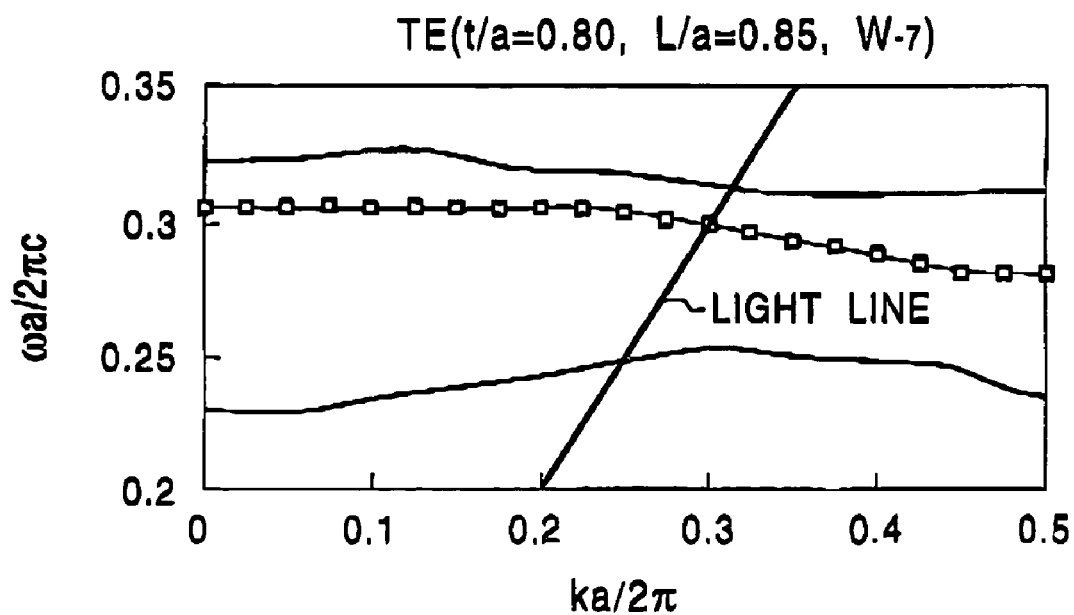
FIG. 23A is a graph showing the dispersion relation of a two-dimensional photonic crystal waveguide which has a waveguide section with a width of $W_{-7}$ equal to $(\sqrt{3})a\times(9/16)$ and to which a light beam in the TE-like mode is applied.
Figure 23B:
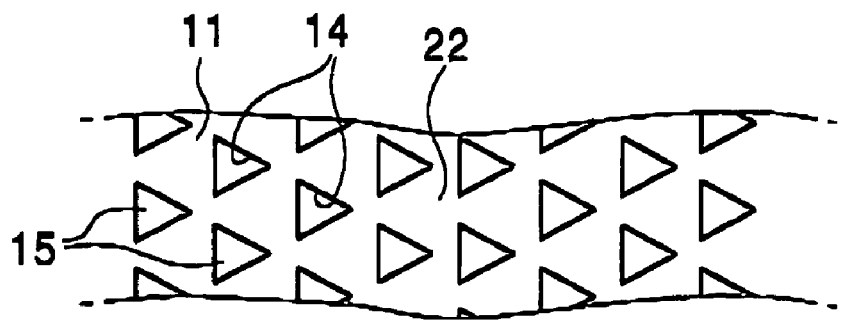
FIG. 23B is a fragmentary plan view showing the waveguide section.
Figure 24A:
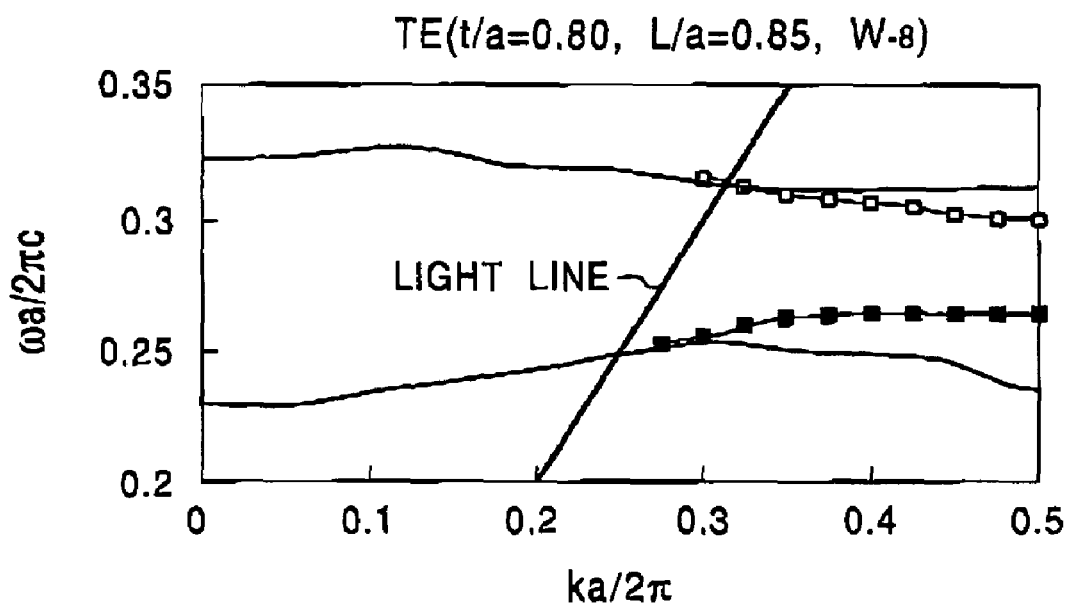
FIG. 24A is a graph showing the dispersion relation of a two-dimensional photonic crystal waveguide which has a waveguide section with a width of $W_{-8}$ equal to $(\sqrt{3})a\times(8/16)$ and to which a light beam in the TE-like mode is applied.
Figure 24B:
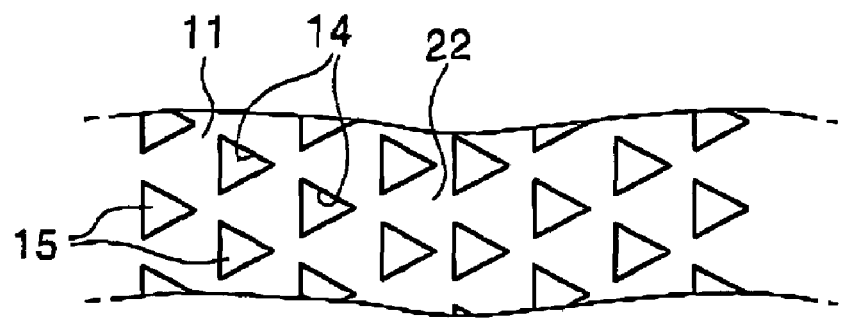
FIG. 24B is a fragmentary plan view showing the waveguide section.
Figure 25A:
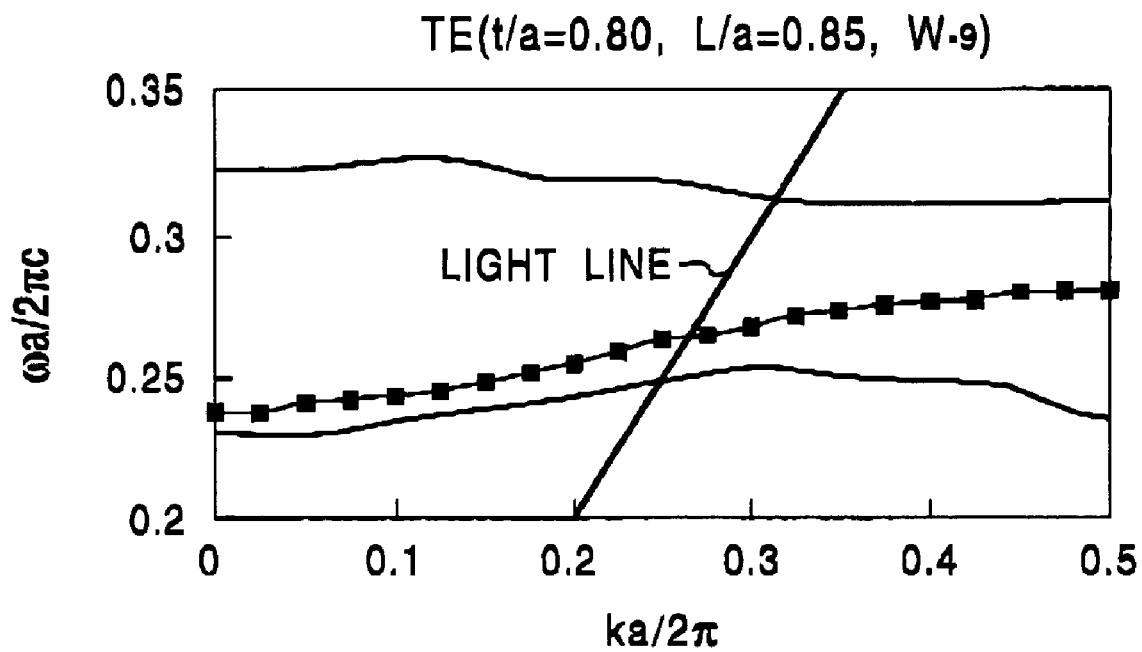
FIG. 25A is a graph showing the dispersion relation of a two-dimensional photonic crystal waveguide which has a waveguide section with a width of $W_{-9}$ equal to $(\sqrt{3})a\times(7/16)$ and to which a light beam in the TE-like mode is applied.
Figure 25B:
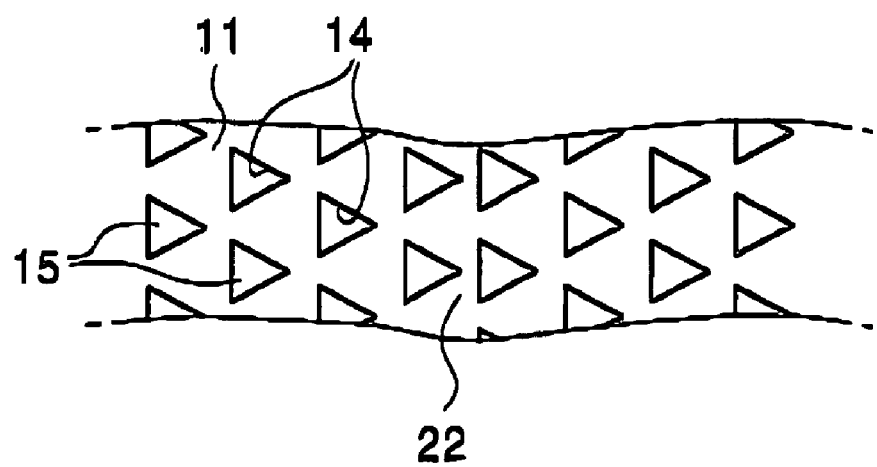
FIG. 25B is a fragmentary plan view showing the waveguide section.
Figure 26A:
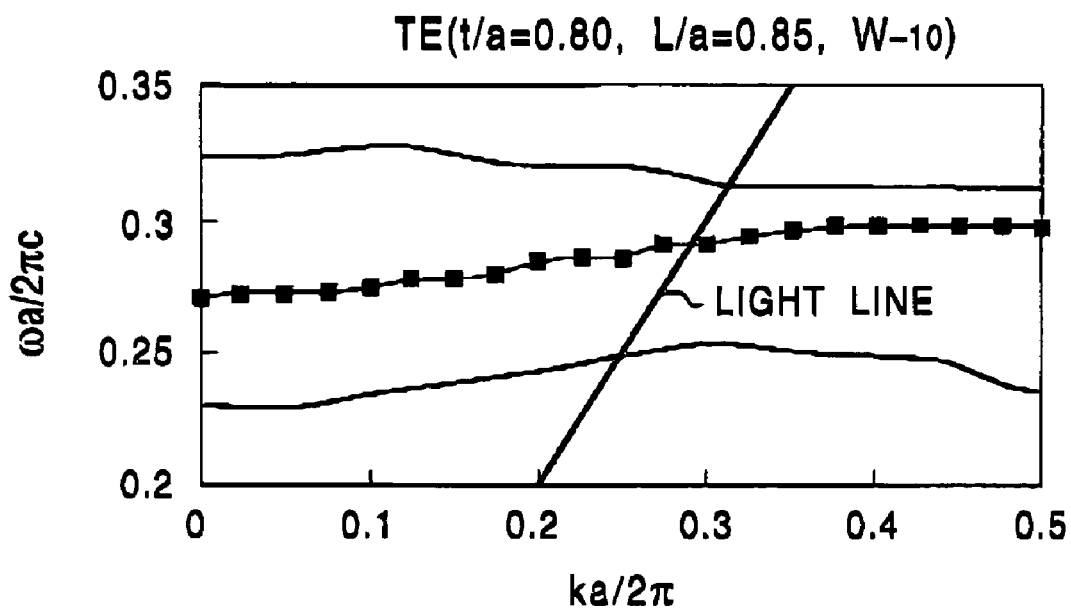
FIG. 26A is a graph showing the dispersion relation of a two-dimensional photonic crystal waveguide which has a waveguide section with a width of $W_{-10}$ equal to $(\sqrt{3})a\times(6/16)$ and to which a light beam in the TE-like mode is applied.
Figure 26B:
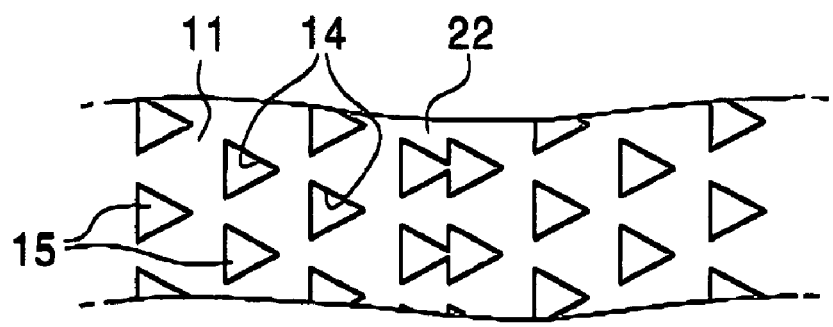
FIG. 26B is a fragmentary plan view showing the waveguide section.
Figure 27A:
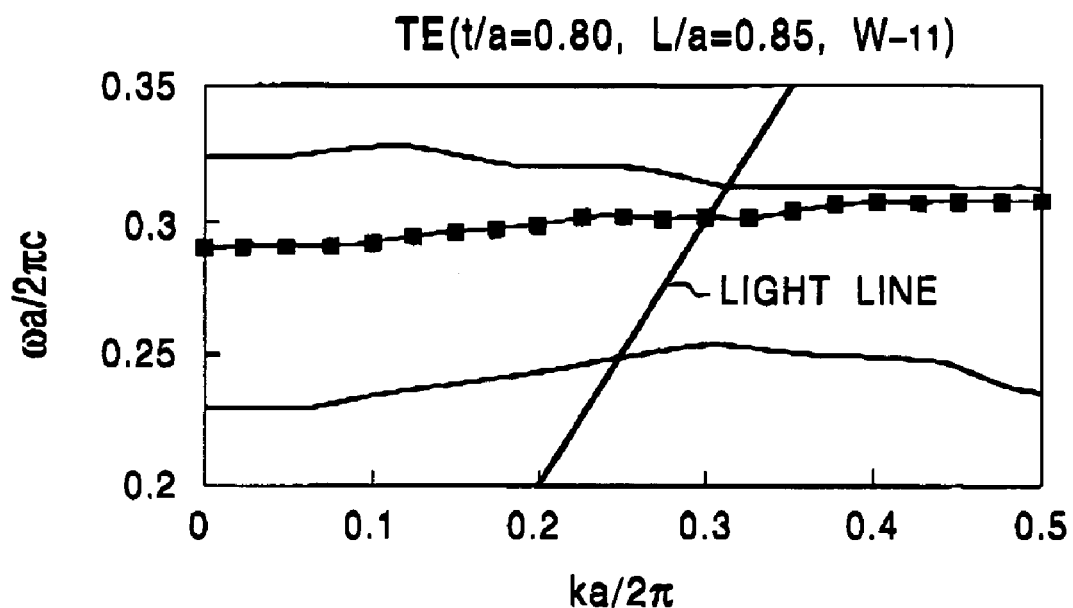
FIG. 27A is a graph showing the dispersion relation of a two-dimensional photonic crystal waveguide which has a waveguide section with a width of $W_{-11}$ equal to $(\sqrt{3})a\times(5/16)$ and to which a light beam in the TE-like mode is applied.
Figure 27B:
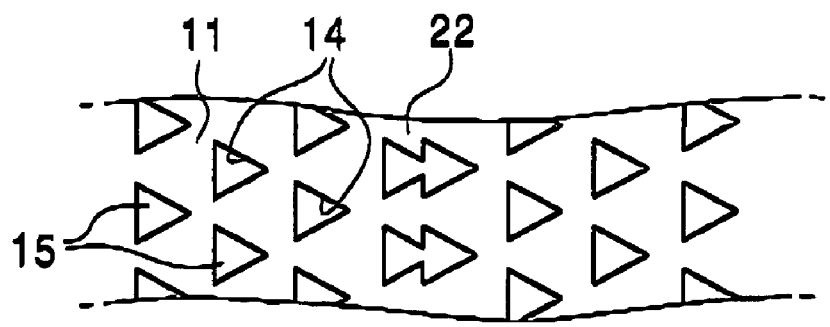
FIG. 27B is a fragmentary plan view showing the waveguide section.
Figure 28A:
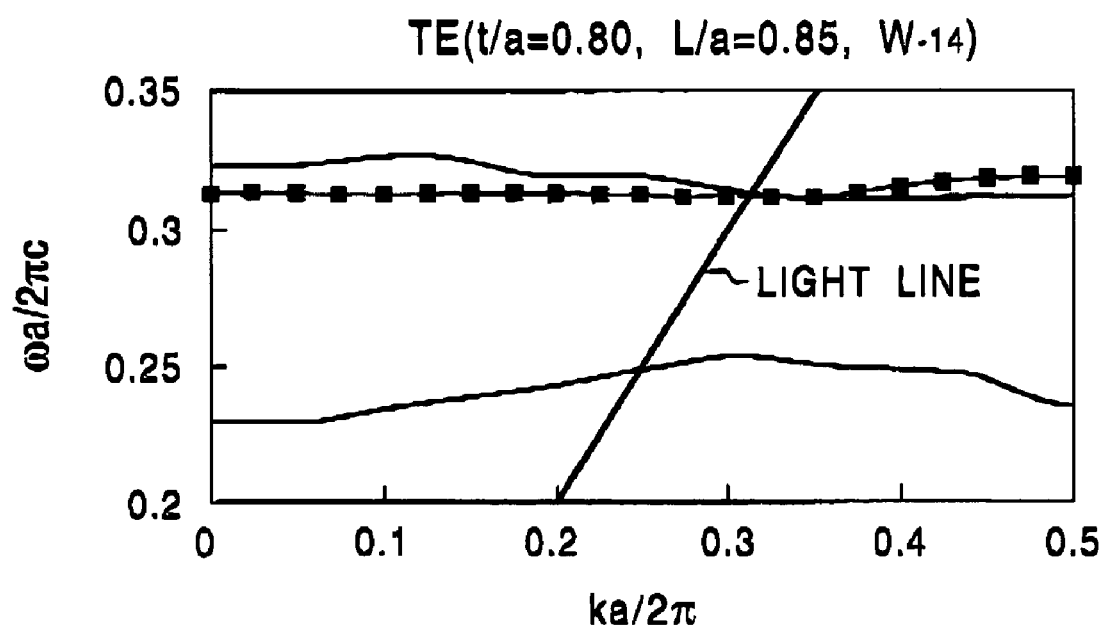
FIG. 28A is a graph showing the dispersion relation of a two-dimensional photonic crystal waveguide which has a waveguide section with a width of $W_{-14}$ equal to $(\sqrt{3})a\times(2/16)$ and to which a light beam in the TE-like mode is applied.
Figure 28B:
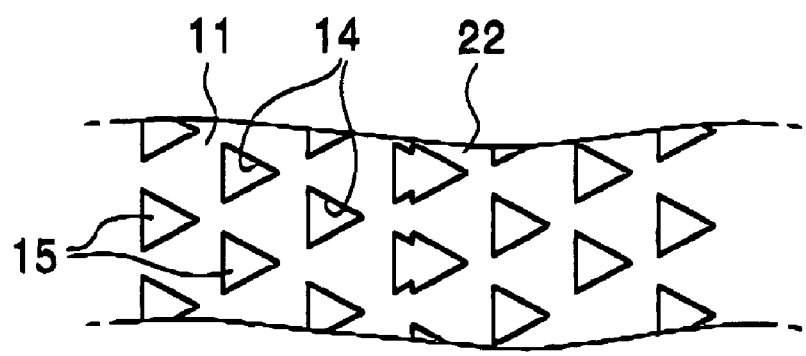
FIG. 28B is a fragmentary plan view showing the waveguide section.

The relationship between the thickness t of the slabs and the existence of a complete photonic band gap was investigated by applying light having a wavelength of 1,550 nm to the slabs. The occurrence of a high-order slab mode was checked. Obtained results are shown in FIGS. 16 and 17. In the graphs shown in FIG. 16 or 17, the horizontal axis shows the thickness t in μm of the slabs and the vertical axis shows the frequency range Δλ in nm of a photonic band gap common to a light beam in the TE-like mode and a light beam in the TE-like mode.

As is clear from FIGS. 16 and 17, the high-order slab mode occurs when the slab thickness is more than 0.295 μm, that is, the ratio t/λo is more than about two. Furthermore, the slabs do not have any complete photonic band gap when the slab thickness is less than 0.255 m, that is, the ratio t/λo is less than about 0.15. The slabs do not have any complete photonic band gap when the ratio L/a is less than 0.70. Thus, the slabs have the complete photonic band gap and the high-order slab mode is prevented from occurring when the following conditions are satisfied: $0.70<L/a<1.0$ and $0.1 \leq t/\lambda o \leq 0.3$.

EXAMPLE 4

Various two-dimensional photonic crystal waveguides having substantially the same configuration as that shown in FIG. 1, 2, or 3 were prepared except that the waveguide section width W of waveguide sections of slab members was varied. Two-dimensional photonic crystal slabs included in the two-dimensional photonic crystal waveguides satisfied the following conditions: $t/a=0.80$ and $L/a=0.85$. The waveguide section width W was varied from $W_{-16}$ equal to $(\sqrt{3})a \times (0/16)$ to $W_{+4}$ equal to $(\sqrt{3})a \times (20/16)$ using $W_0$ equal to $(\sqrt{3})a$ as a reference standard.

Figure 29A:
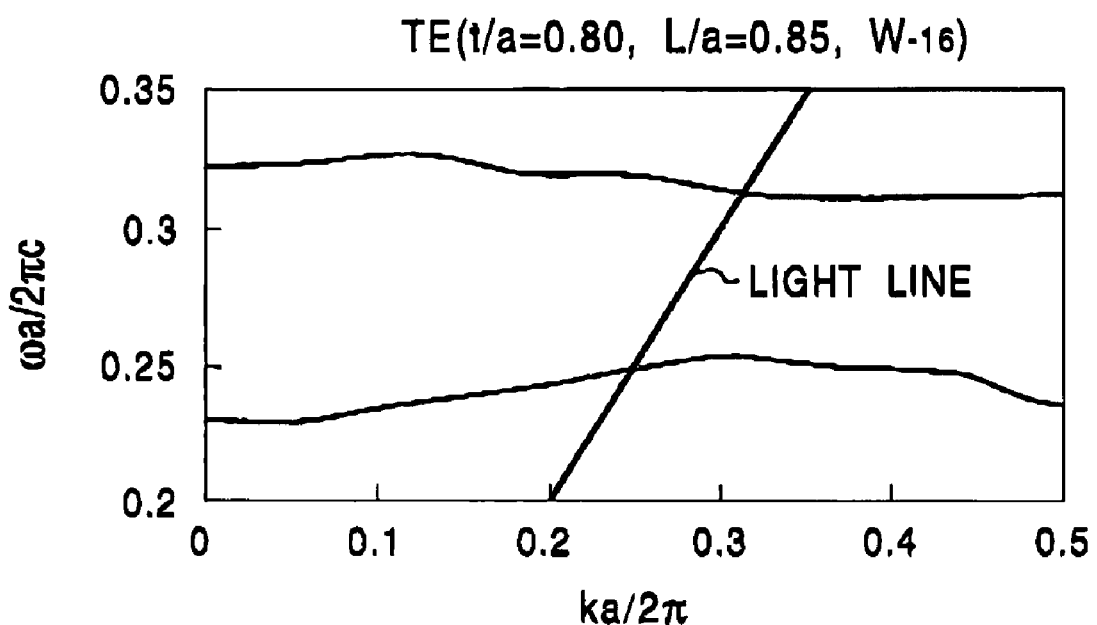
FIG. 29A is a graph showing the dispersion relation of a two-dimensional photonic crystal waveguide which has a waveguide section with a width of $W_{-16}$ equal to $(\sqrt{3})a\times(0/16)$ and to which a light beam in the TE-like mode is applied.
Figure 29B:
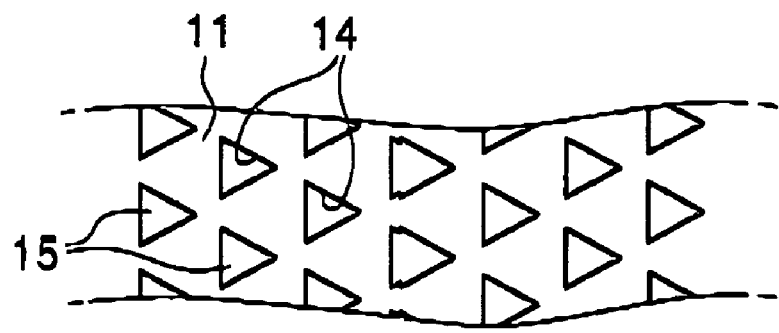
FIG. 29B is a fragmentary plan view showing the waveguide section.
Figure 30A:
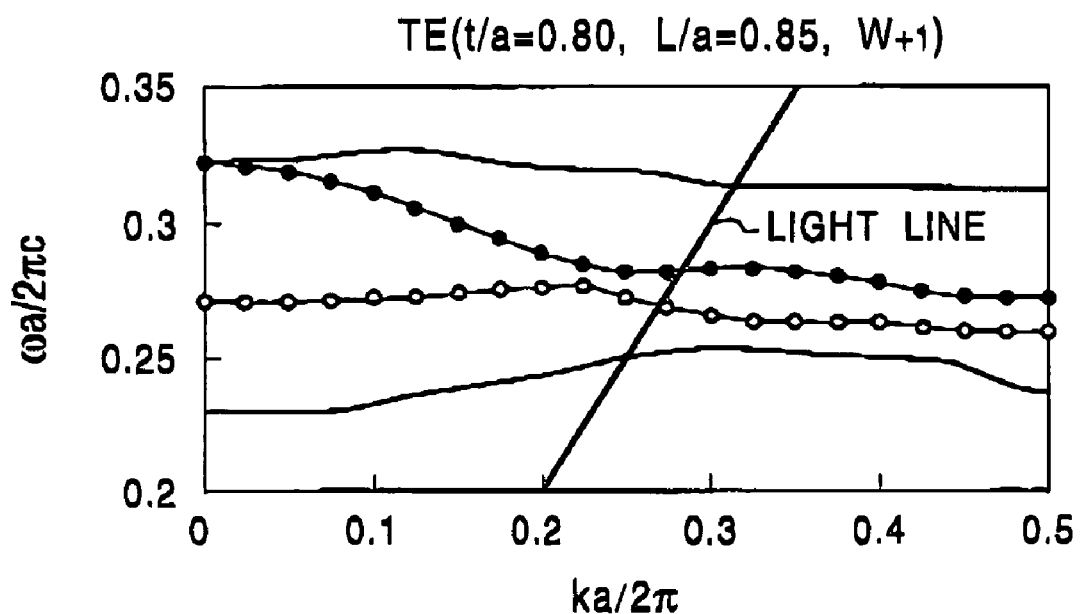
FIG. 30A is a graph showing the dispersion relation of a two-dimensional photonic crystal waveguide which has a waveguide section with a width of $W_{+1}$ equal to $(\sqrt{3})a\times(17/16)$ and to which a light beam in the TE-like mode is applied.
Figure 30B:
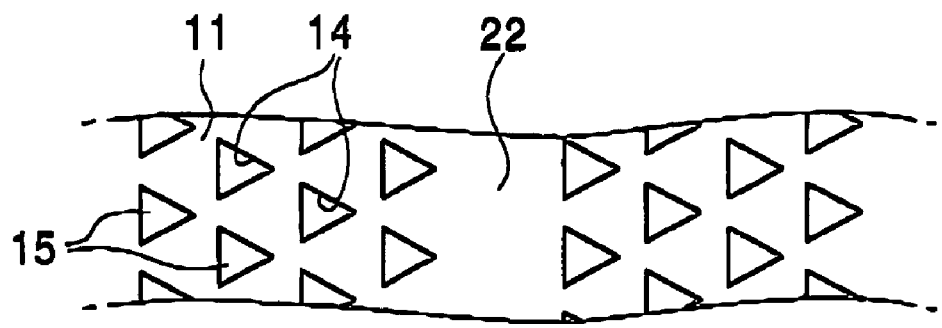
FIG. 30B is a fragmentary plan view showing the waveguide section.
Figure 31A:
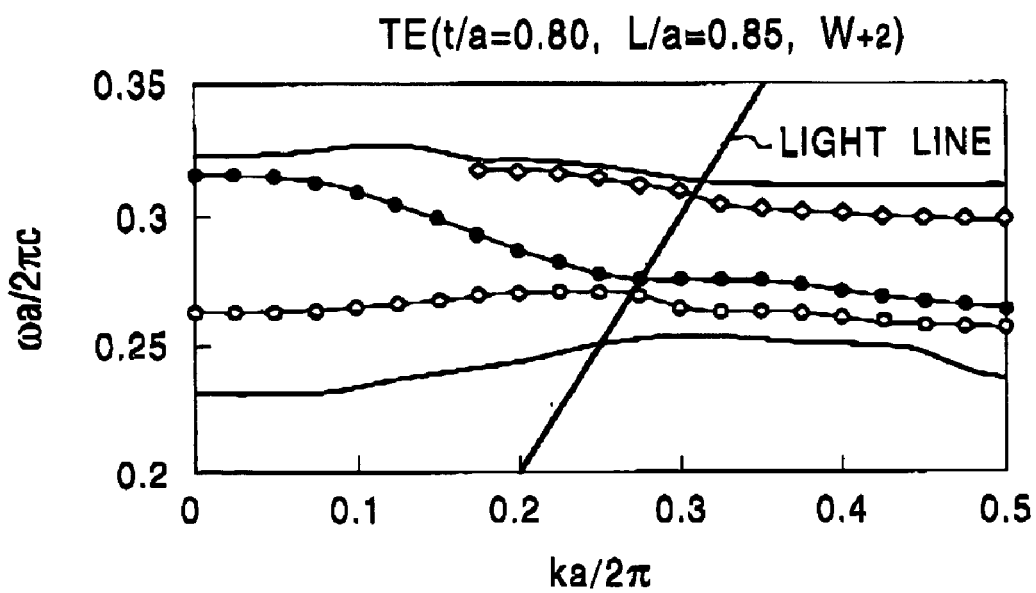
FIG. 31A is a graph showing the dispersion relation of a two-dimensional photonic crystal waveguide which has a waveguide section with a width of $W_{+2}$ equal to $(\sqrt{3})a\times(18/16)$ and to which a light beam in the TE-like mode is applied.
Figure 31B:
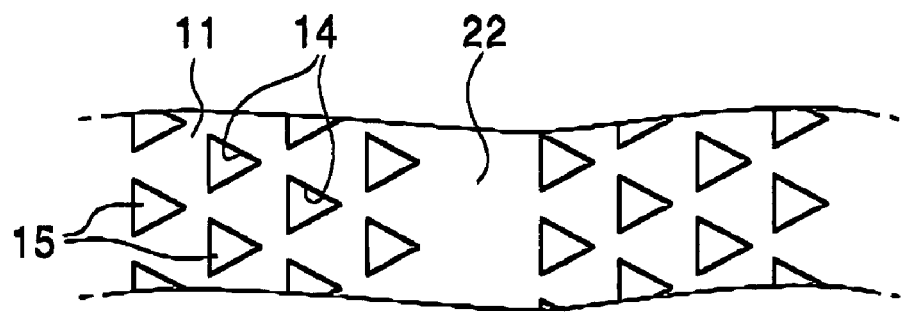
FIG. 31B is a fragmentary plan view showing the waveguide section.
Figure 32A:
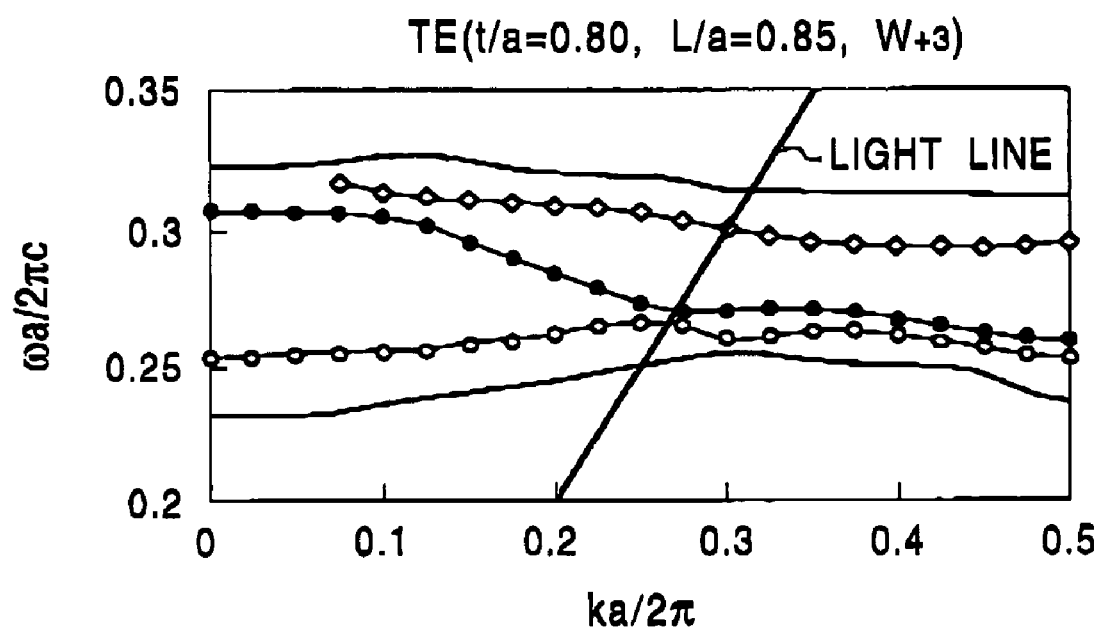
FIG. 32A is a graph showing the dispersion relation of a two-dimensional photonic crystal waveguide which has a waveguide section with a width of $W_{+3}$ equal to $(\sqrt{3})a\times(19/16)$ and to which a light beam in the TE-like mode is applied.
Figure 32B:
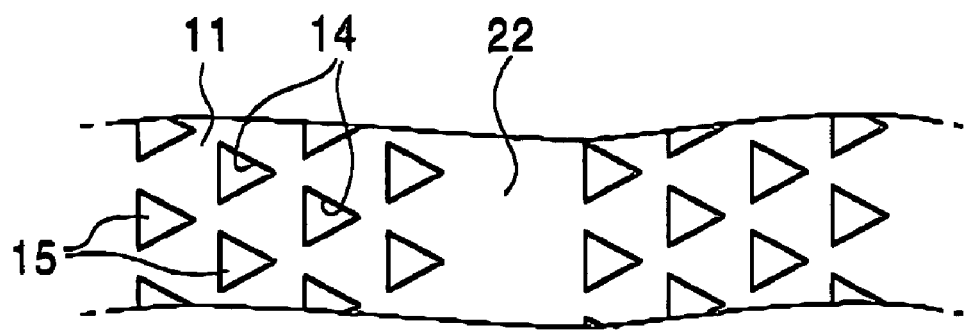
FIG. 32B is a fragmentary plan view showing the waveguide section.
Figure 33A:
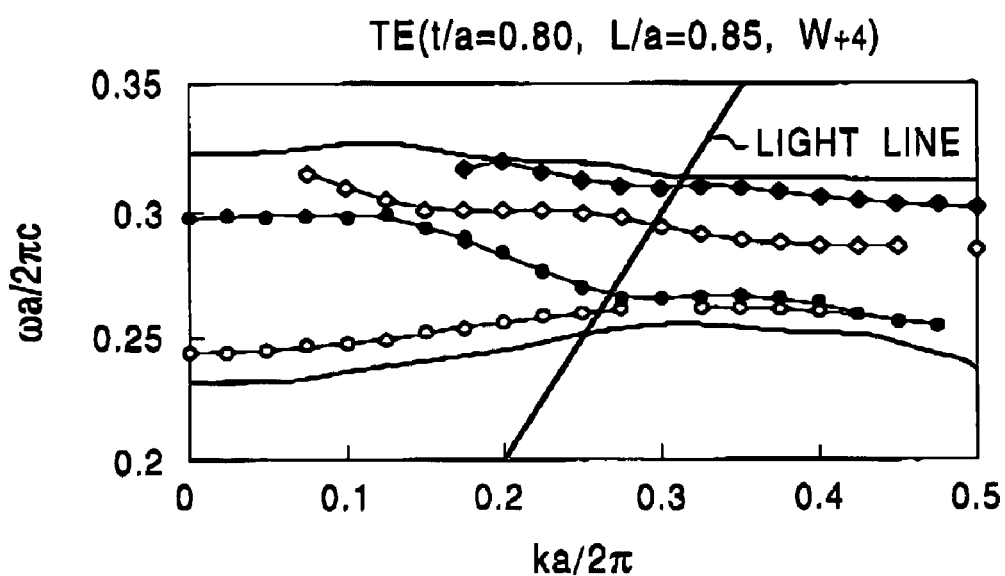
FIG. 33A is a graph showing the dispersion relation of a two-dimensional photonic crystal waveguide which has a waveguide section with a width of $W_{+4}$ equal to $(\sqrt{3})a\times(20/16)$ and to which a light beam in the TE-like mode is applied.
Figure 33B:
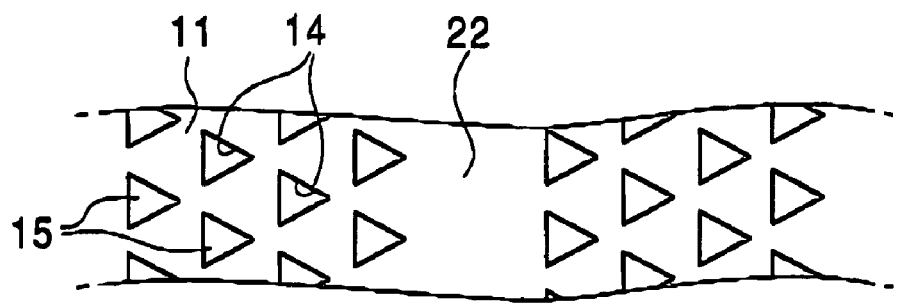
FIG. 33B is a fragmentary plan view showing the waveguide section.
Figure 34A:
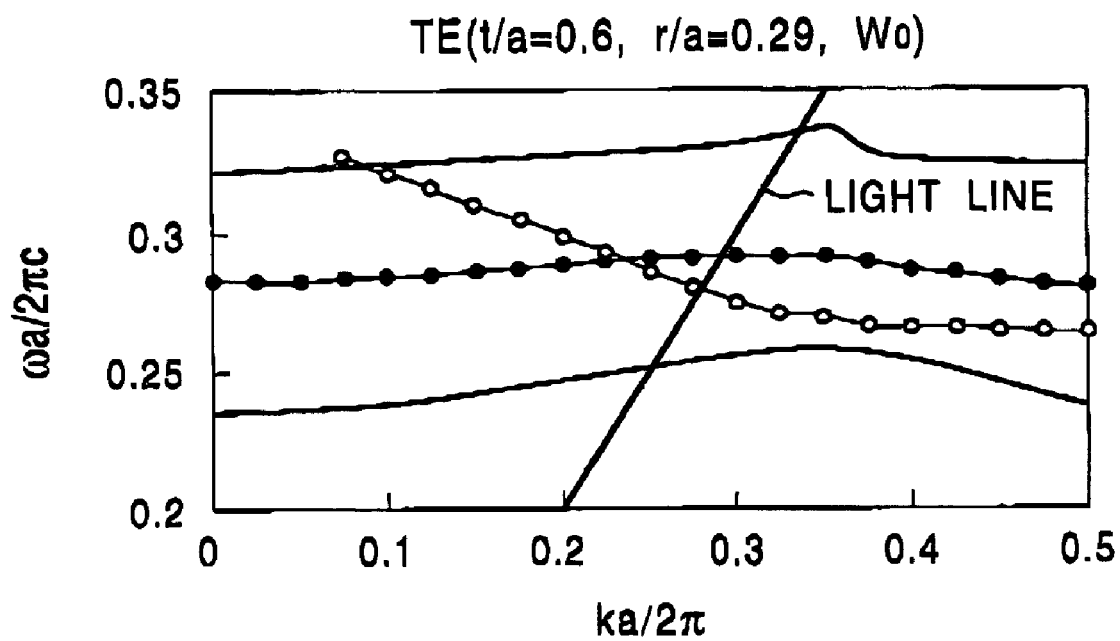
FIG. 34A is a graph showing the dispersion relation of a two-dimensional photonic crystal waveguide which has a waveguide section with a width of $W_0$ equal to $(\sqrt{3})a$ and to which a light beam in the TE-like mode is applied.
Figure 34B:
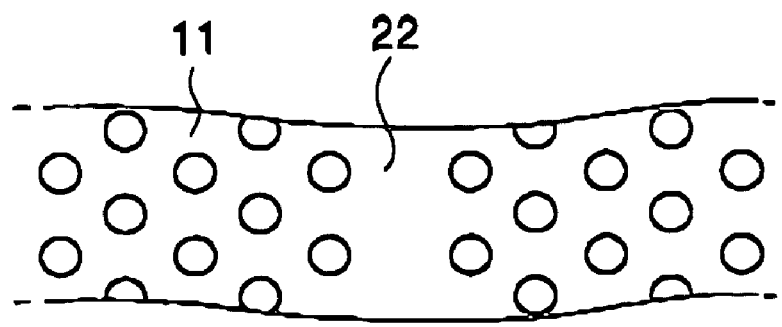
FIG. 34B is a fragmentary plan view showing the waveguide section.
Figure 35A:
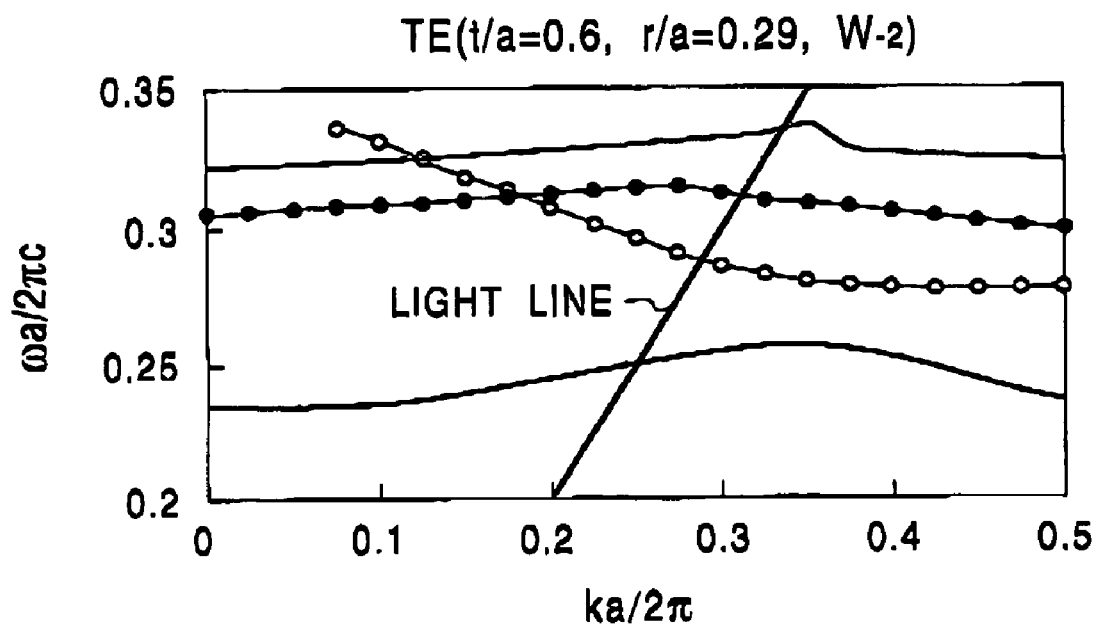
FIG. 35A is a graph showing the dispersion relation of a two-dimensional photonic crystal waveguide which has a waveguide section with a width of $W_{-2}$ equal to $(\sqrt{3})a\times(14/16)$ and to which a light beam in the TE-like mode is applied.
Figure 35B:
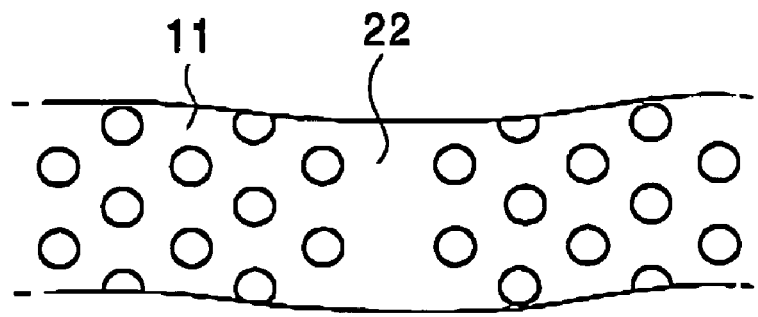
FIG. 35B is a fragmentary plan view showing the waveguide section.
Figure 36A:
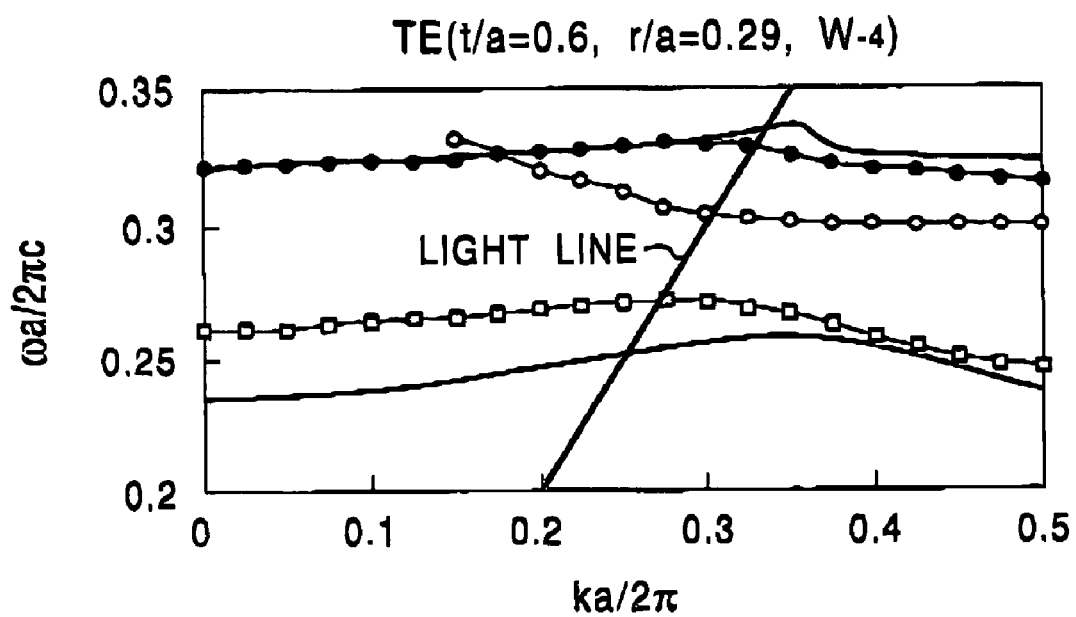
FIG. 36A is a graph showing the dispersion relation of a two-dimensional photonic crystal waveguide which has a waveguide section with a width of $W_{-4}$ equal to $(\sqrt{3})a\times(12/$ 16) and to which a light beam in the TE-like mode is applied.
Figure 36B:
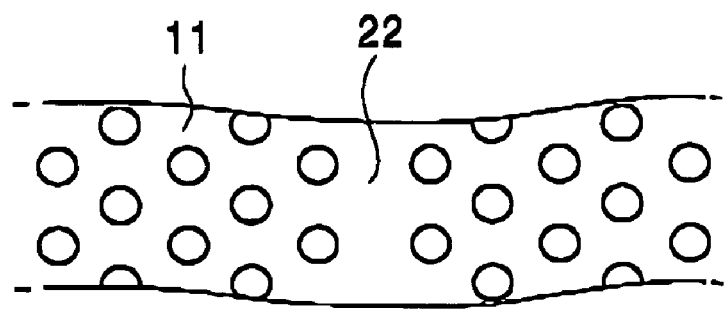
FIG. 36B is a fragmentary plan view showing the waveguide section.
Figure 37A:
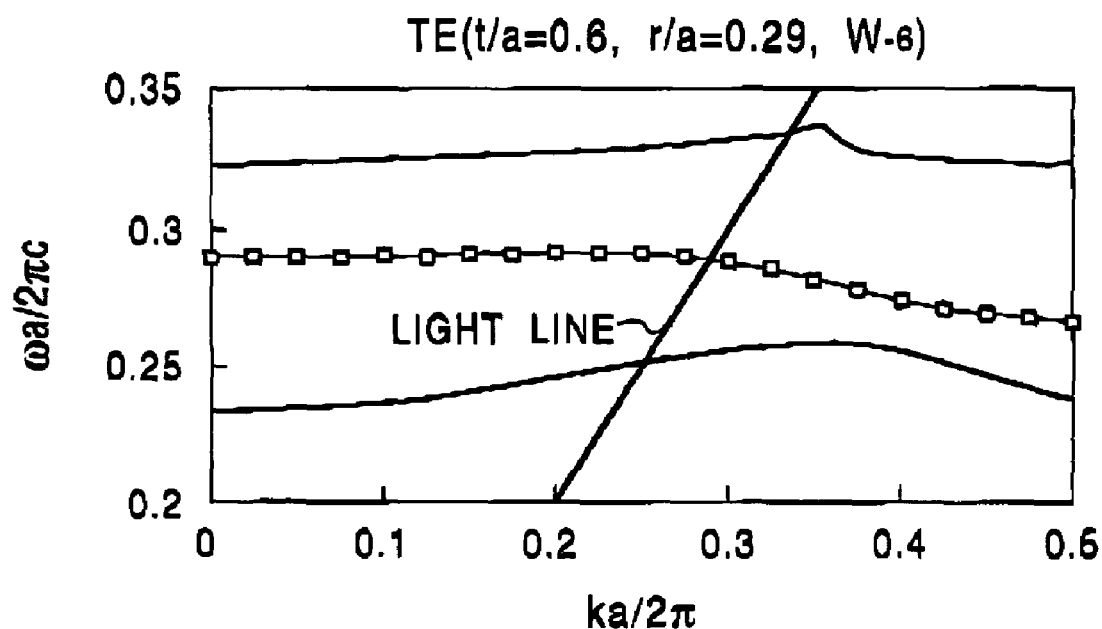
FIG. 37A is a graph showing the dispersion relation of a two-dimensional photonic crystal waveguide which has a waveguide section with a width of $W_{-6}$ equal to $(\sqrt{3})a \times (10/16)$ and to which a light beam in the TE-like mode is applied.
Figure 37B:
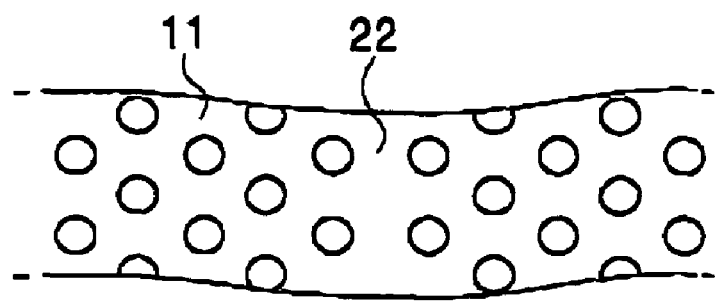
FIG. 37B is a fragmentary plan view showing the waveguide section.
Figure 38A:
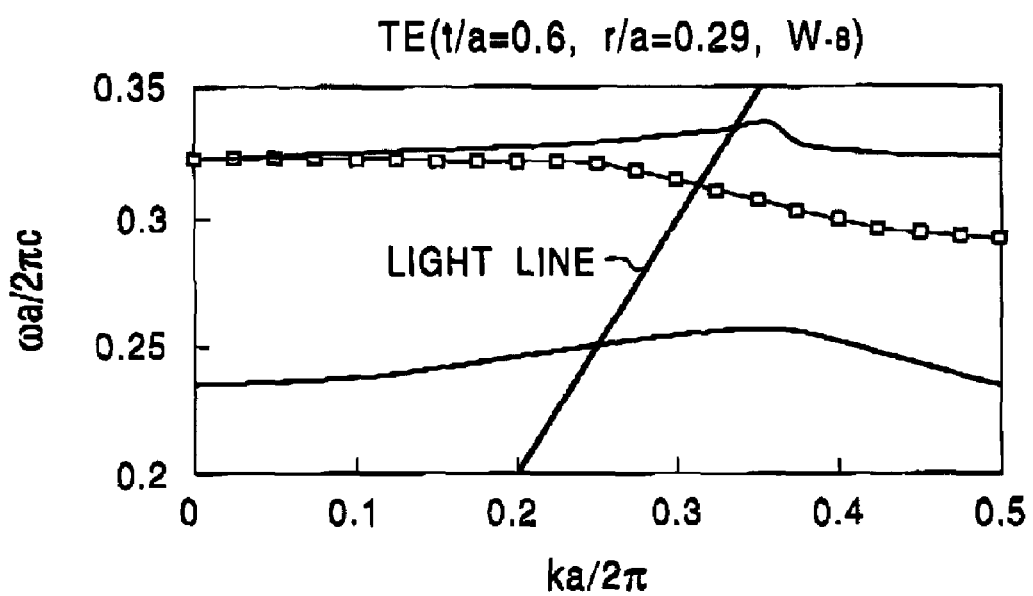
FIG. 38A is a graph showing the dispersion relation of a two-dimensional photonic crystal waveguide which has a waveguide section with a width of $W_{-8}$ equal to $(\sqrt{3})a \times (8/16)$ and to which a light beam in the TE-like mode is applied.
Figure 38B:
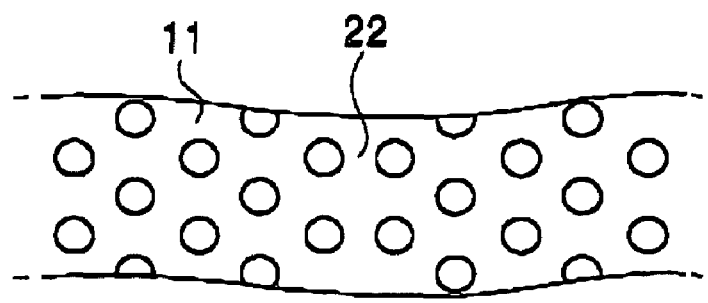
FIG. 38B is a fragmentary plan view showing the waveguide section.
Figure 39A:
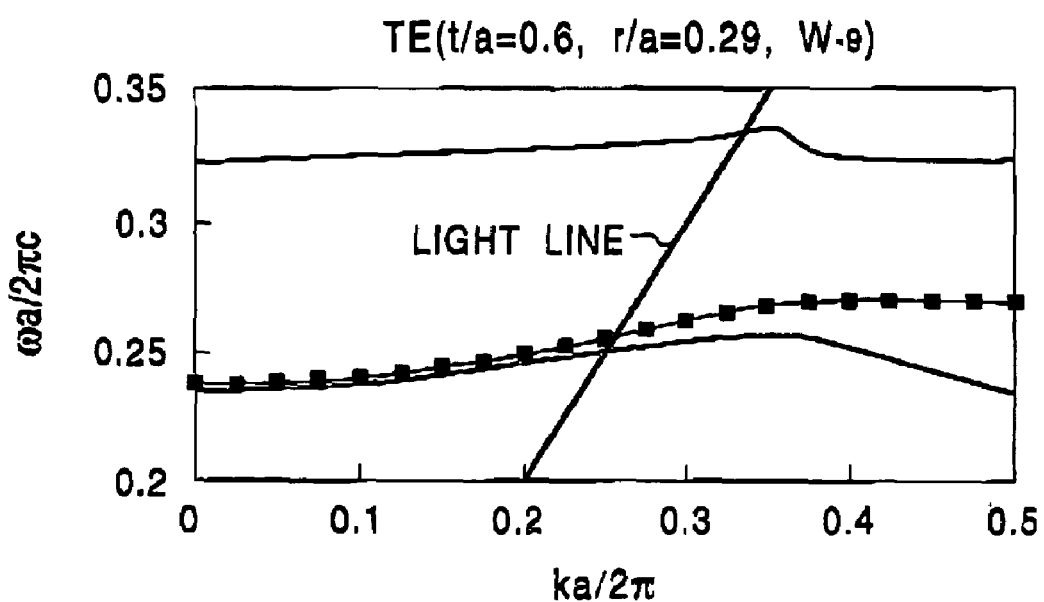
FIG. 39A is a graph showing the dispersion relation of a two-dimensional photonic crystal waveguide which has a waveguide section with a width of $W_{-9}$ equal to $(\sqrt{3})a \times (7/16)$ and to which a light beam in the TE-like mode is applied.
Figure 39B:
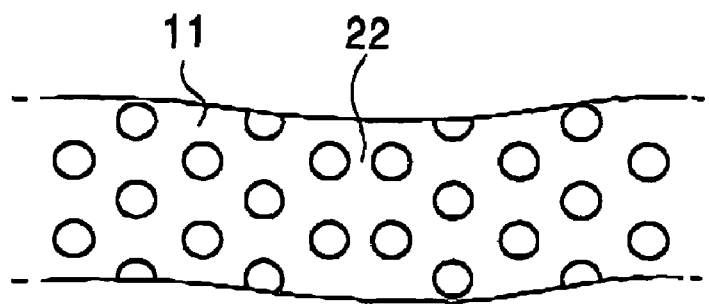
FIG. 39B is a fragmentary plan view showing the waveguide section.
Figure 40A:
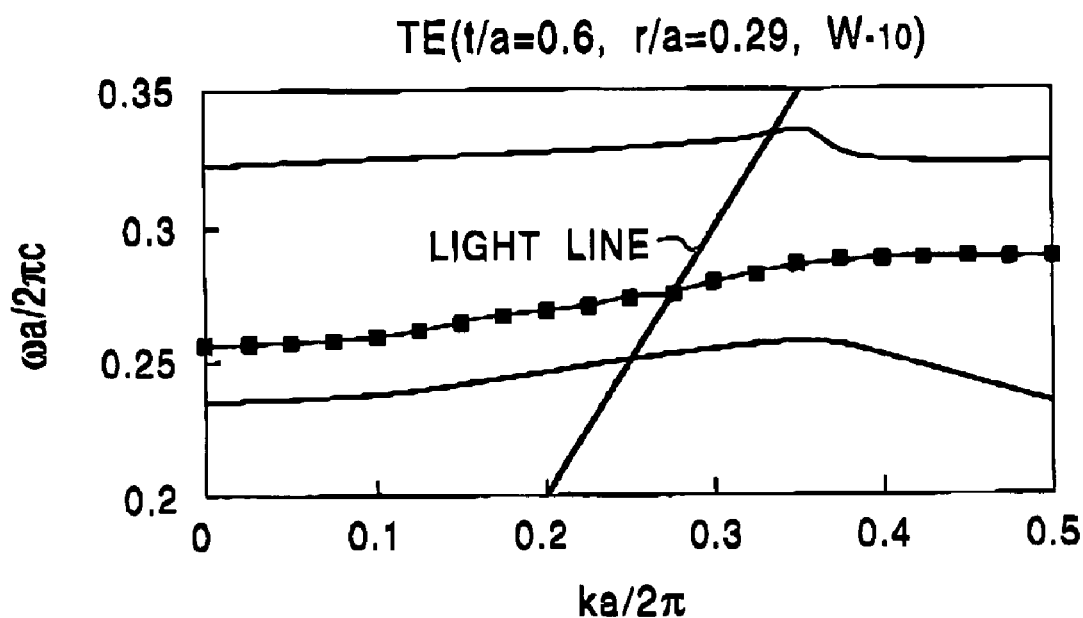
FIG. 40A is a graph showing the dispersion relation of a two-dimensional photonic crystal waveguide which has a waveguide section with a width of $W_{-10}$ equal to $(\sqrt{3})a \times (6/16)$ and to which a light beam in the TE-like mode is applied.
Figure 40B:
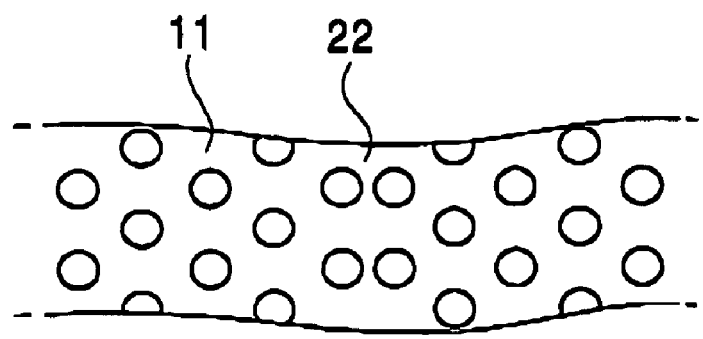
FIG. 40B is a fragmentary plan view showing the waveguide section.
Figure 41A:
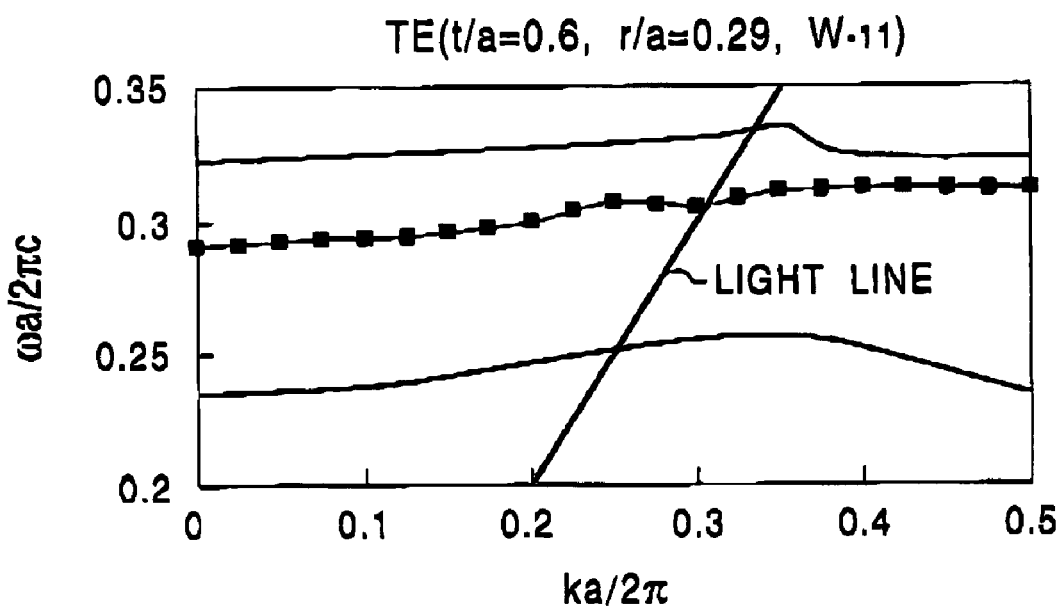
FIG. 41A is a graph showing the dispersion relation of a two-dimensional photonic crystal waveguide which has a waveguide section with a width of $W_{-11}$ equal to $(\sqrt{3})a \times (5/16)$ and to which a light beam in the TE-like mode is applied.
Figure 41B:
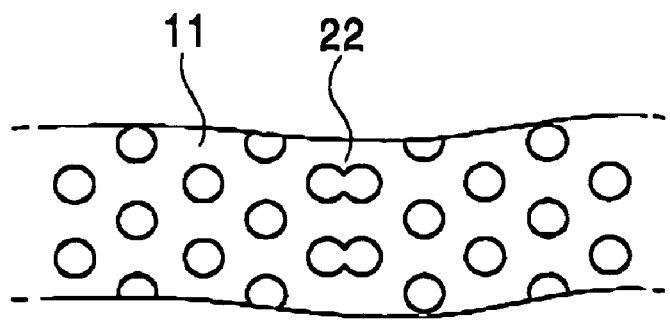
FIG. 41B is a fragmentary plan view showing the waveguide section.
Figure 42A:
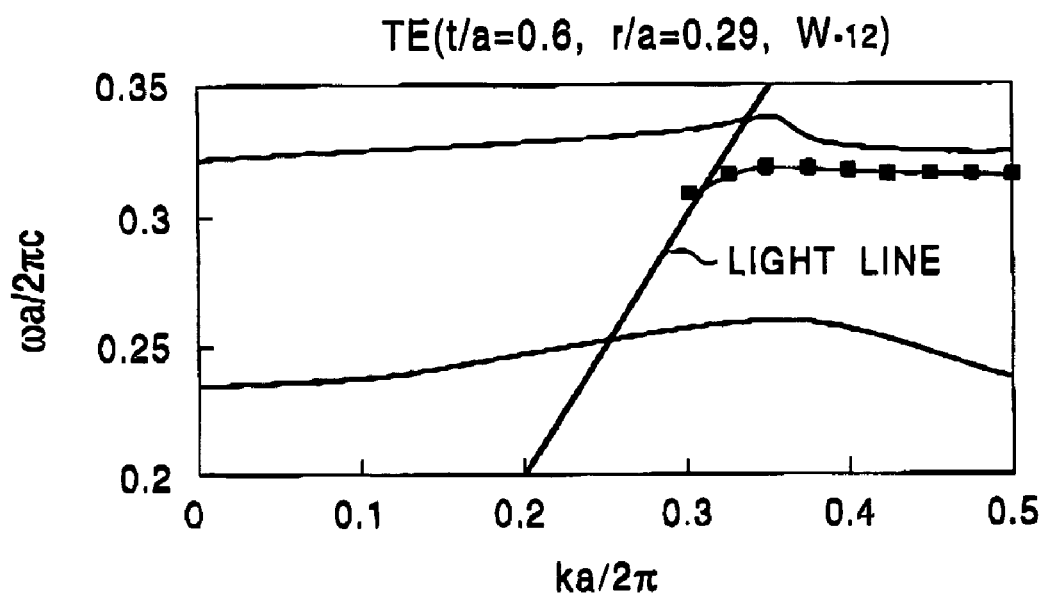
FIG. 42A is a graph showing the dispersion relation of a two-dimensional photonic crystal waveguide which has a waveguide section with a width of $W_{-12}$ equal to $(\sqrt{3})a \times (4/16)$ and to which a light beam in the TE-like mode is applied.
Figure 42B:
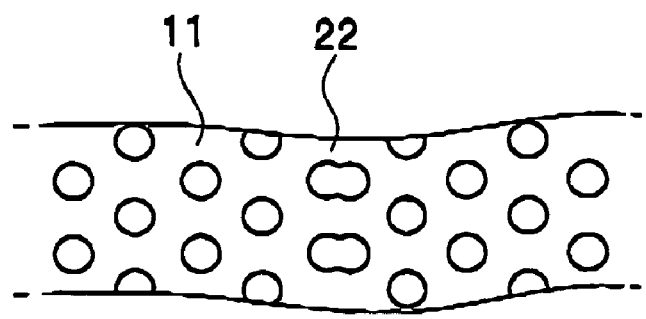
FIG. 42B is a fragmentary plan view showing the waveguide section.

The dispersion relation and frequency range of light were investigated by applying light beams in the TE-like mode to the prepared slabs from outside. Obtained results are shown in FIGS. 18A to 33A. Parts of waveguide sections, each extending in the corresponding slabs, having predetermined widths are shown in FIGS. 18B to 33B. With reference to FIG. 29B, the slab has a waveguide section width of $W_{-16}$ equal to zero and therefore has no waveguide section.

With reference to FIGS. 18A to 33A, the horizontal axis shows the normalized wave number represented by $ka/2\pi$ and the vertical axis shows the normalized frequency represented by $\omega a/2\pi c$. Thick lines shown in FIGS. 18A to 33A each represent corresponding light lines.

For the waveguides having the above configuration, mode curves do not intersect without depending on the waveguide section width W.

When the waveguide section width W is $W_{-16}$, there is no waveguide section. When the waveguide section width W is more than $W_{+2}$, light cannot be transmitted in a single mode.

Thus, when the waveguide section width W is within a range from $W_{-14}$ equal to $(\sqrt{3})a \times (2/16)$ to $W_{+2}$ equal to $(\sqrt{3})a \times (18/16)$, waveguide sections through which light cannot be transmitted in a single mode can be achieved.

As is clear from FIGS. 18 to 33, by varying the waveguide section width W, the two-dimensional photonic crystal waveguides are allowed to function as a donor- or acceptor-type waveguide, the dispersion relation and frequency range of the light beams in the TE-like mode can be controlled, and the frequency of the light beams in the TE-like mode can be shifted from the lower limit to upper limit of a band gap.

Furthermore, when light beams in the TM-like mode are applied to the two-dimensional photonic crystal waveguides, the two-dimensional photonic crystal waveguides are allowed to function as a donor- or acceptor-type waveguide, the dispersion relation and frequency range of the light beams in the TE-like mode can be controlled, and the frequency of the light beams in the TE-like mode can be shifted from the lower limit to upper limit of a band gap by varying the waveguide section width W.

Thus, a two-dimensional photonic crystal waveguide having a desired dispersion relation and frequency range can be achieved by adjusting the waveguide section width W.

EXAMPLE 5

Various two-dimensional photonic crystal waveguides similar to those described in Example 4 were prepared except that the waveguide section width W of waveguide sections of slab members was varied, the slab members had circular holes filled with air, and the circular holes and air formed low refractive index sectors. In the two-dimensional photonic crystal waveguides, the low refractive index sectors having a cylindrical shape were arranged in a triangular grid pattern and grouped into a first and a second region, which were symmetric about each waveguide section.

Two-dimensional photonic crystal slabs each included in the corresponding two-dimensional photonic crystal waveguides satisfied the following conditions: $t/a=0.60$ and $R/a=0.29$, wherein r represents the radius of the low refractive index sectors and a represents the minimum distance between the centers of the low refractive index sectors or the grating constant. The waveguide section width W was varied from $W_0$ equal to $(\sqrt{3})a$ to $W_{-16}$ equal to $(\sqrt{3})a \times (0/16)$ using $W_0$ equal to $(\sqrt{3})a$ as a reference standard.

Figure 43A:
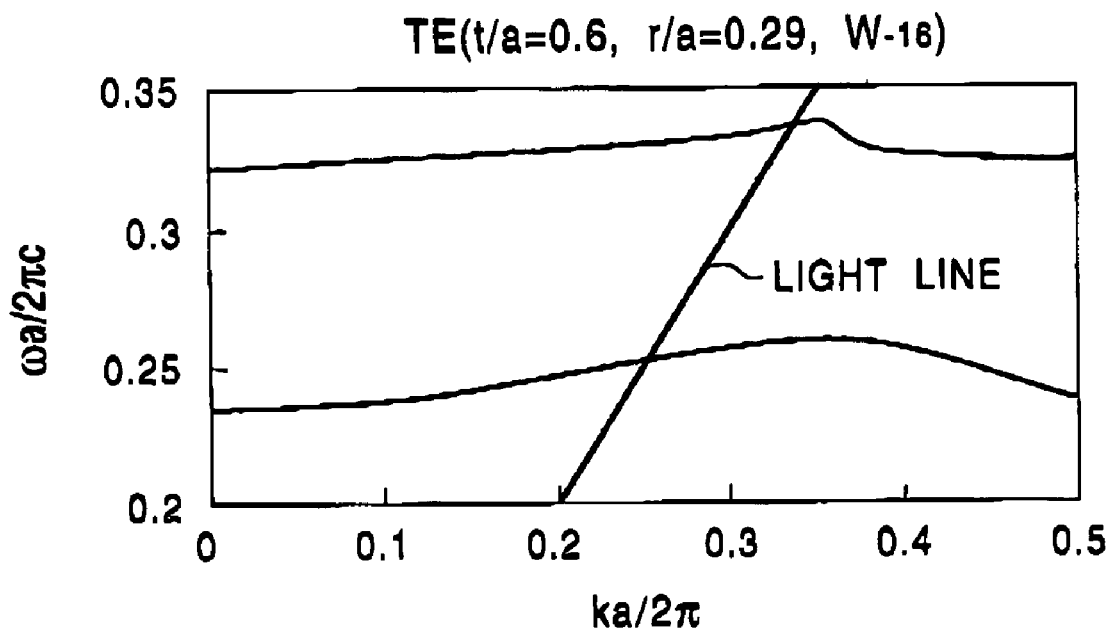
FIG. 43A is a graph showing the dispersion relation of a two-dimensional photonic crystal waveguide which has a waveguide section with a width of $W_{-16}$ equal to $(\sqrt{3})a \times (0/16)$ and to which a light beam in the TE-like mode is applied.
Figure 43B:
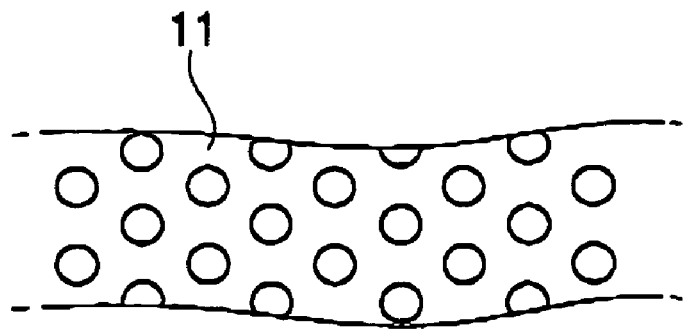
FIG. 43B is a fragmentary plan view showing the waveguide section.
Figure 44:
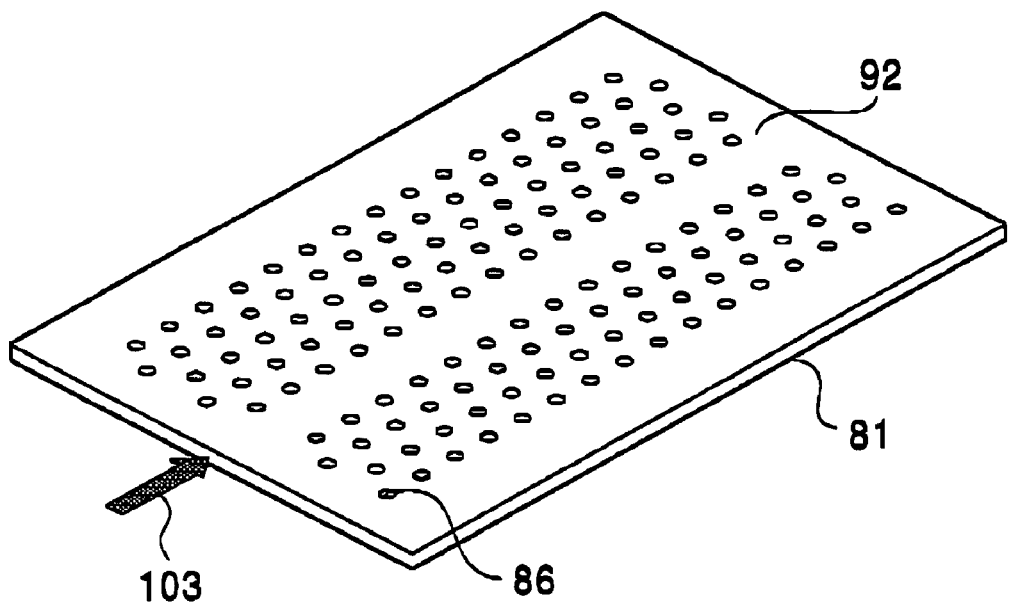
FIG. 44 is a schematic perspective view showing a known two-dimensional photonic crystal waveguide.

The dispersion relation and frequency range of light were investigated by applying light beams in the TE-like mode to the two-dimensional photonic crystal waveguides from outside. Obtained results are shown in FIGS. 34A to 43A. Parts of the waveguide sections, each extending in the corresponding waveguides, having predetermined widths are shown in FIGS. 34B to 43B. With reference to FIG. 43B, the waveguide has a waveguide section width of $W_{-16}$ equal to zero and therefore has no waveguide section.

With reference to FIGS. 34A to 43A, the horizontal axis shows the normalized wave number represented by $ka/2\pi$ and the vertical axis shows the normalized frequency represented by $\omega a/2\pi c$. Thick lines each shown in FIGS. 34A to 43A each represent corresponding light lines.

As is clear from FIGS. 34 to 43, in the two-dimensional photonic crystal, waveguides having the above configuration, mode curves intersect when the waveguide section width W is equal to $W_0$ or $W_{-2}$.

In other two-dimensional photonic crystal waveguides having a configuration that low refractive index sectors having a triangular prism shape are arranged in a triangular prism shape and first and second regions each containing the low refractive index sectors are symmetric about a waveguide section, mode curves are allowed to intersect by varying the waveguide section width.

EXAMPLE 6

Various two-dimensional photonic crystal slabs having substantially the same configuration as that shown in FIG. 1, 2, or 3 were prepared except that the ratio L/a was varied. The ratio L/a was varied by varying the value of a and the value of L to allow the center wavelength $\lambda_0$ of a band gap to be equal to about 1,550 nm.

Figure 49:
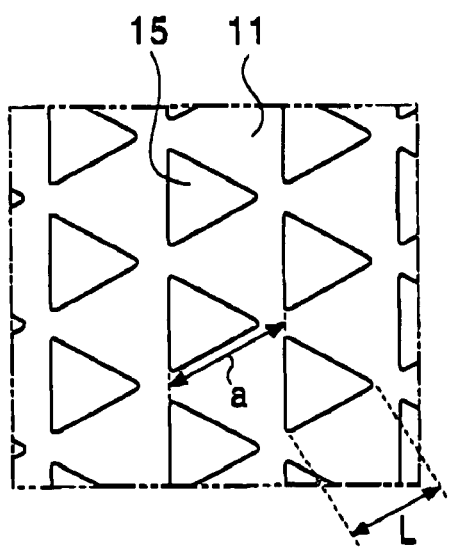
FIG. 49 is an illustration that shows the arrangement of low refractive index sectors satisfying the equation $L/a=0.85$, the value of a band gap frequency range that is determined using light in the TM-like mode and represented by $\Delta\lambda_{TM}$, and the value of a band gap frequency range that is determined using light in the TE-like mode and represented by $\Delta\lambda_{TE}$.

FIG. 49 shows the arrangement of low refractive index sectors, having a triangular prism shape, included in one of the two-dimensional photonic crystal slabs that satisfies the following equations: $L/a=0.85$, $\Delta=0.15a$, and $f=0.36$, wherein f represents the percentage of the volume of the low refractive index sectors in the volume of each two-dimensional photonic crystal slab and L, a, and Δ are as described above.

Figure 50:
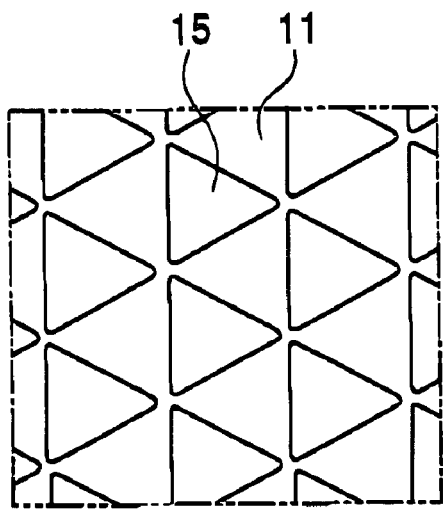
FIG. 50 is an illustration that shows the arrangement of low refractive index sectors satisfying the equation $L/a=1$, the value of a band gap frequency range that is determined using light in the TM-like mode and represented by $\Delta\lambda_{TM}$, and the value of a band gap frequency range that is determined using light in the TE-like mode and represented by $\Delta\lambda_{TE}$.

FIG. 50 shows the arrangement of low refractive index sectors, having a triangular prism shape, included in one of the two-dimensional photonic crystal slabs that satisfies the following equations: L/a=1, Δ=0·a, and f=0.5.

The width of complete two-dimensional band gaps was investigated by applying light beams having a wavelength $\lambda_0$ of 1,550 nm to the two-dimensional photonic crystal slabs from outside. Obtained results are shown in FIGS. 49 to 50.

With reference to FIGS. 49 and 50, $\Delta\lambda_{TM}$ represents the frequency range in nm of a photonic band gap determined using a light beam in the TM-like mode and $\Delta\lambda_{TE}$ represents the frequency range in nm of a photonic band gap determined using a light beam in the TE-like mode.

As is clear from FIGS. 49 and 50, the two-dimensional photonic crystal slab satisfying the equation L/a=0.85 has a photonic band gap, common to the light beam in the TE-like mode and the light in the TM-like mode, having a frequency range Δλ of 59 nm. In contrast, as is clear from FIG. 50, the two-dimensional photonic crystal slabs satisfying the equation L/a=1 has a photonic band gap, common to the light beam in the TE-like mode and the light in the TM-like mode, having a frequency range Δλ of 176 nm. Thus, the complete photonic band gap of the two-dimensional photonic crystal slab satisfying the equation L/a=1 has a width greater than that of the other.

EXAMPLE 7

Various two-dimensional photonic crystal slabs similar to those described in Example 6 were prepared except that low refractive index sectors had a triangular prism shape in which lateral faces of a triangular prism each have corresponding protrusions (a triangular prism shape in which a triangular prism has concave edges) and the ratio L/a was varied. The ratio L/a was varied by varying the value of a and the value of L to allow the center wavelength $\lambda_0$ of a band gap to be equal to about 1,550 nm.

Figure 51:
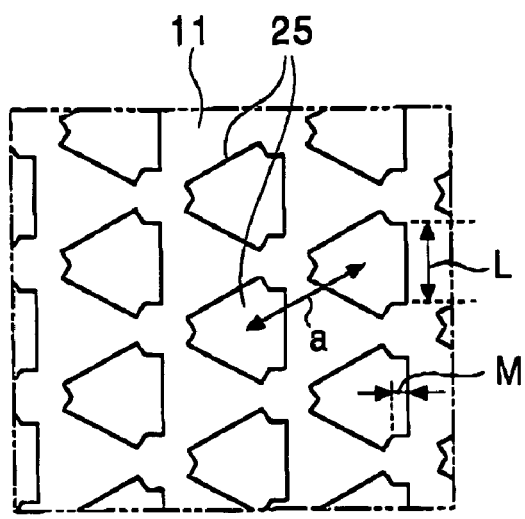
FIG. 51 is an illustration that shows the arrangement of low refractive index sectors satisfying the equation $L/a=0.6$, the value of a band gap frequency range that is determined using light in the TM-like mode and represented by $\Delta\lambda_{TM}$, and the value of a band gap frequency range that is determined using light in the TE-like mode and represented by $\Delta\lambda_{TE}$.

FIG. 51 shows the arrangement of low refractive index sectors included in one of the two-dimensional photonic crystal slabs that satisfies the following equations: L/a=0.6, M=0.1a, and f=0.39, wherein L represents the length of a longer edge of each protrusion, M represents the length of a shorter edge of the protrusion, and a represents the minimum distance between the centers of the low refractive index sectors.

Figure 52:
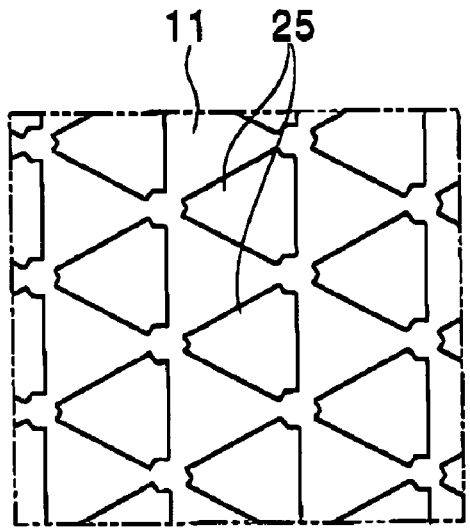
FIG. 52 is an illustration that shows the arrangement of low refractive index sectors satisfying the equation $L/a=0.7$, the value of a band gap frequency range that is determined using light in the TM-like mode and represented by $\Delta\lambda_{TM}$, and the value of a band gap frequency range that is determined using light in the TE-like mode and represented by $\Delta\lambda_{TE}$.

FIG. 52 shows the arrangement of low refractive index sectors included in one of those that satisfies the following equations: L/a=0.7, M=0.1a, and f=0.49.

Figure 53:
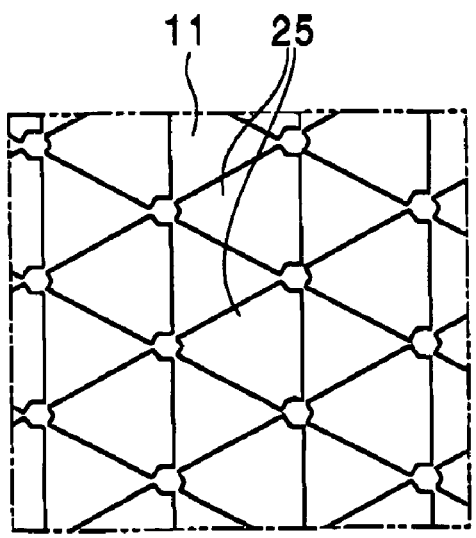
FIG. 53 is an illustration that shows the arrangement of low refractive index sectors satisfying the equation $L/a=0.8$, the value of a band gap frequency range that is determined using light in the TM-like mode and represented by $\Delta\lambda_{TM}$, and the value of a band gap frequency range that is determined using light in the TE-like mode and represented by $\Delta\lambda_{TE}$.

FIG. 53 shows the arrangement of low refractive index sectors included in one of those that satisfies the following equations: L/a=0.8, M=0.1a, and f=0.6.

The width of complete two-dimensional band gaps was investigated by applying light beams having a wavelength $\lambda_0$ of 1,550 nm to the two-dimensional photonic crystal slabs from outside. Obtained results are shown in FIGS. 51 to 53.

As is clear from FIGS. 51 to 53, since the low refractive index sectors have the above configuration, the two-dimensional photonic crystal slab satisfying the equation L/a=0.6 has a photonic band gap, common to a light beam in the TE-like mode and a light beam in the TM-like mode, having a frequency range Δλ of 53 nm. The two-dimensional photonic crystal slab satisfying the equation L/a=0.7 has a photonic band gap, common to those light beams, having a frequency range Δλ of 116 nm. The two-dimensional photonic crystal slab satisfying the equation L/a=0.8 has a photonic band gap, common to those light beams, having a frequency range Δλ of 225 nm. Thus, the two-dimensional photonic crystal slab satisfying the equation L/a=0.8 is the largest in the width of the complete photonic band gap.

EXAMPLE 8

Various two-dimensional photonic crystal slabs similar to those described in Example 6 were prepared except that low refractive index sectors had a Y shape (propeller shape) in cross section (a triangular prism shape in which a triangular prism has edges each having corresponding protrusions) and the ratio L/a was varied. The ratio L/a was varied by varying the value of a and the value of L to allow the center wavelength $\lambda_0$ of a band gap to be equal to about 1,550 nm.

Figure 54:
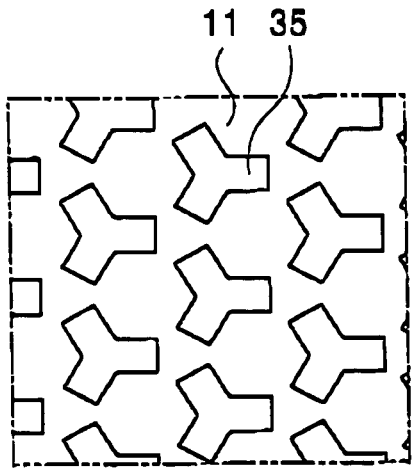
FIG. 54 is an illustration that shows the arrangement of low refractive index sectors satisfying the equation $L/a=0.3$, the value of a band gap frequency range that is determined using light in the TM-like mode and represented by $\Delta\lambda_{TM}$, and the value of a band gap frequency range that is determined using light in the TE-like mode and represented by $\Delta\lambda_{TE}$.

FIG. 54 shows the arrangement of low refractive index sectors included in one of the two-dimensional photonic crystal slabs that satisfies the following equations: L/a=0.3, M=0.3a, Δ=0.156a, and f=0.39, wherein L, a, M, Δ, and f are as described above.

Figure 55:
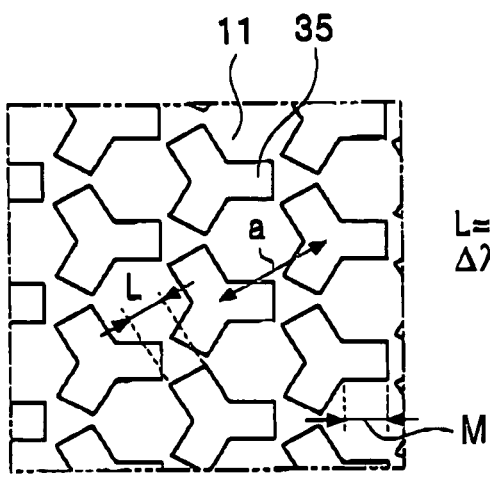
FIG. 55 is an illustration that shows the arrangement of low refractive index sectors satisfying the equation $L/a=0.34$, the value of a band gap frequency range that is determined using light in the TM-like mode and represented by $\Delta\lambda_{TM}$, and the value of a band gap frequency range that is determined using light in the TE-like mode and represented by $\Delta\lambda_{TE}$.

FIG. 55 shows the arrangement of low refractive index sectors included in one of those that satisfies the following equations: L/a=0.34, M=0.34a, Δ=0.006a, and f=0.46.

Figure 56:
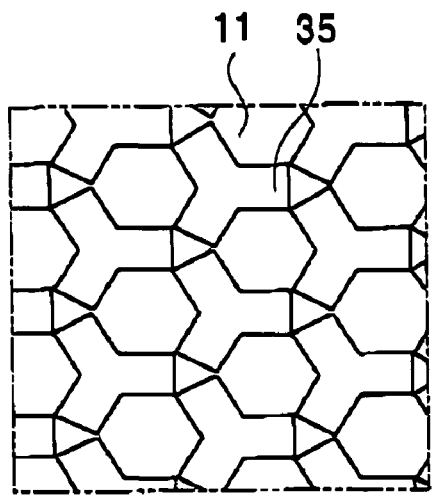
FIG. 56 is an illustration that shows the arrangement of low refractive index sectors satisfying the equation $L/a=0.366$, the value of a band gap frequency range that is determined using light in the TM-like mode and represented by $\Delta\lambda_{TM}$, and the value of a band gap frequency range that is determined using light in the TE-like mode and represented by $\Delta\lambda_{TE}$.

FIG. 56 shows the arrangement of low refractive index sectors included in one of those that satisfies the following equations: L/a=0.366, M=0.366a, Δ=0·a, and f=0.53.

The width of complete two-dimensional band gaps was investigated by applying light beams having a wavelength $\lambda_0$ of 1,550 nm to the various two-dimensional photonic crystal slabs from outside. Obtained results are shown in FIGS. 54 to 56.

As is clear from FIGS. 54 to 56, since the low refractive index sectors have the above configuration, the two-dimensional photonic crystal slab satisfying the equation L/a=0.3 has a photonic band gap, common to a light beam in the TE-like mode and a light beam in the TM-like mode, having a frequency range Δλ of 50 nm; the two-dimensional photonic crystal slab satisfying the equation L/a=0.366 has a photonic band gap, common to those light beams, having a frequency range Δλ of 89 nm; and the two-dimensional photonic crystal slab satisfying the equation L/a=0.34 has a photonic band gap, common to those light beams, having a frequency range Δλ of 136 nm. Thus, the two-dimensional photonic crystal slab satisfying the equation L/a=0.34 is the largest in the width of the complete photonic band gap.

EXAMPLE 9

Various two-dimensional photonic crystal slabs similar to those described in Example 6 were prepared except that the slabs had a distribution of refractive index defined by low refractive index sectors having a shape in which a triplet of cylindrical prisms are arranged such that straight lines connecting the centers of the cylindrical prisms form a regular triangle when viewed from above and the ratio L/a was varied. The ratio L/a was varied by varying the value of a and the value of L to allow the center wavelength $\lambda_0$ of a band gap to be equal to about 1,550 nm.

Figure 57:
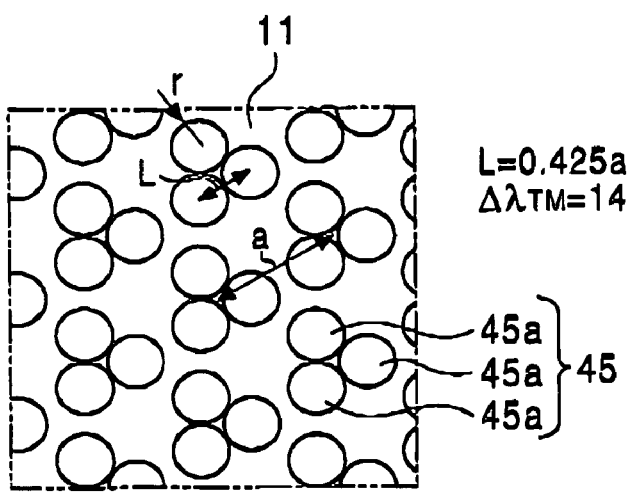
FIG. 57 is an illustration that shows the arrangement of low refractive index sectors satisfying the equation $L/a=0.425$, the value of a band gap frequency range that is determined using light in the TM-like mode and represented by $\Delta\lambda_{TM}$, and the value of a band gap frequency range that is determined using light in the TE-like mode and represented by $\Delta\lambda_{TE}$.

FIG. 57 shows the arrangement of low refractive index sectors of one of the two-dimensional photonic crystal slabs that satisfies the following equations: L/a=0.425, r=L/2, Δ=0.15a, and f=0.49, wherein L represents the distance between the centers of the cylindrical prisms, r represents the radius of end faces of the cylindrical prisms, and a, Δ, and f are as described above.

Figure 58:
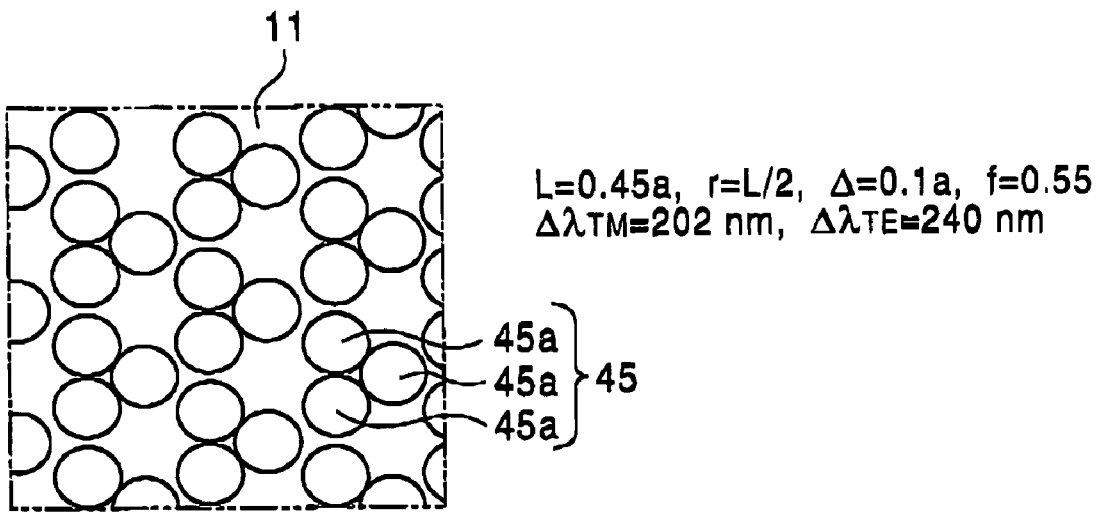
FIG. 58 is an illustration that shows the arrangement of low refractive index sectors satisfying the equation $L/a=0.45$, the value of a band gap frequency range that is determined using light in the TM-like mode and represented by $\Delta\lambda_{TM}$, and the value of a band gap frequency range that is determined using light in the TE-like mode and represented by $\Delta\lambda_{TE}$.

FIG. 58 shows the arrangement of low refractive index sectors of one of those that satisfies the following equations: L/a=0.45, r=L/2, Δ=0.1a, and f=0.55.

Figure 59:
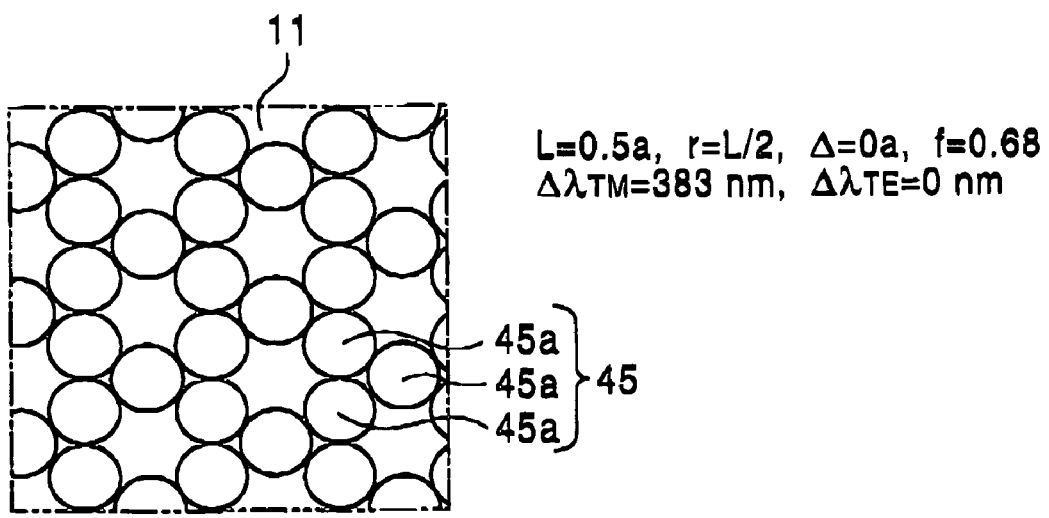
FIG. 59 is an illustration that shows the arrangement of low refractive index sectors satisfying the equation L/a=0.5, the value of a band gap frequency range that is determined using light in the TM-like mode and represented by $\Delta\lambda_{TM}$, and the value of a band gap frequency range that is determined using light in the TE-like mode and represented by $\Delta\lambda_{TE}$.

FIG. 59 shows the arrangement of low refractive index sectors of one of those that satisfies the following equations: L/a=0.5, r=L/2, Δ=0·a, and f=0.68.

The width of complete two-dimensional band gaps was investigated by applying light beams having a wavelength $\lambda_o$ of 1,550 nm to the two-dimensional photonic crystal slabs from outside. Obtained results are shown in FIGS. 57 to 59.

As is clear from FIGS. 57 to 59, since the low refractive index sectors have the above configuration, the two-dimensional photonic crystal slab satisfying the equation L/a=0.5 has a photonic band gap, common to a light beam in the TE-like mode and a light beam in the TE-like mode, having a frequency range Δλ of zero; the two-dimensional photonic crystal slab satisfying, the equation L/a=0.425 has a photonic band gap, common to those light beams, having a frequency range Δλ of 140 nm; and the two-dimensional photonic crystal slab satisfying the equation L/a=0.45 has a photonic band gap, common to those light beams, having a frequency range Δλ of 202 nm. Thus, the two-dimensional photonic crystal slab satisfying the equation L/a=0.45 is the largest in the width of the complete photonic band gap.

What is claimed is:

1. A two-dimensional photonic crystal slab having a photonic band gap for light propagated through the slab, comprising:
   a slab member containing a material having a high refractive index; and
   sectors that are periodically arranged in the slab member, contain a material having a refractive index less than that to the slab member, and define the distribution of refractive index in the slab,
   wherein the low refractive index sectors have a shape with $C_{3v}$ symmetry and are arranged in the slab member in a triangular grid pattern, and
   wherein the low refractive index sectors have a regular triangular prism shape and satisfy the inequality 0.7<L/a≦1.0, where L represents the length of edges of triangular faces of the low refractive index sectors and a represents the minimum distance between the centers of the low refractive index sectors or the grating constant.

2. The two-dimensional photonic crystal slab according to claim 1, wherein the slab member satisfies the inequality $0.1 \leq t/\lambda_0 \leq 0.3$, where t represents the thickness of the slab member and $\lambda_o$ represents the center wavelength of a photonic band gap.

3. A two-dimensional photonic crystal slab having a photonic band gap common to a light beam in the TE-like mode and a light beam in the TM-like mode, comprising:
   a slab member containing a material having a high refractive index; and
   sectors that are periodically arranged in the slab member, contain a material having a refractive index less than that of the slab member, and define the distribution of refractive index in the slab,
   wherein the low refractive index sectors are arranged in the slab member in a square grid pattern, and the slab member satisfies the inequality $0.1 \leq t/\lambda_0 \leq 0.3$, where t represents the thickness of the slab member and $\lambda_o$ represents the center wavelength of a photonic band gap, and
   wherein the low refractive index sectors have a cylindrical shape and satisfy the inequality 0.4≦r/a<0.50, where r represents the radius of the low refractive index sectors and a represents the minimum distance between the centers of the low refractive index sectors or the grating constant.

4. The two-dimensional photonic crystal slab according to claim 1, wherein the slab member has a support layer, placed on at least one face thereof, having no low refractive index sectors.

5. The two-dimensional photonic crystal slab according to claim 3, wherein the slab member has a support layer, placed on at least one face thereof, having no low refractive index sectors.

6. A two-dimensional photonic crystal waveguide comprising:
   the two-dimensional photonic crystal slab according to claim 1, wherein the two-dimensional photonic crystal slab includes a linear defect section that is a disordered portion in a periodic structure of a photonic crystal, extends in the Γ-J direction, and functions as a waveguide section for guiding light in the TB-like mode and light in the TM-like mode.

7. A two-dimensional photonic crystal waveguide comprising the two-dimensional photonic crystal slab according to claim 3, wherein the two-dimensional photonic crystal slab includes a linear defect section that is a disordered portion in a periodic structure of a photonic crystal, extends in the Γ-X direction, and functions as a waveguide section for guiding light in the TE-like mode and light in the TM-like mode.

8. The two-dimensional photonic crystal waveguide according to claim 6, wherein the low refractive index sectors are grouped into a first and a second region, which are asymmetric about the waveguide section.

9. The two-dimensional photonic crystal waveguide according to claim 6, wherein the low refractive index sectors are grouped into a first and a second region, which are symmetric about the waveguide section.

10. The two-dimensional photonic crystal waveguide according to claim 6, wherein at least one of the dispersion relation and frequency range of light is controlled by varying the waveguide section width.

11. The two-dimensional photonic crystal waveguide according to claim 6, wherein the waveguide section is allowed to function as an acceptor-type waveguide by varying the width of the waveguide section.

12. The two-dimensional photonic crystal waveguide according to claim 6, wherein the two-dimensional photonic crystal slab satisfies the inequality $(\sqrt{3})a \times (2/16) \leq W \leq (\sqrt{3}) a \times (18/16)$, where W represents the width of the waveguide sections and a represents the minimum distance between the centers of the low refractive index sectors or the grating constant.

13. The two-dimensional photonic crystal waveguide according to claim 7, wherein at least one of the dispersion relation and frequency range of light is controlled by varying the waveguide section width.

14. The two-dimensional photonic crystal waveguide according to claim 7, wherein the waveguide section is allowed to function as an acceptor-type wave guide by varying the width of the waveguide section.

15. An optical device comprising the two-dimensional photonic crystal waveguide according to claim 6.

16. An optical device comprising the two-dimensional photonic crystal waveguide according to claim 7.

17. Two-dimensional photonic crystal waveguide comprising:
   a two-dimensional photonic crystal slab having a photonic band gap for light propagated through the slab, including
   a slab member containing a material having a high refractive index; and sectors that are periodically arranged in the slab member, contain a material having a refractive index less than that of the slab member, and define the distribution of refractive index in the slab, wherein the two-dimensional photonic crystal slab includes a linear defect section that is a disordered portion in a periodic structure of a photonic crystal extends in the Γ-J direction, and functions as a waveguide section for guiding light in the TE-like mode and light in the TM-like mode, wherein the low refractive index sectors have a shape with $C_{3v}$ symmetry and are arranged in the slab member in a triangular grid pattern, and wherein the low refractive index sectors are grouped into a first and a second region, which are asymmetric about the waveguide section.

18. The two-dimensional photonic crystal waveguide according to claim 17, wherein the slab member satisfies the inequality $0.1 \leq t/\lambda_0 \leq 0.3$, where t represents the thickness of the slab member and $\lambda_0$ represents the center wavelength of a photonic band gap.

19. The two-dimensional photonic crystal waveguide according to claim 17, wherein the low refractive index sectors have a shape selected from the group consisting of a regular triangular prism shape; a hexagonal prism shape, other than a regular hexagonal prism shape, formed by chamfering edges of a regular biangular prism; a shape in which a regular triangular prism has edges each having corresponding protrusions; and a shape in which a triplet of cylindrical prisms are arranged such that straight lines connecting the centers of the cylindrical prisms form a regular triangle when viewed from above.

20. The two-dimensional photonic crystal waveguide according to claim 17, wherein the slab member has a support layer, placed on at least one face thereto having no low refractive index sectors.

21. A two-dimensional photonic crystal slab having a photonic band gap for light propagated through the slab, comprising:
    a slab member containing a material having a high refractive index; and
    sectors that are periodically arranged in the slab member, contain a material having a refractive index less than that of the slab member, and define the distribution of refractive index in the slab,
    wherein the low refractive index sectors have a shape with $C_{3v}$ symmetry and are arranged in the slab member in a triangular grid pattern,
    wherein the low refractive index sectors have a triangular shape in horizontal cross section in which vertices are concave.

22. The two-dimensional photonic crystal slab according to claim 21, wherein the slab member satisfies the inequality $0.1 \leq t/\lambda_0 \leq 0.3$ where t represents the thickness of the slab member and $\lambda_0$ represents the center wavelength of a photonic band gap.

23. A two-dimensional photonic crystal slab having a photonic band gap for light propagated through the slab, comprising:
    a slab member containing a material having a high refractive index; and
    sectors that are periodically arranged in the slab member, contain a material having a refractive index less than that of the slab member, and define the distribution of refractive index in the slab,
    wherein the low refractive index sectors have a shape with $C_{3v}$ symmetry and are arranged in the slab member in a triangular grid pattern,
    wherein the low refractive index sectors have a triangular prism shape in which each vertex angle portion has a corresponding flat surface, and have a Y-shape in horizontal cross section.

24. The two-dimensional photonic crystal slab according to claim 23, wherein the slab member satisfies the inequality $0.1 \leq t/\lambda_0 \leq 0.3$, where t represents the thickness of the slab member and $\lambda_0$ represents the center wavelength of a photonic band gap.

25. A two-dimensional photonic crystal slab having a photonic band gap for light propagated through the slab, comprising:
    a slab member containing a material having a high refractive index; and
    sectors that are periodically arranged in the slab member, contain a material having a refractive index less than that of the slab member, and define the distribution of refractive index in the slab,
    wherein the low refractive index sectors have a shape with $C_{3v}$ symmetry and are arranged in the slab member in a triangular grid pattern,
    wherein the low refractive index sectors have a unit of three cylindrical columns in which centers of the three cylindrical columns in the unit constitute an equilateral triangle.

26. The two-dimensional photonic crystal slab according to claim 25, wherein the slab member satisfies the inequality $0.1 \leq t/\lambda_0 \leq 0.3$, where t represents to thickness of to slab member and $\lambda_0$ represents the center wavelength of a photonic band gap.

* * * * *